(12) United States Patent
Kang et al.

(10) Patent No.: US 10,031,637 B2
(45) Date of Patent: Jul. 24, 2018

(54) IMAGE DISPLAY APPARATUS AND METHOD FOR OPERATING THE SAME

(71) Applicant: LG ELECTRONICS INC., Seoul (KR)

(72) Inventors: Hyungsuk Kang, Seoul (KR); Youngkon Yu, Seoul (KR); Yongbum Cho, Seoul (KR); Sungjae Roh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 13/922,707

(22) Filed: Jun. 20, 2013

(65) Prior Publication Data

US 2014/0210714 A1 Jul. 31, 2014

Related U.S. Application Data

(60) Provisional application No. 61/756,971, filed on Jan. 25, 2013.

(30) Foreign Application Priority Data

| Jan. 31, 2013 | (KR) | 10-2013-0011281 |
| Jan. 31, 2013 | (KR) | 10-2013-0011282 |
| Jan. 31, 2013 | (KR) | 10-2013-0011283 |
| Jan. 31, 2013 | (KR) | 10-2013-0011284 |

(51) Int. Cl.
| *H04N 5/445* | (2011.01) |
| *G06F 3/0481* | (2013.01) |
| *G06F 3/0483* | (2013.01) |
| *G06F 3/0346* | (2013.01) |

(52) U.S. Cl.
CPC ......... *G06F 3/0481* (2013.01); *G06F 3/0346* (2013.01); *G06F 3/0483* (2013.01); *H04N 5/44543* (2013.01)

(58) Field of Classification Search
CPC .......... G09G 5/00; G09G 5/006; H04N 5/445; H04N 5/44543; H04N 21/42204; H04N 21/4821; G06F 13/00
USPC ............. 345/156, 158; 348/563, 14.03, 564; 725/39, 40, 44, 58
See application file for complete search history.

(56) References Cited

U.S. PATENT DOCUMENTS

| 6,763,522 B1 * | 7/2004 | Kondo et al. ................... 725/39 |
| 2008/0276277 A1 * | 11/2008 | Ahn .................... H04N 5/44543 725/40 |
| 2009/0158350 A1 * | 6/2009 | DeCamp ......................... 725/58 |
| 2010/0083313 A1 * | 4/2010 | White ................ H04N 5/44543 725/39 |
| 2011/0283320 A1 * | 11/2011 | Levin et al. .................... 725/40 |
| 2011/0283322 A1 * | 11/2011 | Hamano ......................... 725/44 |

(Continued)

*Primary Examiner* — Abdul-Samad A Adediran
(74) *Attorney, Agent, or Firm* — Birch, Stewart, Kolasch & Birch, LLP

(57) ABSTRACT

An image display apparatus and a method for operating the same are disclosed. The method for operating an image display apparatus includes displaying a home screen including at least one card object including a content list, displaying a dynamic screen on the home screen if dynamic screen display input is received, and moving and displaying the dynamic screen on the home screen if dynamic screen movement input is received. Therefore, it is possible to increase user convenience.

9 Claims, 62 Drawing Sheets

(56) References Cited

U.S. PATENT DOCUMENTS

| | | | |
|---|---|---|---|
| 2012/0120316 A1* | 5/2012 | Lee | H04N 21/42204 348/564 |
| 2012/0162351 A1* | 6/2012 | Feldman | G09G 5/006 348/14.03 |
| 2012/0176543 A1* | 7/2012 | Jeong | 348/563 |
| 2012/0293406 A1* | 11/2012 | Park et al. | 345/156 |
| 2013/0179920 A1* | 7/2013 | Esaka | H04N 21/4821 725/39 |

* cited by examiner (a)          (b)          (c)

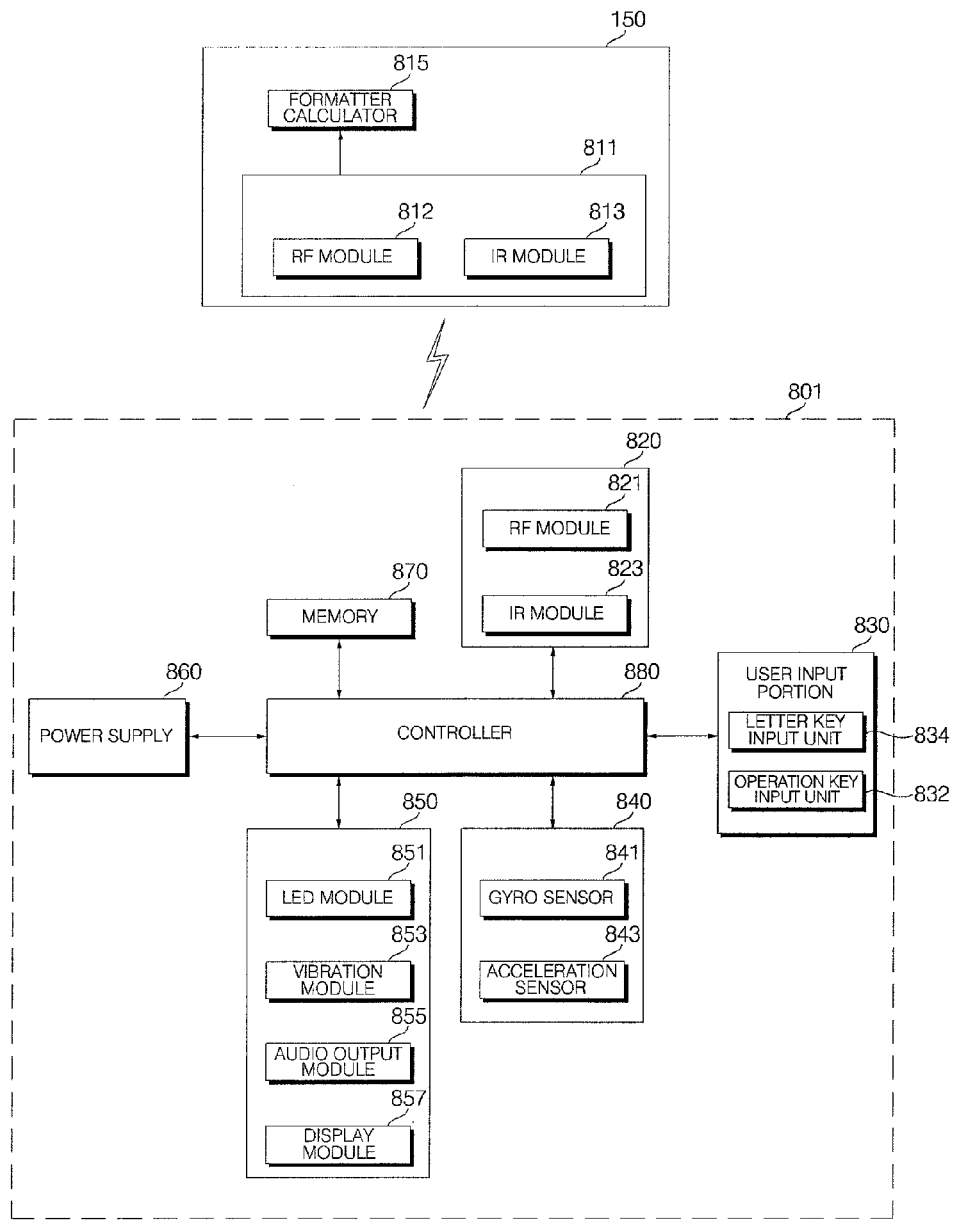

FIG. 9A
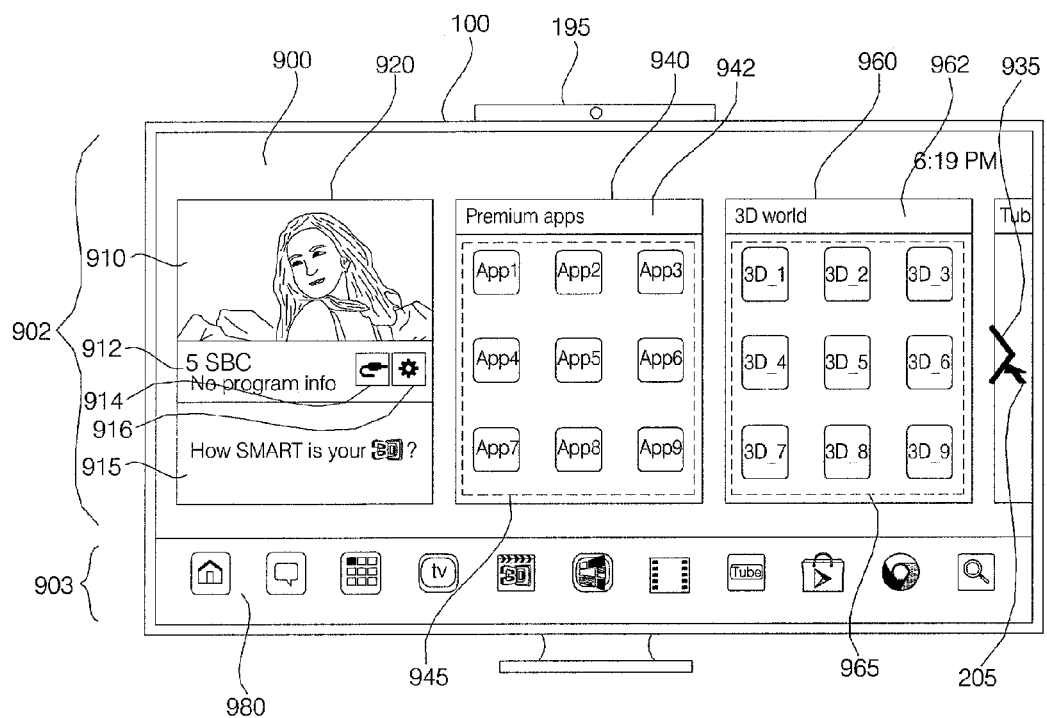
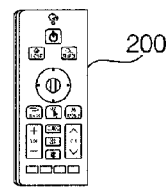

FIG. 9B
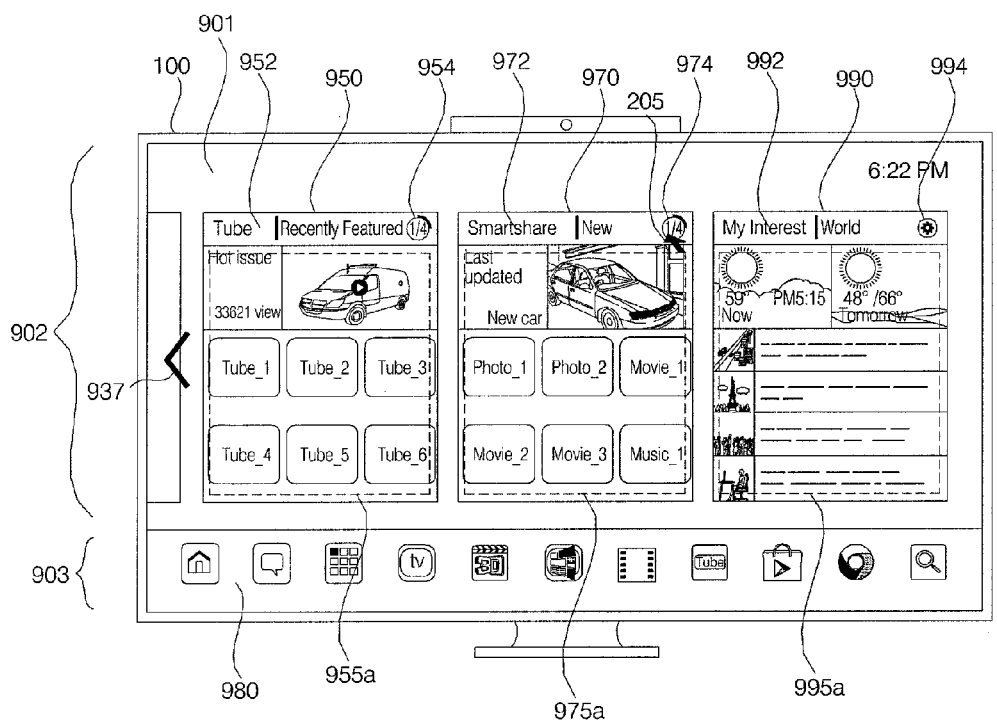
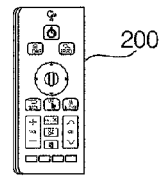

FIG. 9D
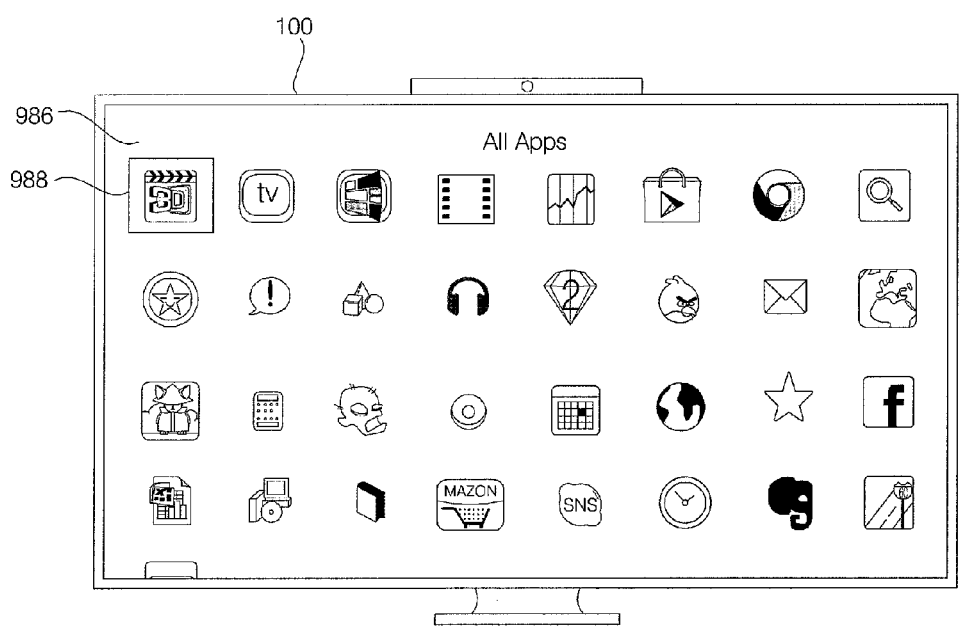
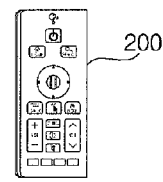

FIG. 9E
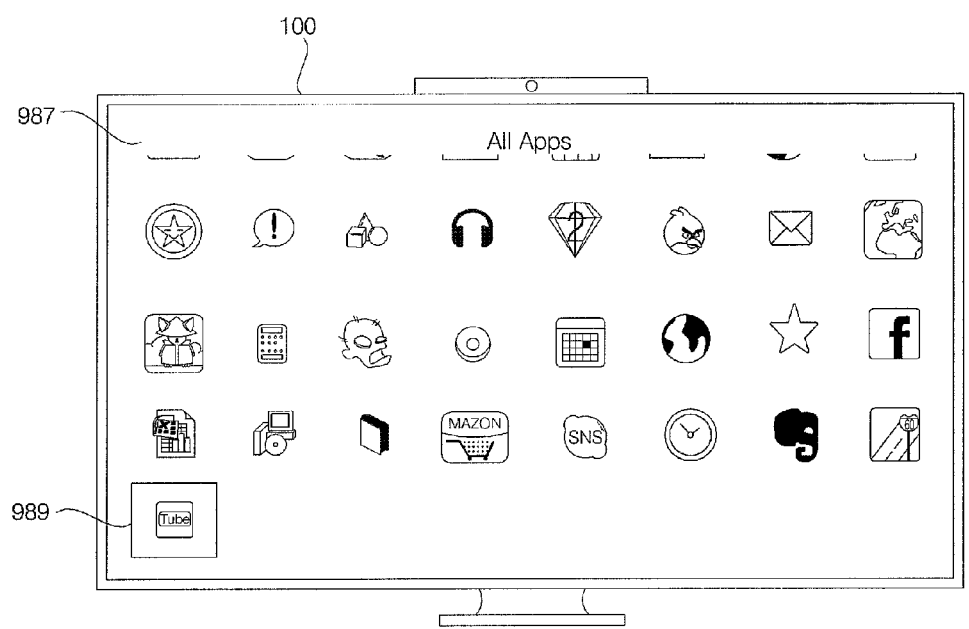
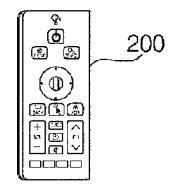

FIG. 10A
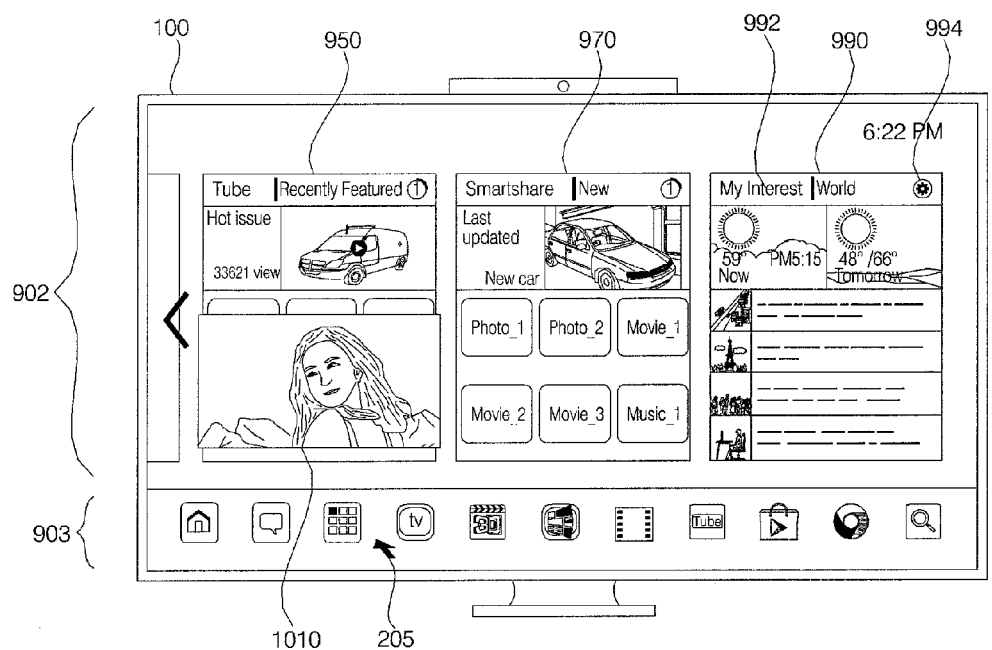
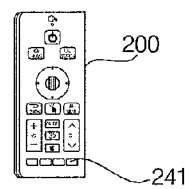

FIG. 10C
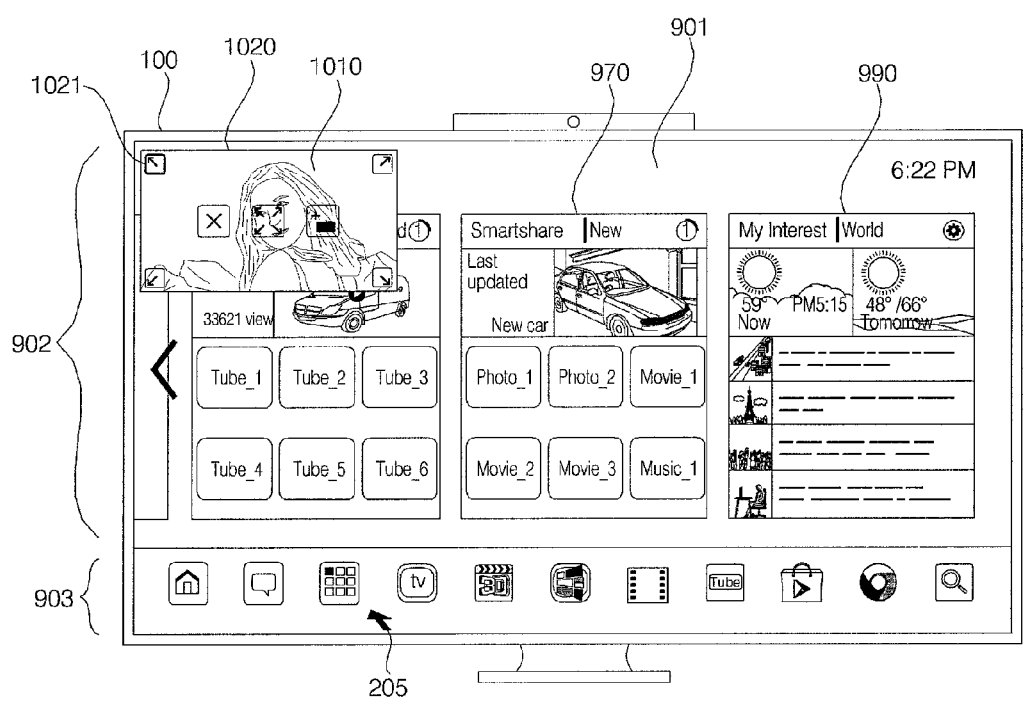
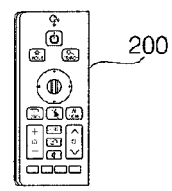

FIG. 10D
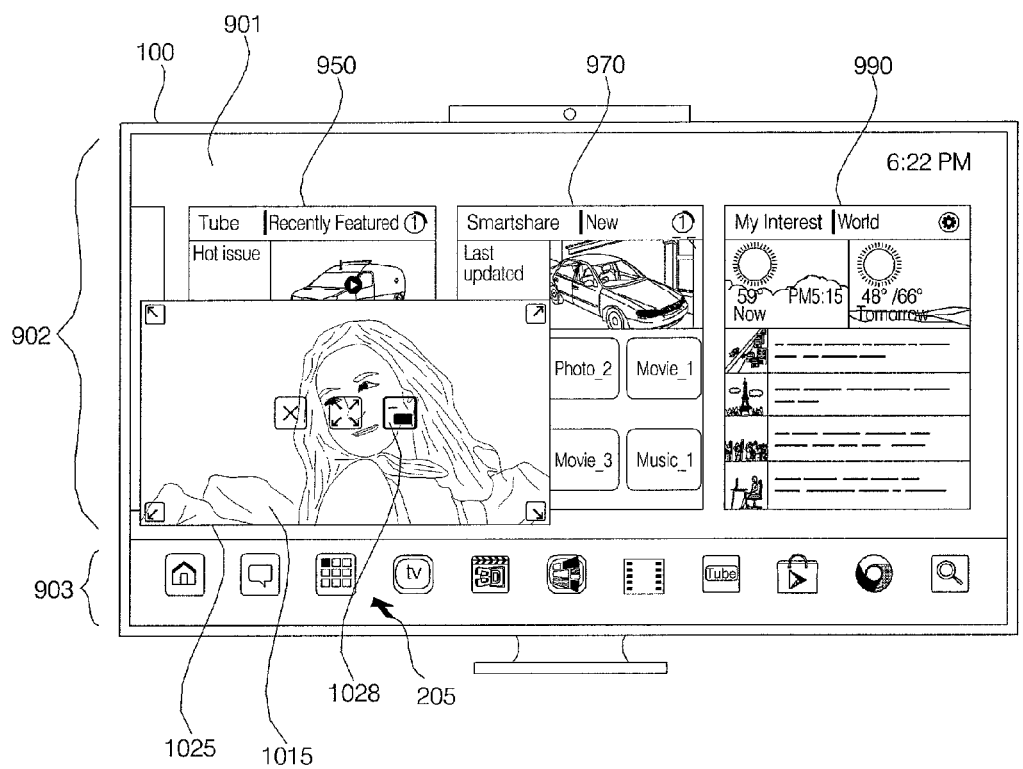
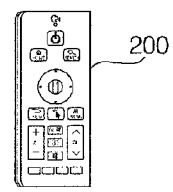

FIG. 10E
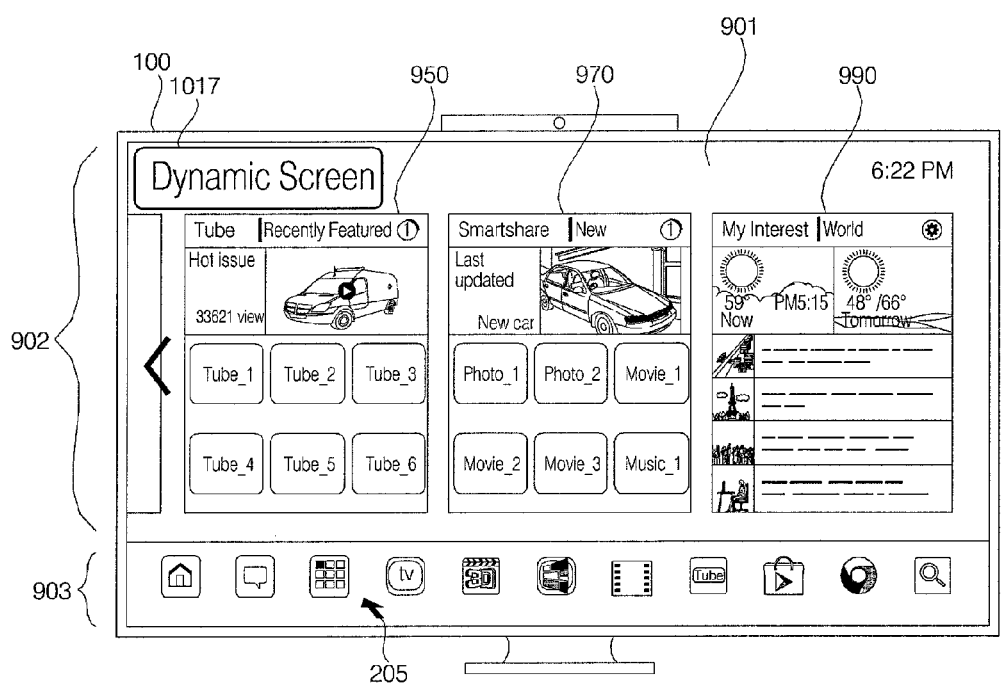
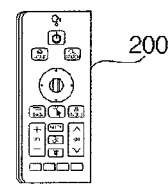

FIG. 11A
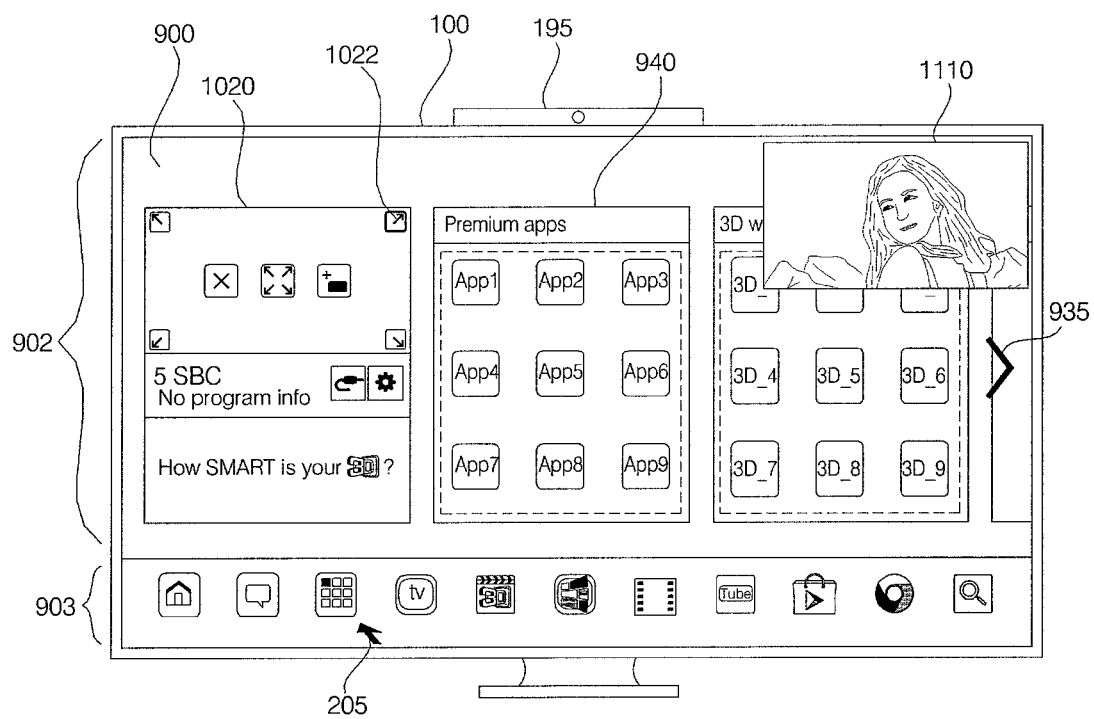
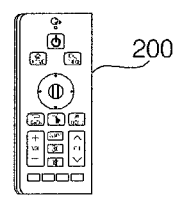

FIG. 11B
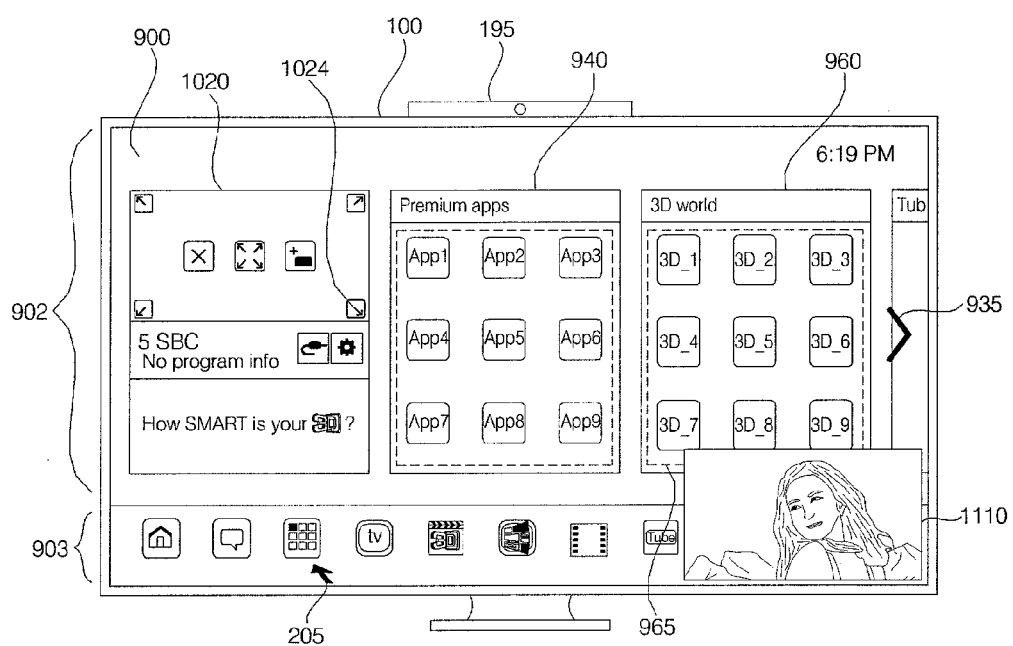
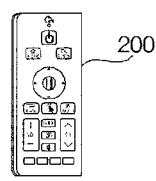

FIG. 11C
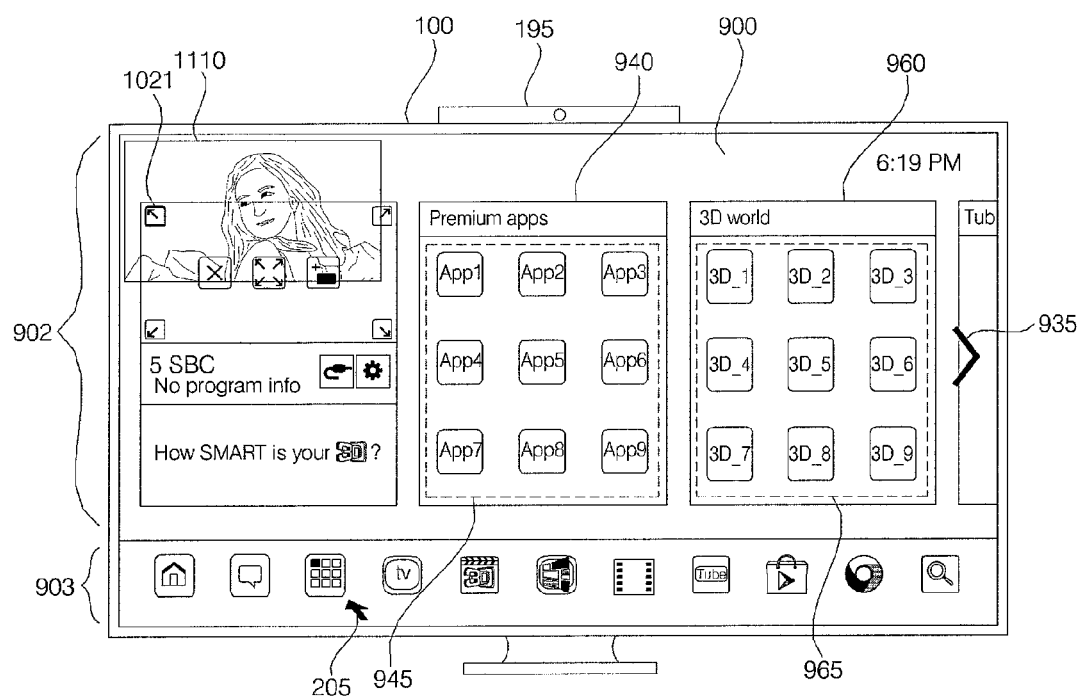
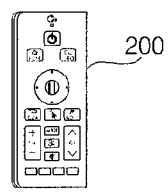

FIG. 11D
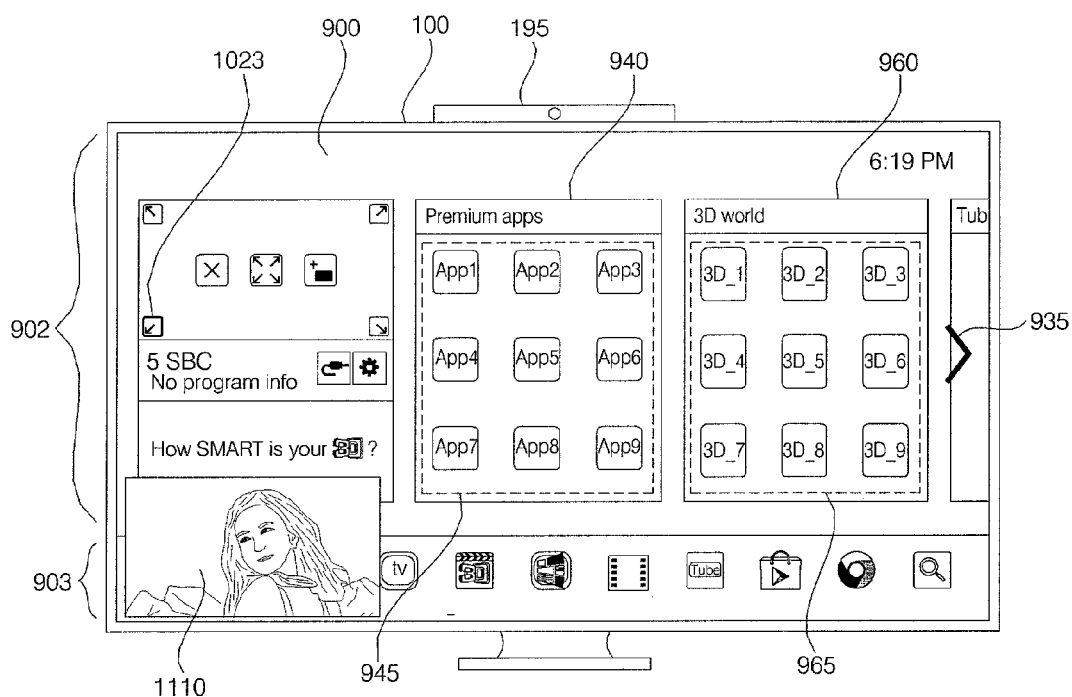
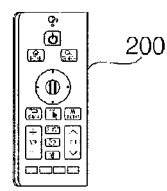

FIG. 12
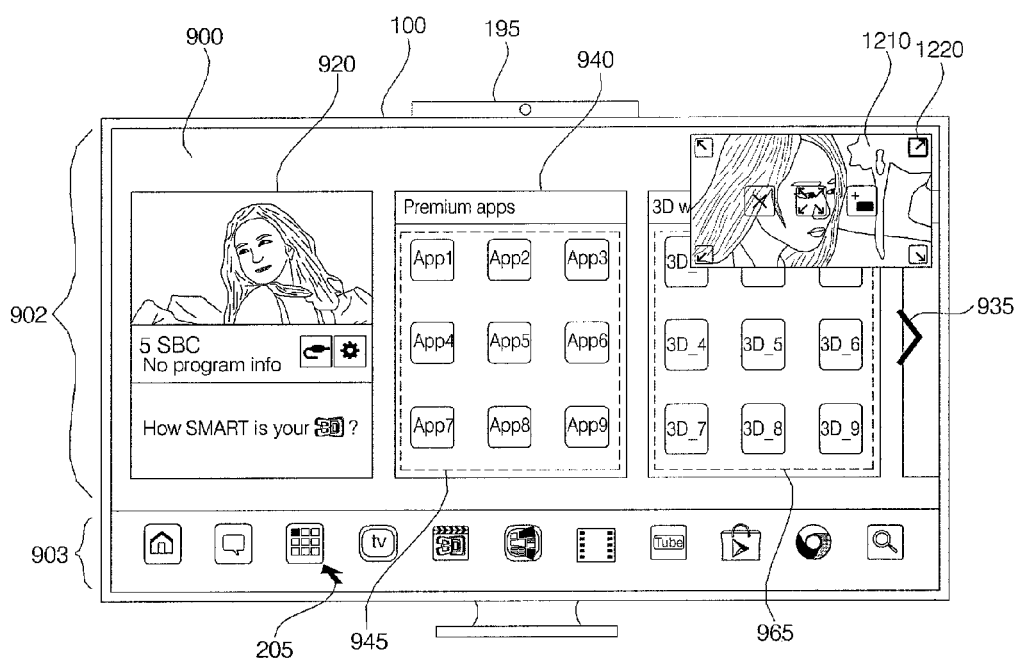
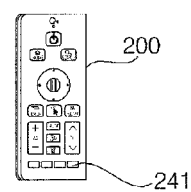

FIG. 14A
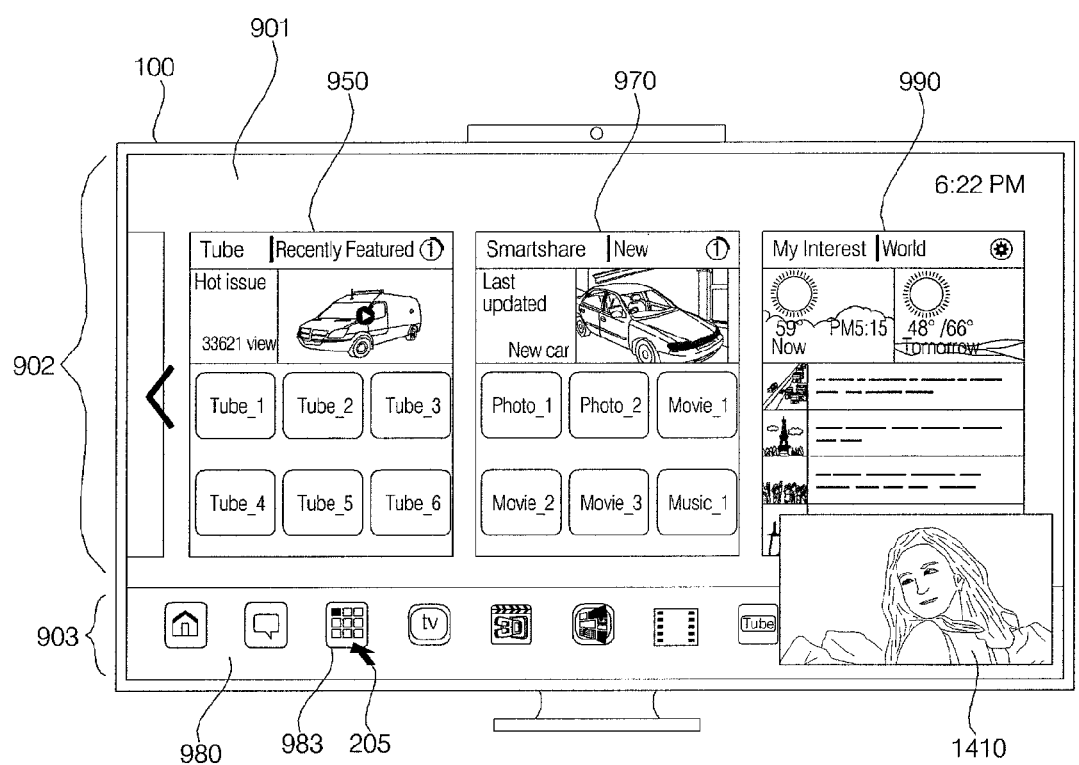
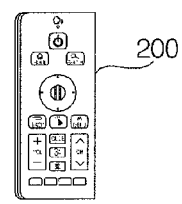

FIG. 14C
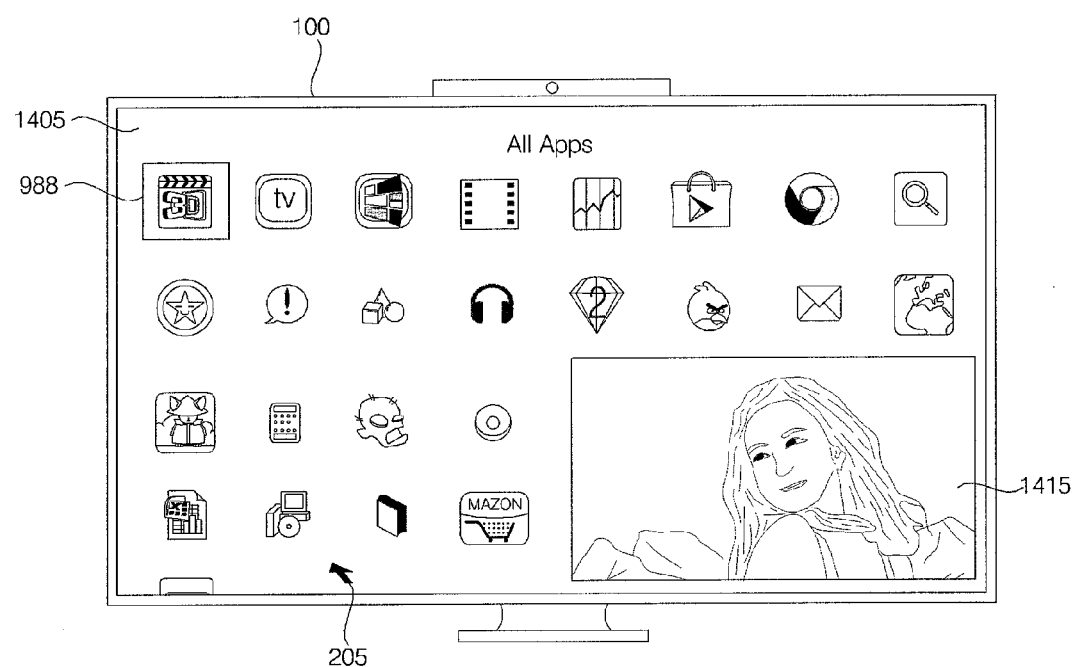
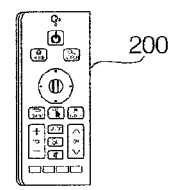

FIG. 16A
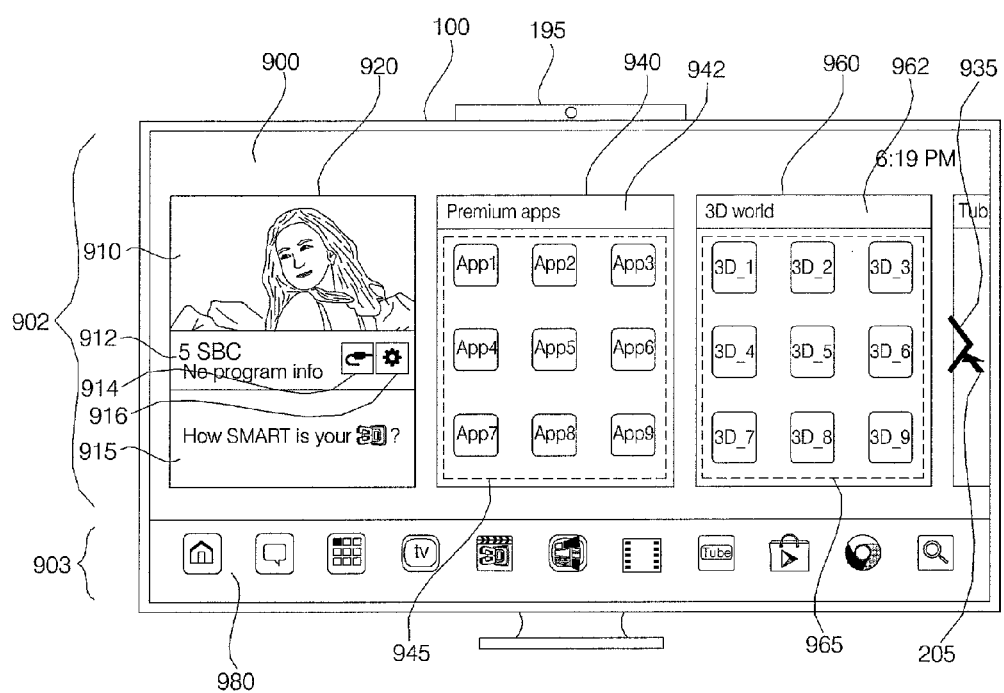
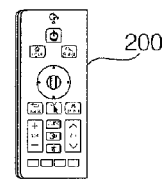

FIG. 16B
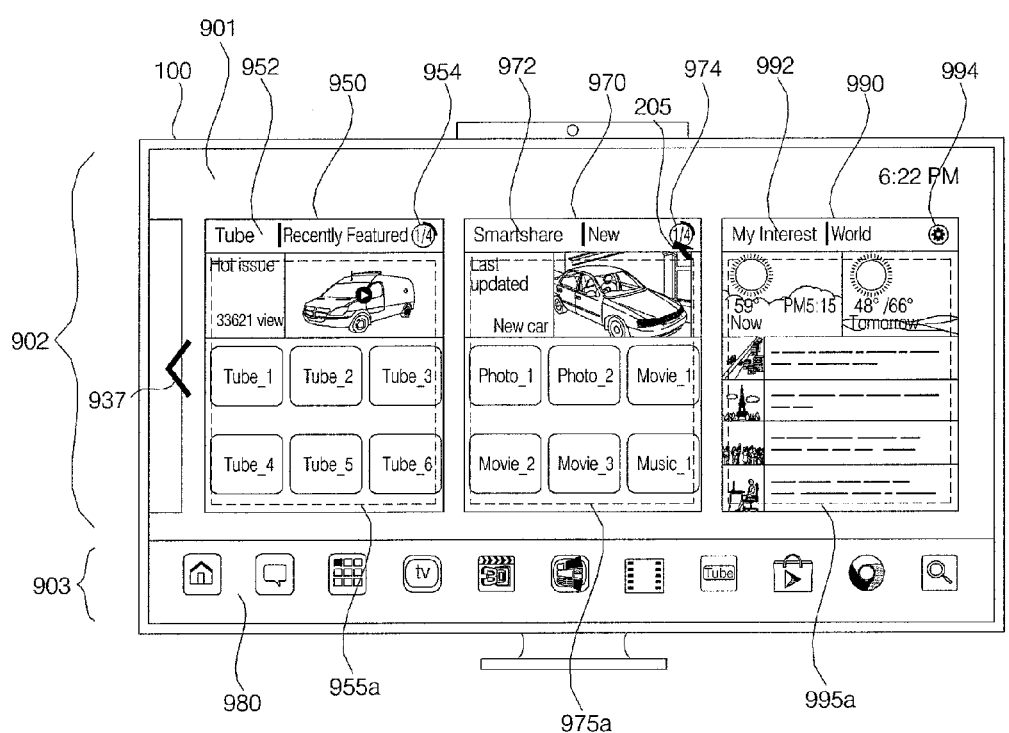
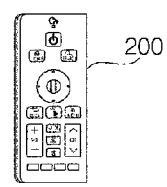

FIG. 16D
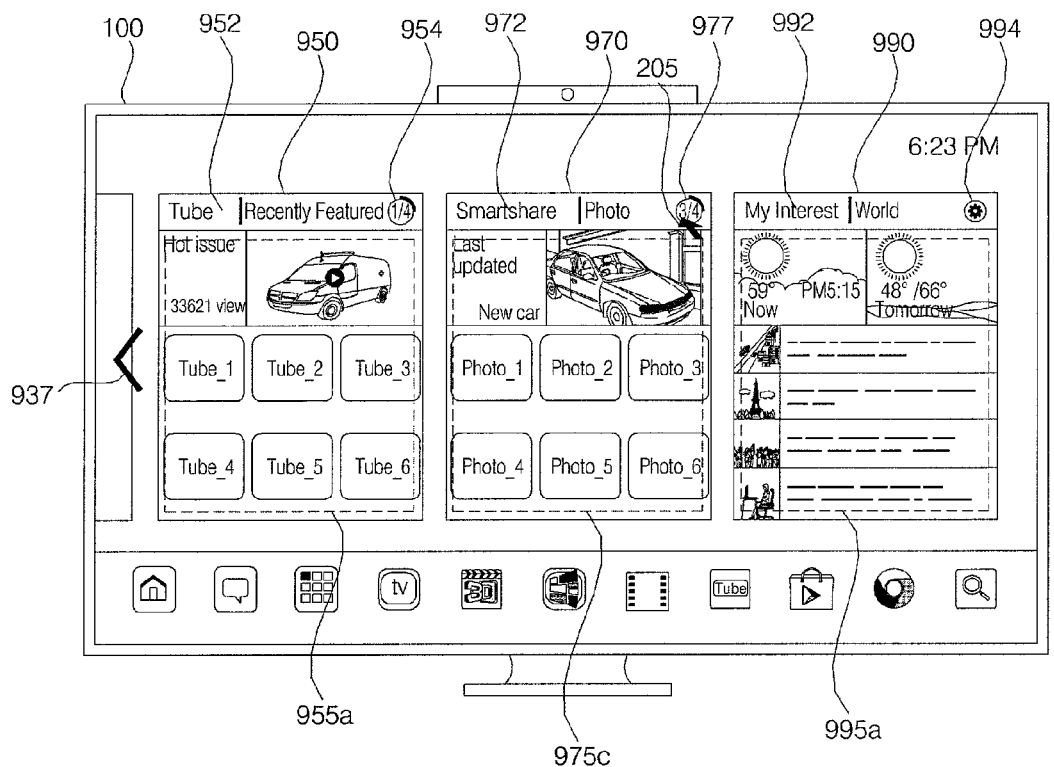
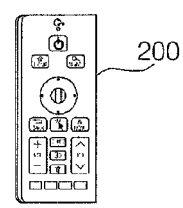

FIG. 16E
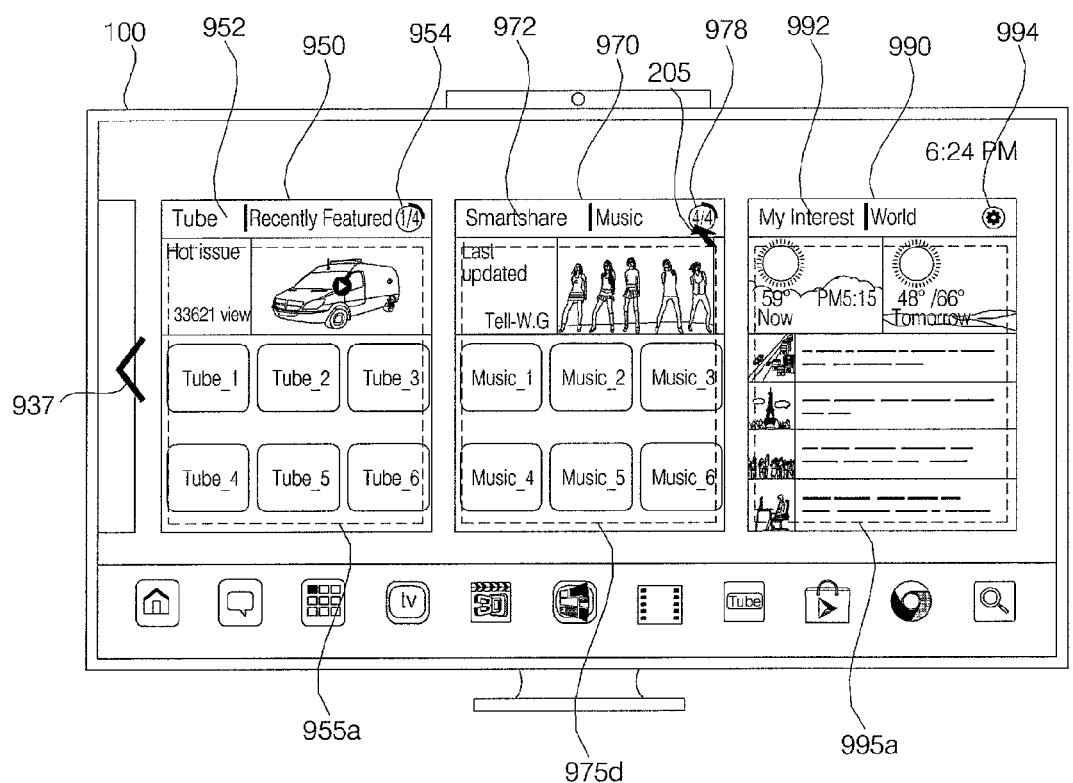
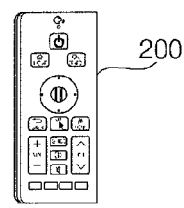

FIG. 16H
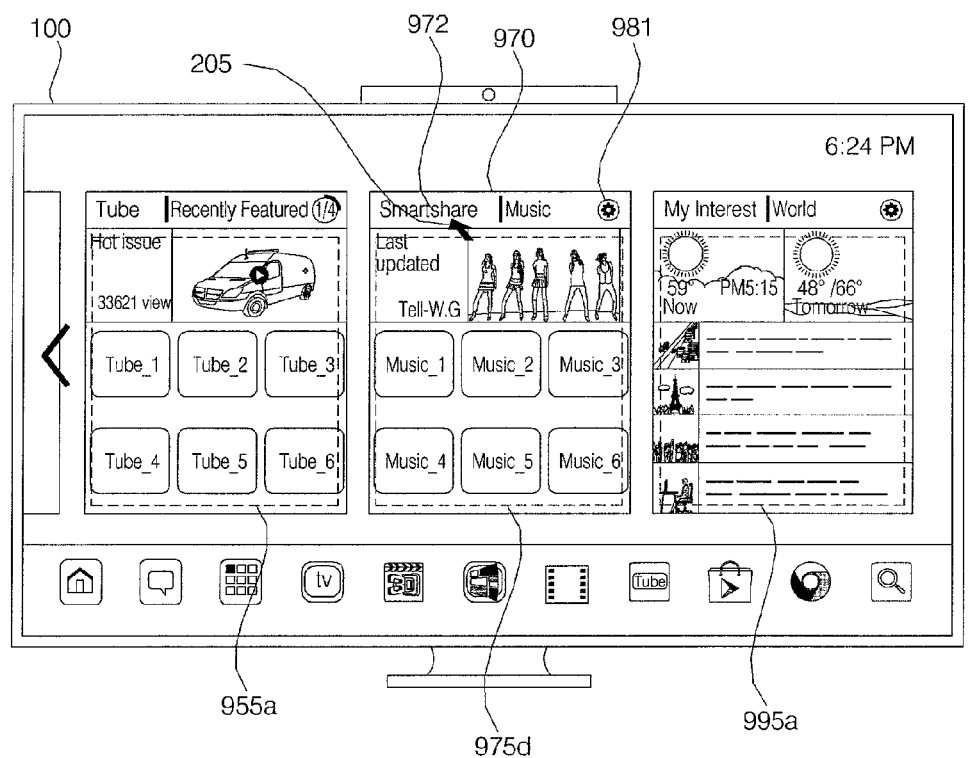
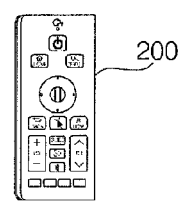

FIG. 16J
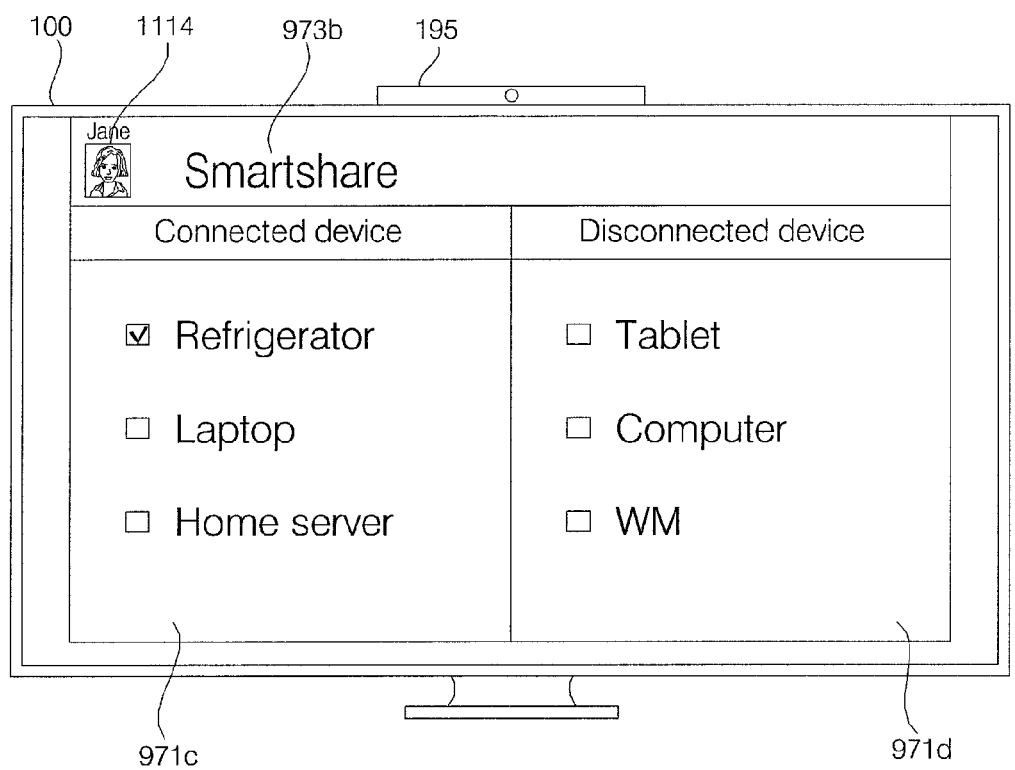
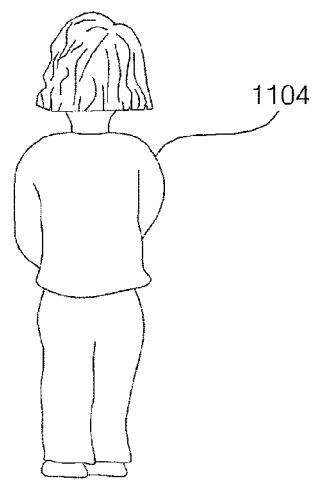

FIG. 17A
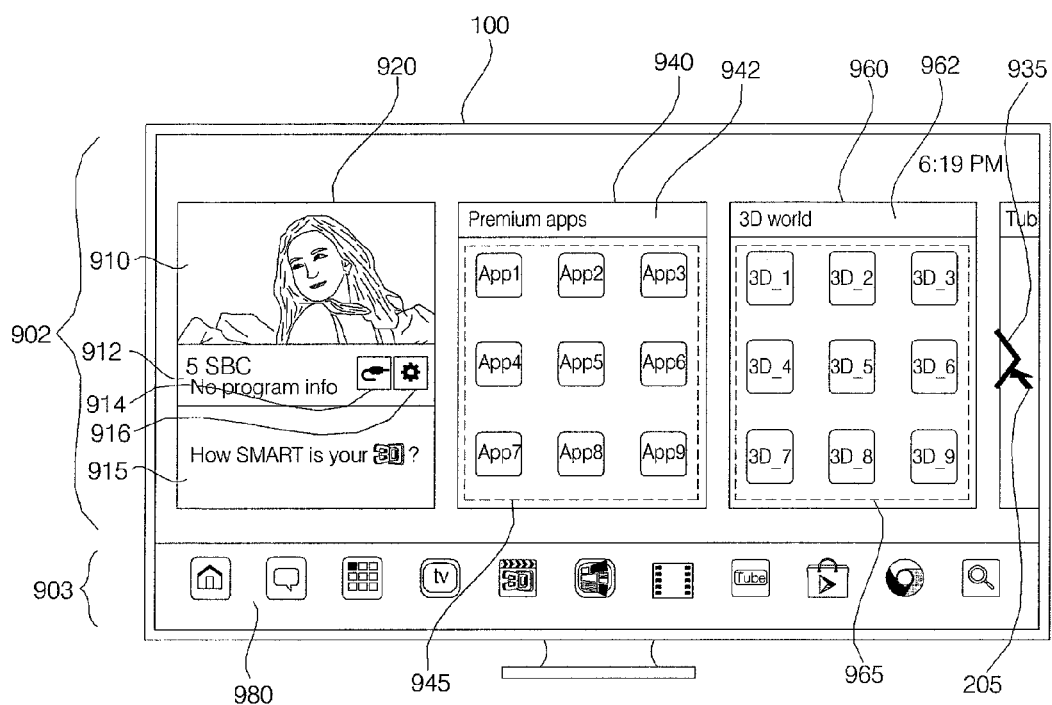
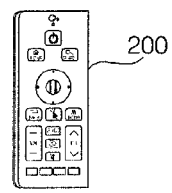

FIG. 17B
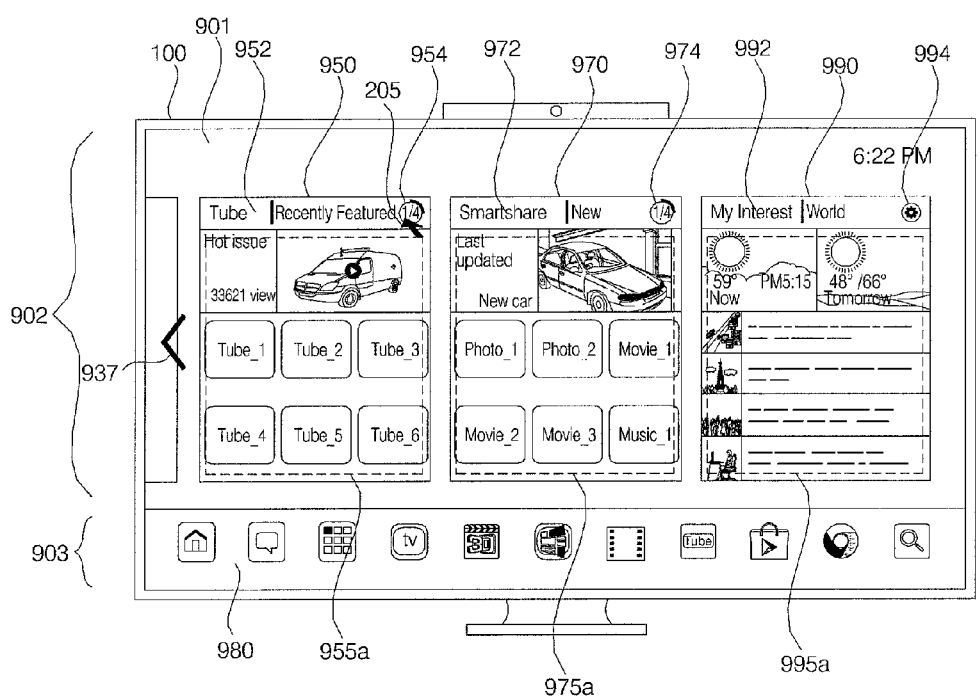
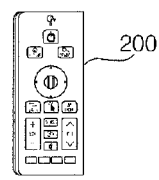

FIG. 17C
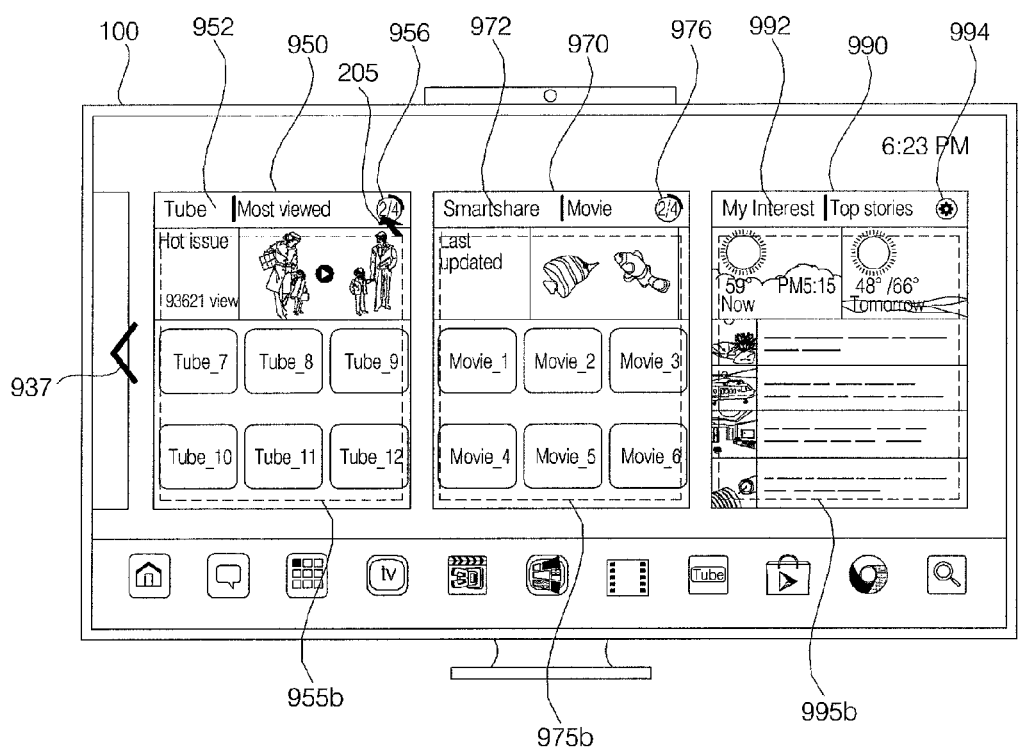
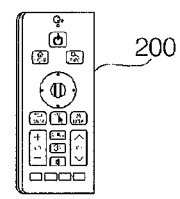

FIG. 17D
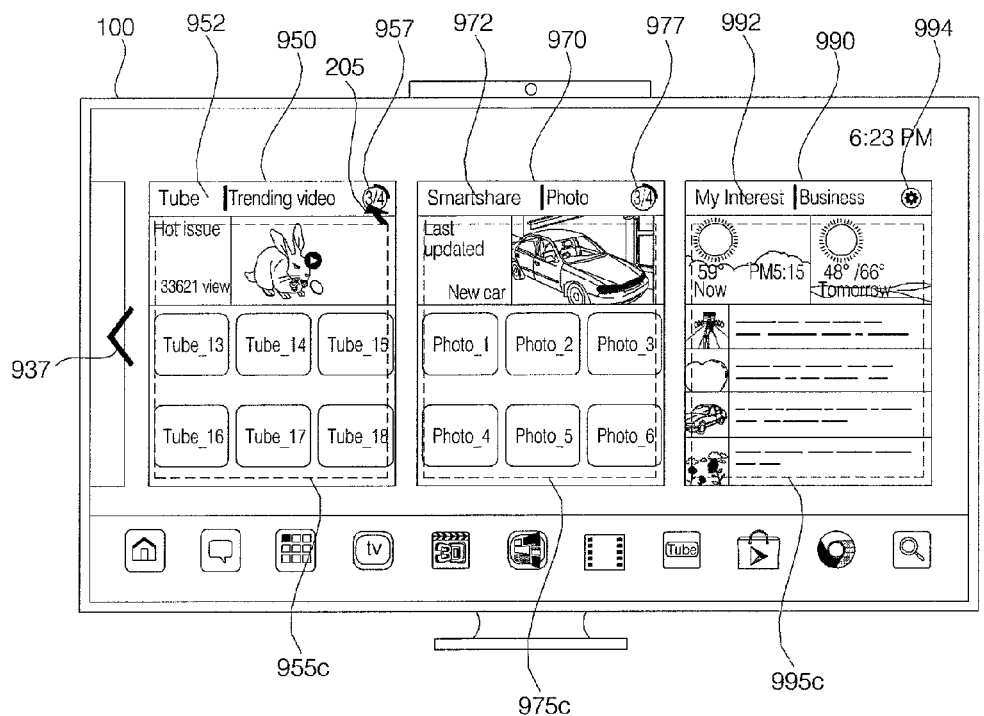
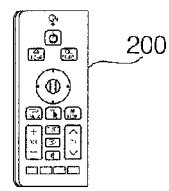

FIG. 17E
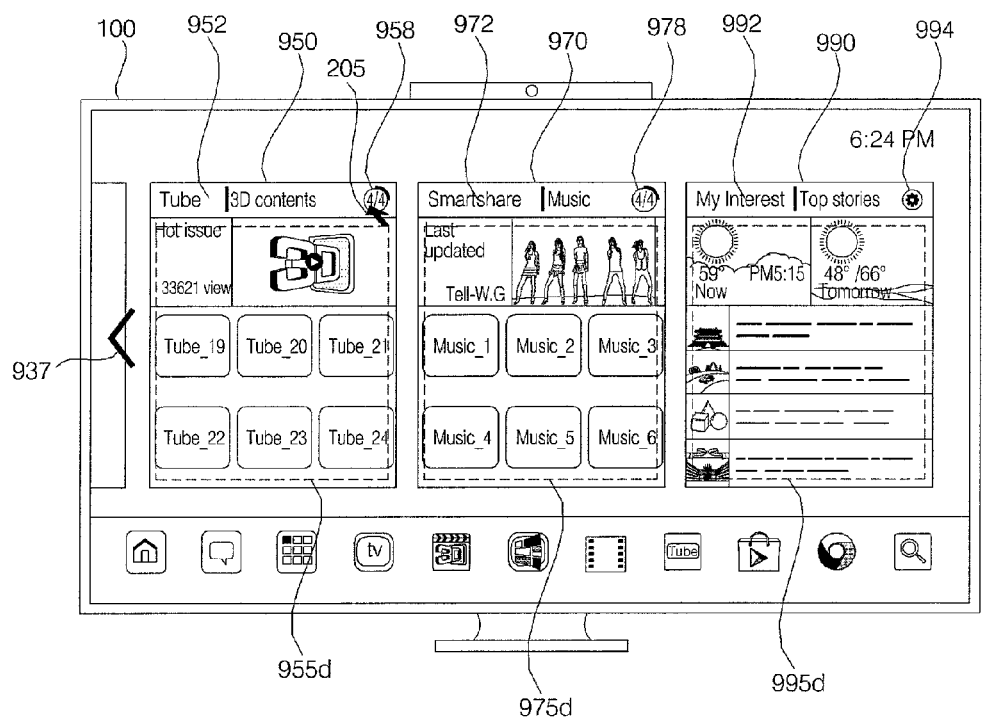
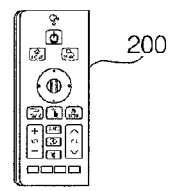

FIG. 18A
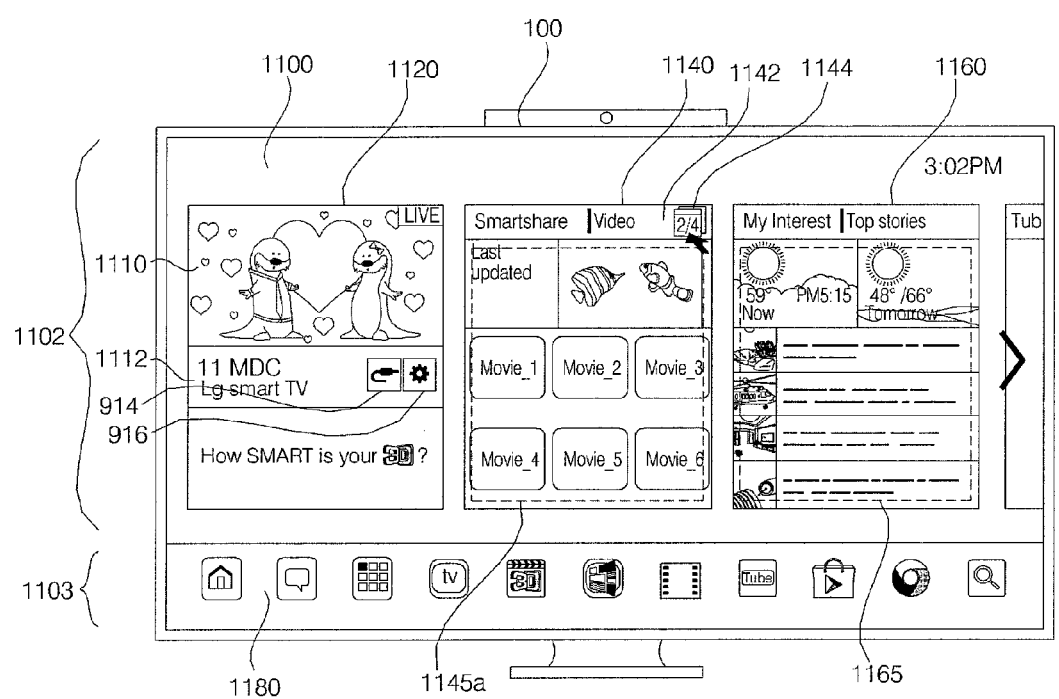
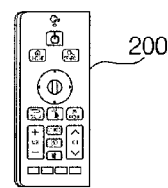

FIG. 18B
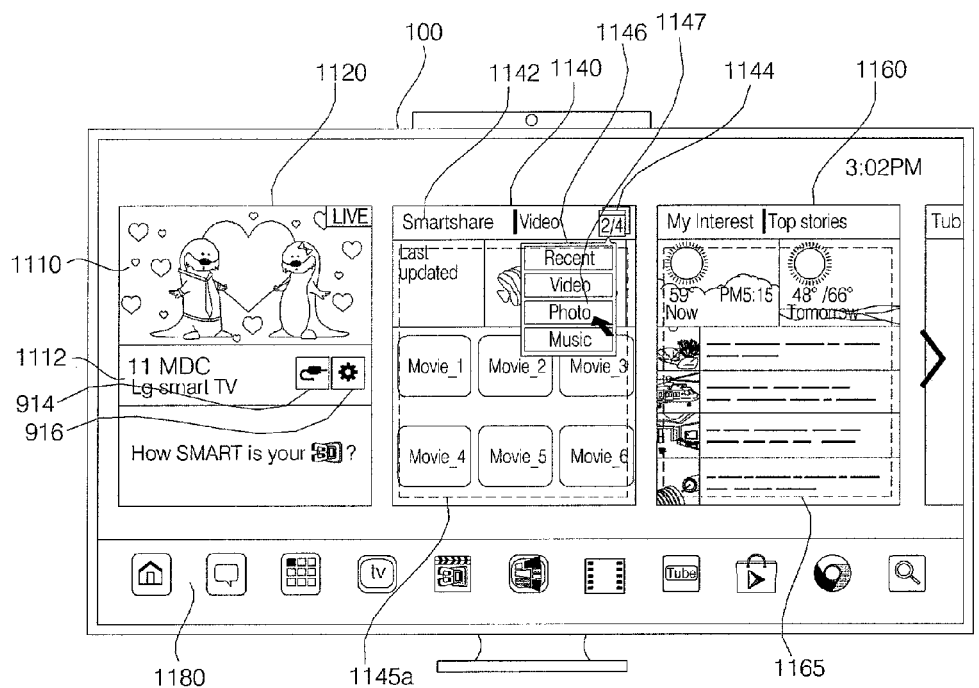
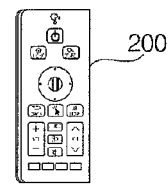

FIG. 18C
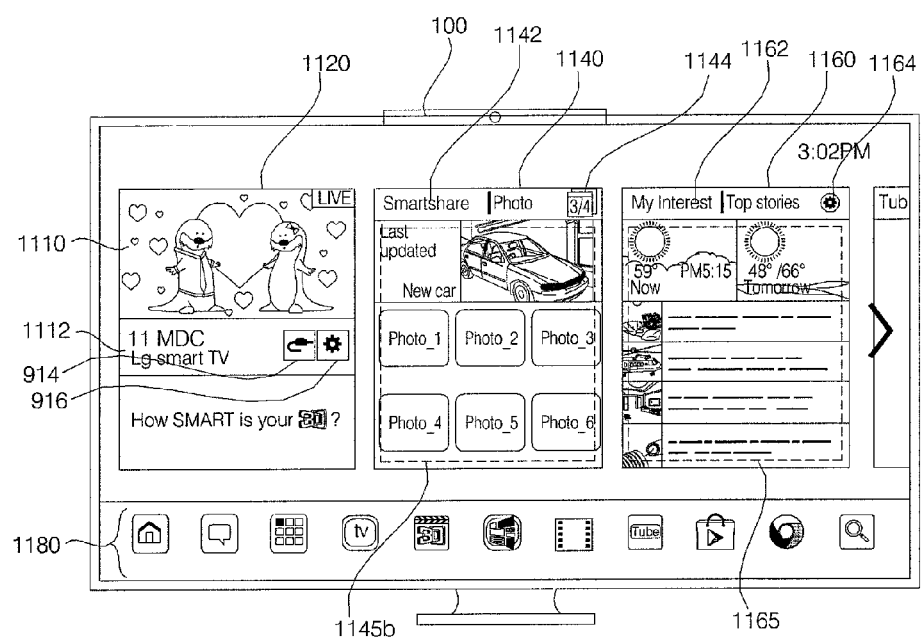
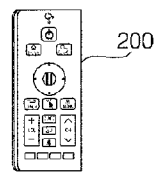

FIG. 18D
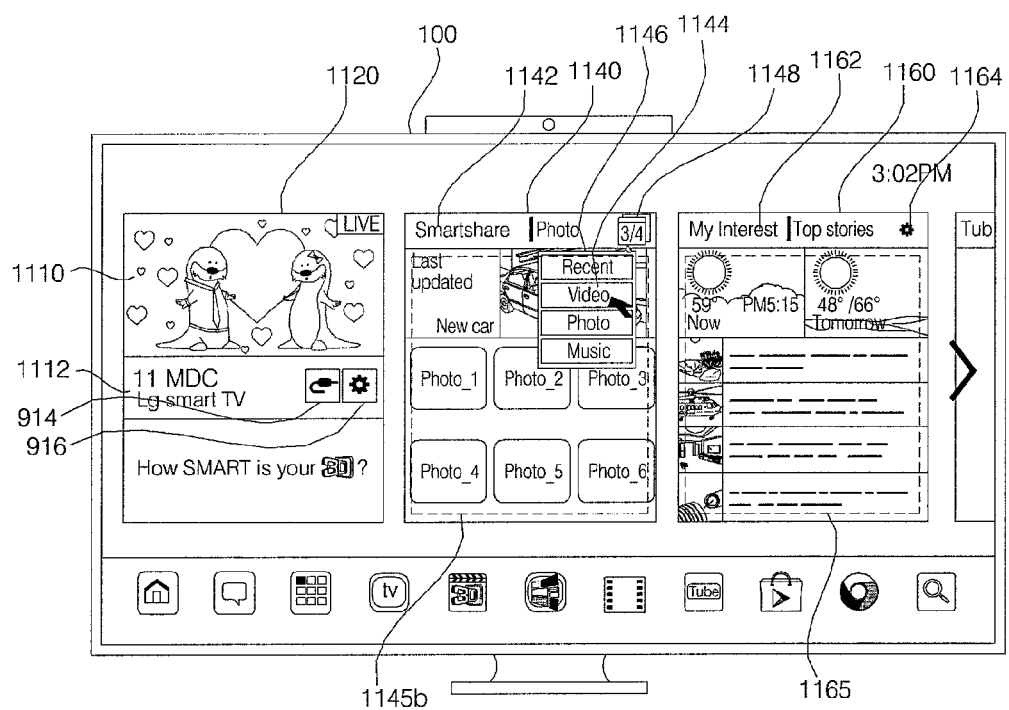
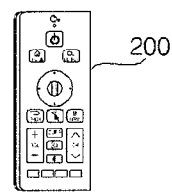

FIG. 18E
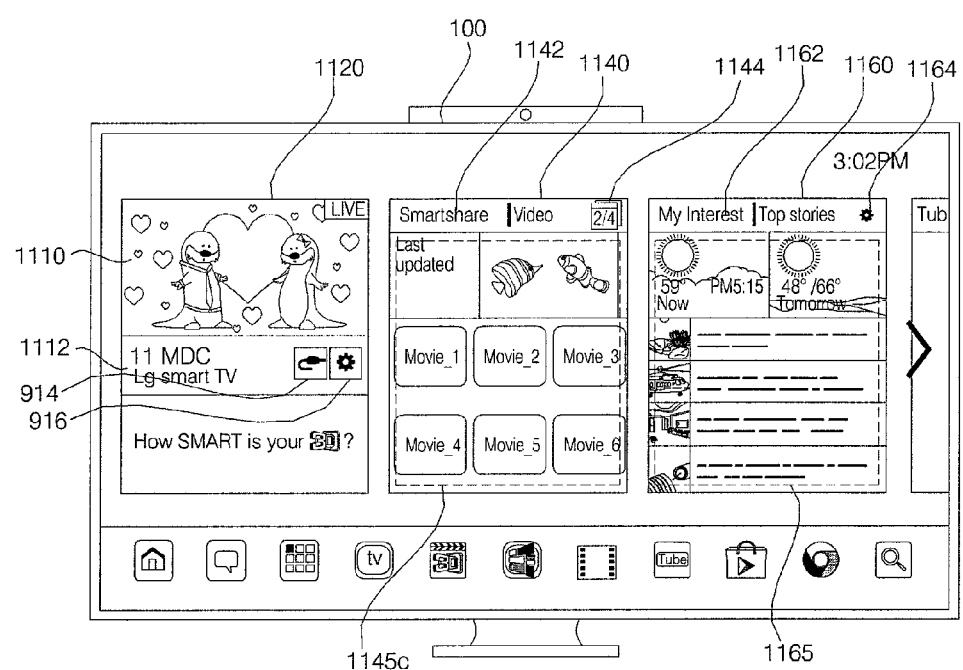
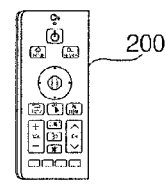

FIG. 20A
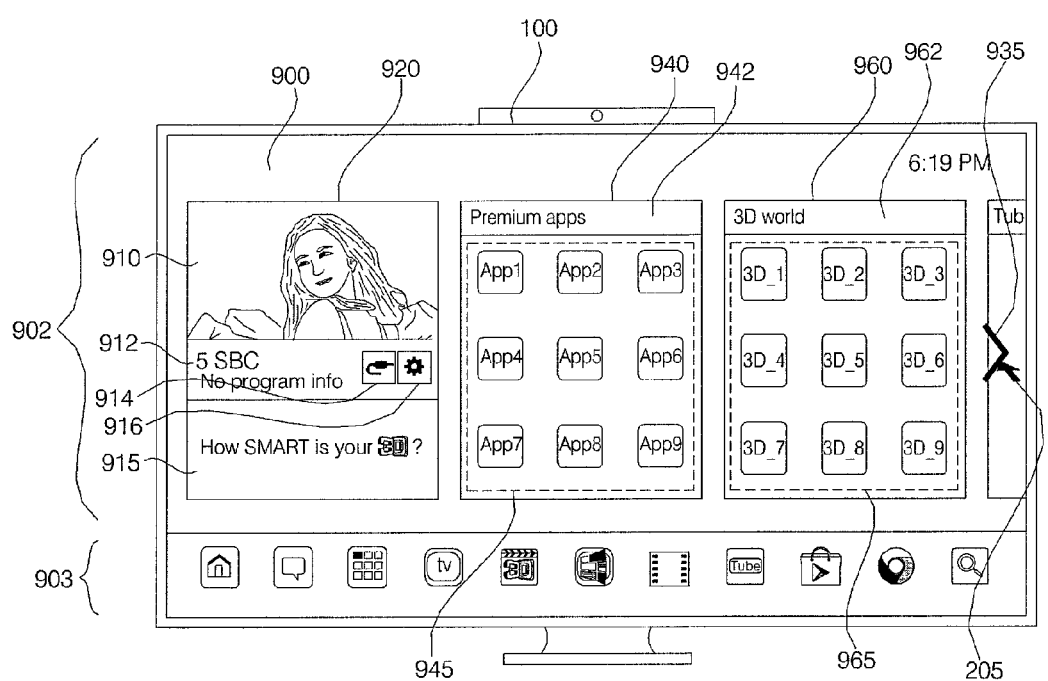
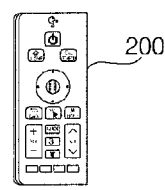

FIG. 20B
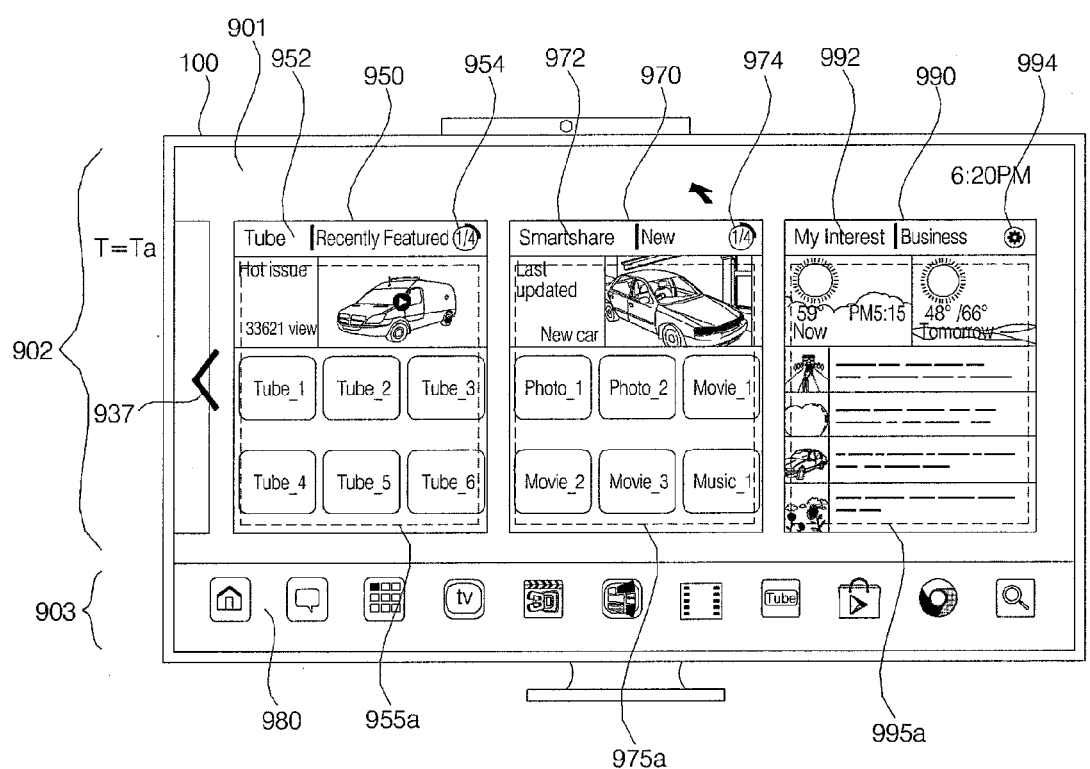
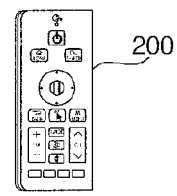

FIG. 20C
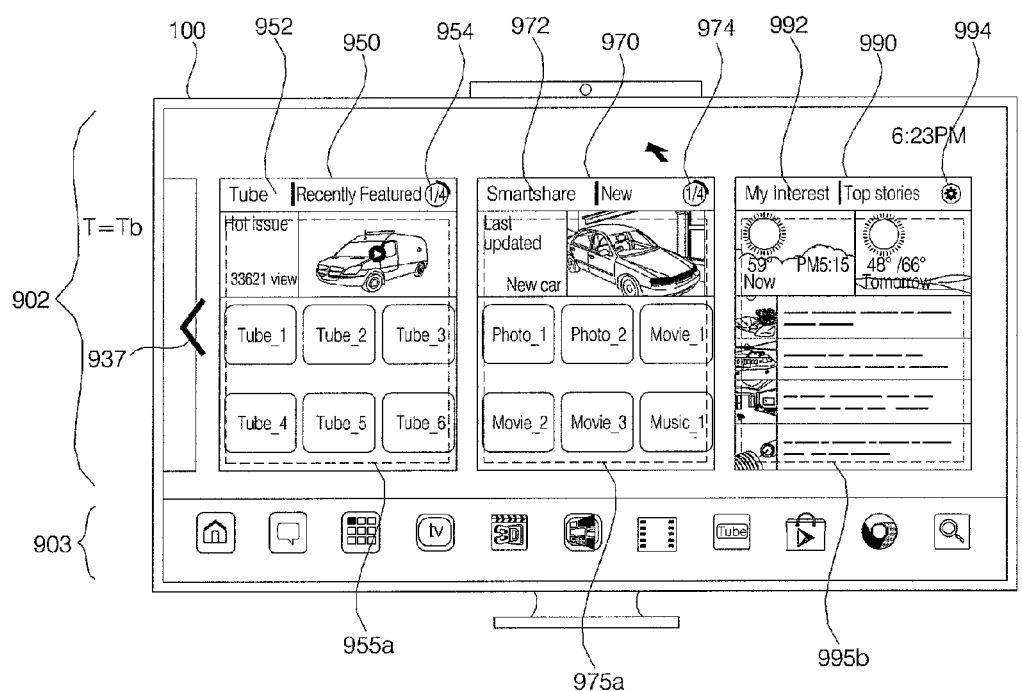
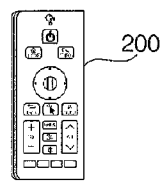

FIG. 20D
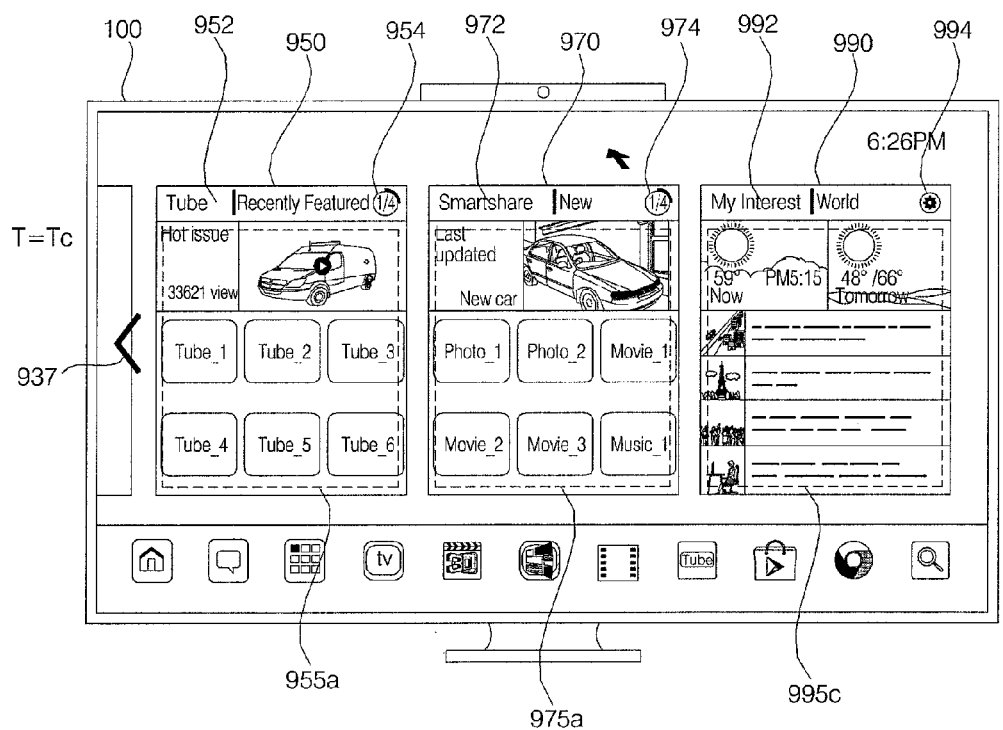
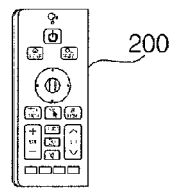

FIG. 21B
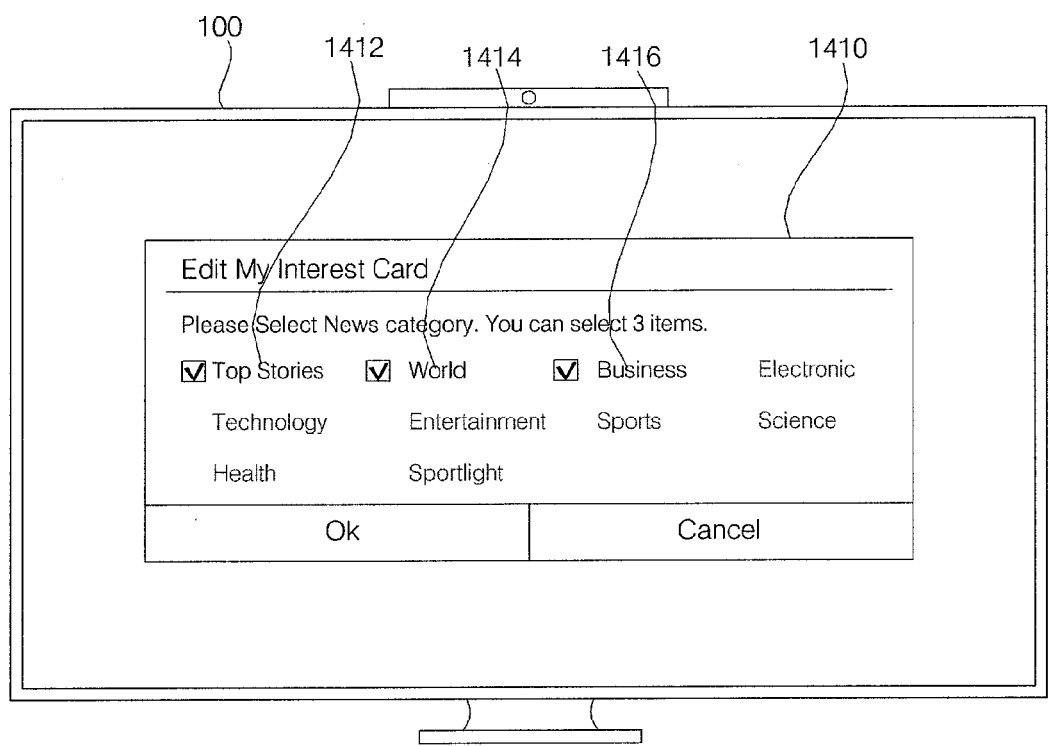
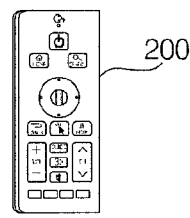

IMAGE DISPLAY APPARATUS AND METHOD FOR OPERATING THE SAME

CROSS-REFERENCE TO RELATED APPLICATION

This application claims the priority benefit of U.S. Provisional Application No. 61/756,971 filed on Jan. 25, 2013 in the USPTO and Korean Patent Application Nos. 10-2013-0011281, 10-2013-0011282, 10-2013-0011283, and 10-2013-0011284, all filed on Jan. 31, 2013 in the Korean Intellectual Property Office. The contents of all these applications are incorporated herein by reference.

BACKGROUND OF THE INVENTION

1. Field of the Invention

The present invention relates to an image display apparatus and a method for operating the same, and more particularly, to an image display apparatus and a method for operating the same, which are capable of increasing user convenience.

2. Description of the Related Art

An image display apparatus functions to display images to a user. A user can view a broadcast program using an image display apparatus. The image display apparatus can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting, such as robustness against noise, less data loss, ease of error correction, and the ability to provide clear, high-definition images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which are capable of increasing user convenience.

In accordance with an aspect of the present invention, the above and other objects can be accomplished by the provision of a method for operating an image display apparatus including displaying a home screen including at least one card object including a content list, displaying a dynamic screen on the home screen if dynamic screen display input is received, and moving and displaying the dynamic screen on the home screen if dynamic screen movement input is received.

In accordance with another aspect of the present invention, there is provided a method for operating an image display apparatus including displaying a home screen including at least one card object including a content list, and switching a first content list to a second content list and displaying the second content list if an object for switching a content list is selected in a state in which the first content list is displayed in a first card object of the home screen or if a predetermined time has been elapsed.

In accordance with another aspect of the present invention, there is provided an image display apparatus including a network interface configured to exchange data with a server, a display configured to display a home screen including at least one card object including a content list and to display a dynamic screen on the home screen if dynamic screen display input is received, and a controller configured to control the dynamic screen to be moved and displayed on the home screen if dynamic screen movement input is received.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a block diagram showing the internal configuration of the remote controller of FIG. 1;

FIGS. 9A to 14C are views referred to for describing various examples of the method for operating the image display apparatus of FIG. 8;

FIGS. 16A to 18E are views referred to for describing various examples of the method for operating the image display apparatus of FIG. 15;

FIGS. 20A to 21C are views referred to for describing various examples of the method for operating the image display apparatus of FIG. 19.

DETAILED DESCRIPTION OF THE PREFERRED EMBODIMENTS

Exemplary embodiments of the present invention will be described with reference to the attached drawings.

The terms "module" and "unit" attached to describe the names of components are used herein to help the understanding of the components and thus they should not be considered as having specific meanings or roles. Accordingly, the terms "module" and "unit" may be used interchangeably.

An image display apparatus described in the present specification is, for example, an intelligent image display apparatus including not only a broadcast reception function but also a computer support function and includes a more conveniently used interface, such as a handwriting type input device, a touchscreen or a 3D pointing device, by adding an Internet function while accurately performing the broadcast reception function. In addition, the image display apparatus is connected to the Internet or a computer by a wired or wireless Internet module so as to perform functions such as email, web browsing, banking or games. For such various functions, a standardized general-purpose operating system (OS) may be used.

Accordingly, the image display apparatus of the present invention may perform various user-friendly functions because various applications may be freely added to or deleted from a general-purpose OS kernel. For example, the image display apparatus of the present invention may be a smart TV.

Figure 1A:
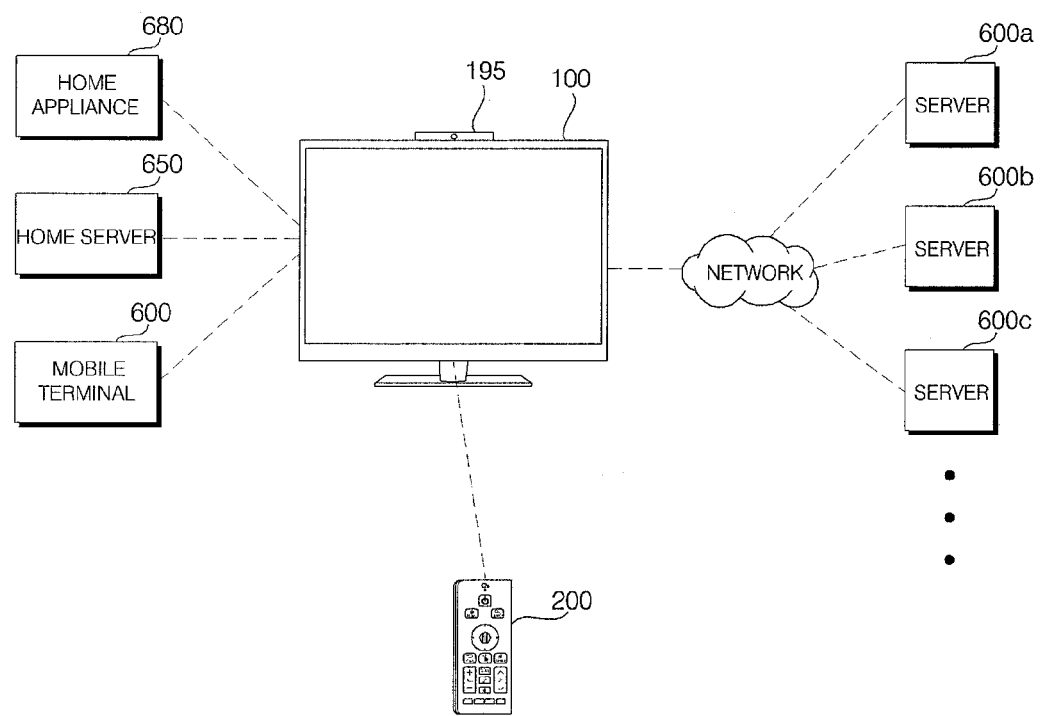
FIG. 1A is a diagram showing an image display apparatus according to an embodiment of the present invention.
Figure 1B:
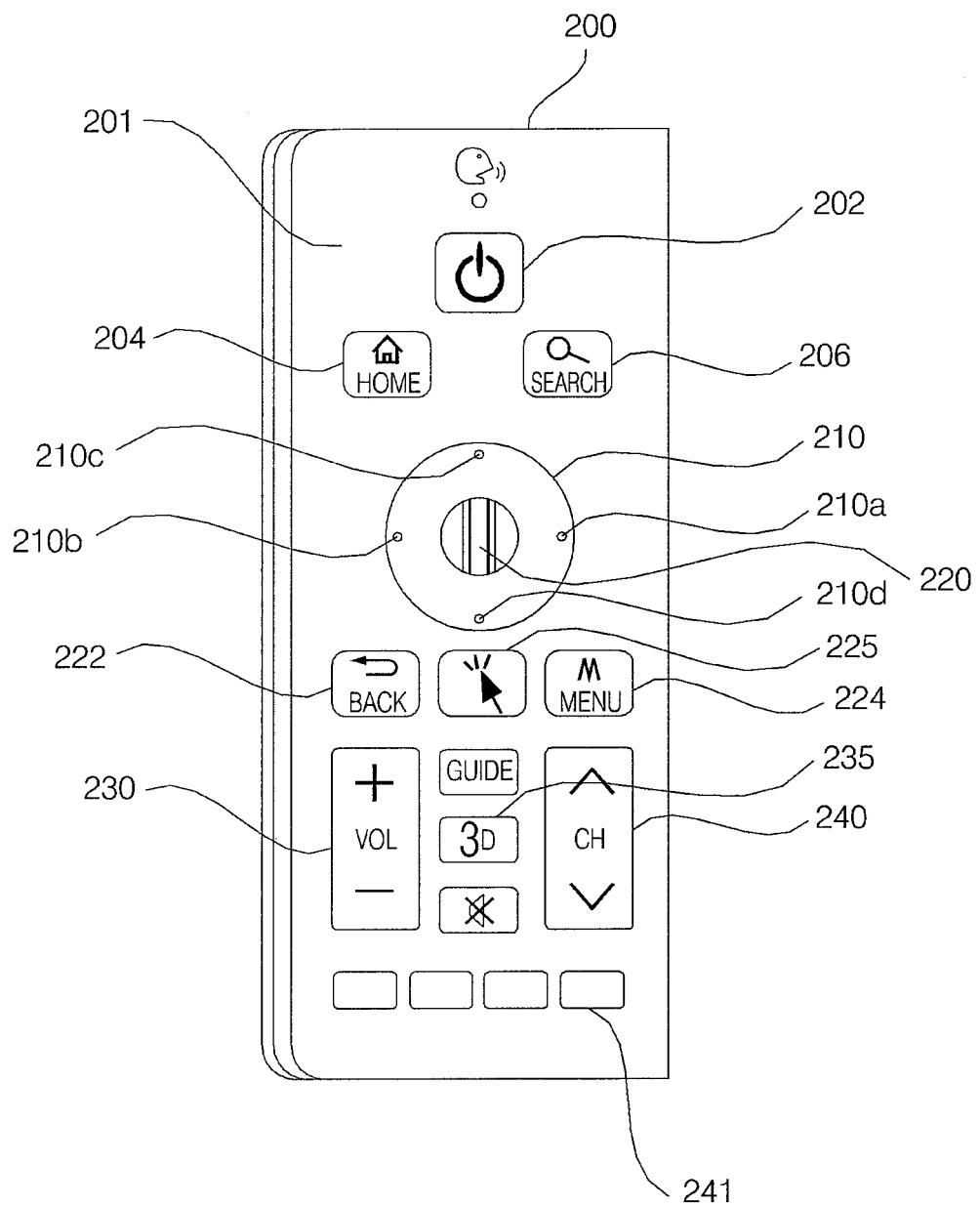
FIG. 1b is a diagram showing a first surface of a remote controller of FIG. 1A.

FIG. 1a is a diagram showing an image display apparatus according to an embodiment of the present invention;

Referring to FIG. 1a, the image display apparatus 100 according to the embodiment of the present invention displays an image and includes a display (180 of FIG. 1B). The image display apparatus 100 may include a camera 195 for capturing an image of a user.

Although a camera 195 is placed on an upper side of the image display apparatus 100 in FIG. 1a, the camera may be placed at various locations. Unlike FIG. 1a, the image display apparatus 100 and the camera may be mounted as separate devices.

The image display apparatus 100 may exchange data with an external device over a network.

The image display apparatus 100 may exchange data with adjacent external devices, such as a home appliance 670, a home server 650, a mobile terminal 600, etc. or may share predetermined content data with the adjacent external devices. The home appliance 670 may include a set-top box, audio equipment, a refrigerator, a cleaner, an air conditioner, a washing machine, a cooker, etc.

The image display apparatus 100 may exchange data with external servers 600a, 600b, 600c, . . . over a network 690. The external serves 600a, 600b, 600c, . . . may be content providers for providing a variety of content.

Unlike the figure, the image display apparatus 100 may exchange data with the mobile terminal 600 over the network 690.

The image display apparatus 100 may operate in correspondence with a remote control signal from a remote controller 200. The image display apparatus 100 and the remote controller 200 may exchange data through a pairing operation.

In particular, the image display apparatus 100 according to the embodiment of the present invention may display a pointer corresponding to movement of the remote controller 200 or display letters by pressing a letter key of the remote controller 200, by data exchange.

The image display apparatus 100 described in the present specification may include a TV receiver, a monitor, a projector, a laptop computer, a digital broadcast terminal, etc.

The image display apparatus 100 according to the embodiment of the present invention displays an image and may include a fixed image display apparatus or a mobile image display apparatus.

FIG. 1B is a diagram showing a first surface of a remote controller of FIG. 1a, and FIG. 10 is a diagram showing a second surface of the remote controller of FIG. 1a.

First, referring to FIG. 1B, operation keys such as a power key 202 may be placed on the first surface (front surface) 201 of the remote controller.

The various operation keys will now be described. The power key 202 is used to turn the image display apparatus 100 on/off. A home key 204 is used to display a home screen if the home screen of the image display apparatus 100 is set. A search key 206 may be used to display a search window on the image display apparatus 100 or to search by keyword.

Four-direction keys 210 are used to move a pointer or a cursor up, down, right and left and an up key 210c, a down key 210d, a left key 210b and a right key 210a may be integrally formed. A wheel key 220 may be placed in the center of the four-direction keys 210.

The wheel key 220 is used to move a screen or an item displayed on the image display apparatus 100. The wheel key 220 may move up and down and thus the screen or the item of the image display apparatus 100 may move up and down.

A back key 222 is used to move a screen or an item displayed on the image display apparatus 100 to a previous screen or a previous item. A menu key 224 is used to display a set menu of the image display apparatus 100. A pointer key 225 is used to display a pointer on the image display apparatus 100.

A volume key 230 is used to change a volume and a channel key 240 is used to switch a channel.

A 3D key 235 may be used to switch a two-dimensional (2D) image displayed on the image display apparatus 100 to a three-dimensional (3D) image or may be used to display a 3D image list which is able to be displayed on the image display apparatus 100.

A PIP key 241 is used to display a plurality of images on the image display apparatus 100. By manipulating the PIP key 241, a plurality of images may be displayed on the display 180 in a picture in picture (PIP) manner. Alternatively, a plurality of images may be arranged in parallel.

Any one of a plurality of images may float such that the location of the image is changed. In this case, a PIP image may be referred to as a dynamic screen image.

In the figure, a pointer key for displaying a pointer, a guide key for displaying a guide, a mute key, a color key, etc. are further displayed.

Figure 1C:
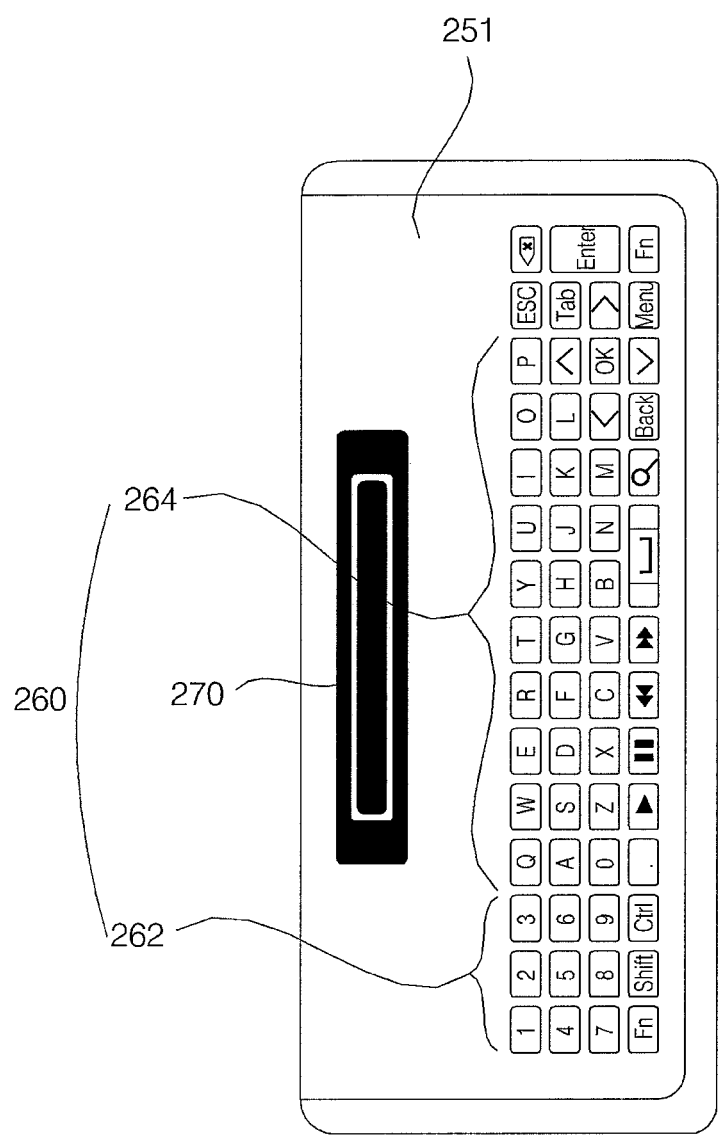
FIG. 1c is a diagram showing a second surface of the remote controller of FIG. 1A.

Next, referring to FIG. 1C, a second surface (back surface) 251 of the remote controller 200 may be opposite to the first surface (front surface) 201 of the remote controller 200. A letter key 260 and a display 270 may be placed on the second surface (back surface) 251 of the remote controller 200.

The letter key 260 may include a numeric key 262 and an alphabetic key 264. The letter key 260 may further include an enter key, a function key, a spacebar key, etc.

The display 270 may display letters input through the letter key 260.

If the letter key 260 is manipulated, the remote controller 200 transmits letter key information to the image display apparatus 100.

The remote controller 200 may transmit coordinate information corresponding to movement of the remote controller 200 to the image display apparatus 100. Thus, the pointer corresponding to the movement of the remote controller 200 may be displayed on the display of the image display apparatus. Since the pointer is moved according to the movement of the remote controller in a 3D space, the remote controller may be referred to as a 3D pointing device.

Figure 2:
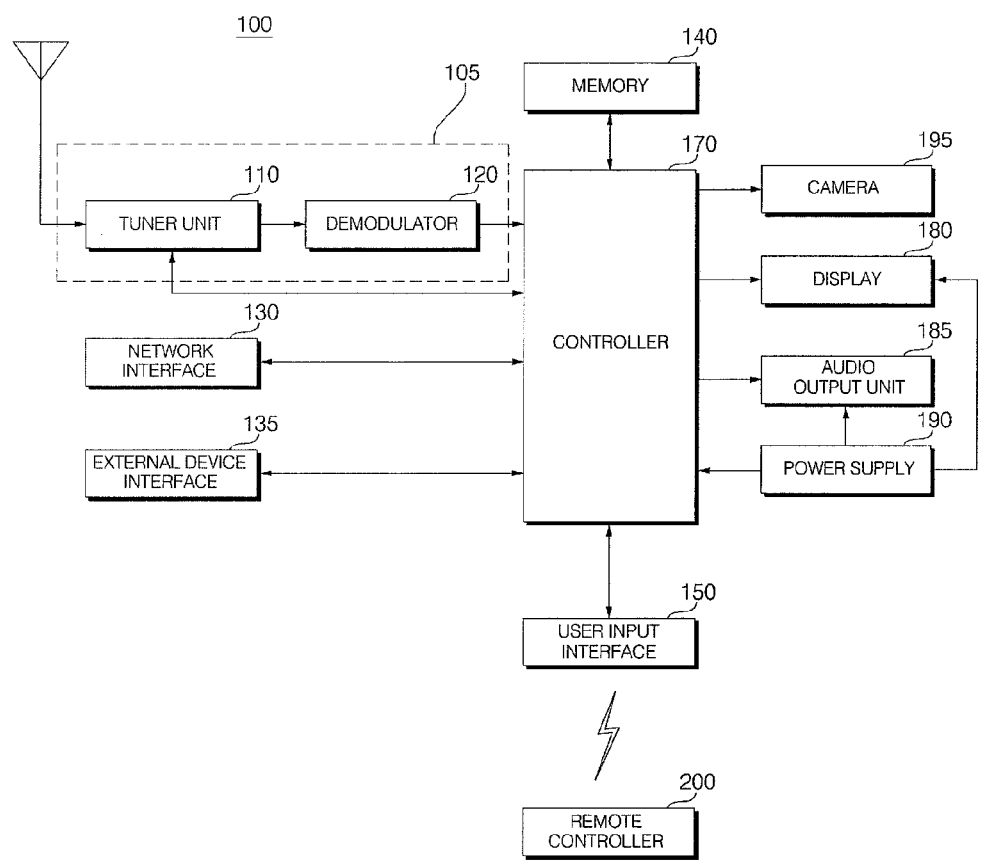
FIG. 2 is a block diagram showing the internal configuration of the image display apparatus of FIG. 1.

FIG. 2 is a block diagram showing the internal configuration of the image display apparatus of FIG. 1.

Referring to FIG. 2, the image display apparatus 100 according to the embodiment of the present invention includes a broadcast reception unit 105, a network interface 130, an external device interface 135, a memory 140, a user input interface 150, a controller 170, a display 180, an audio output unit 185, a power supply 190 and a camera 195. The broadcast reception unit 105 may include a tuner unit 110 and a demodulator 120. Alternatively, the broadcast reception unit 105 may further include a network interface 130.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 135 may connect an external device and the image display apparatus 100. For connection, the external device interface 135 may include an A/V Input/Output (I/O) unit (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit may include a universal serial bus (USB) port, a composite video banking sync (CVBS) port, a component port, a S-video port (analog), a Digital Visual Interface (DVI) port, a High Definition Multimedia Interface (HDMI) port, a Red, Green, Blue (RGB) port, a D-SUB port, etc. in order to provide audio and video signals received from the external device to the image display apparatus 100.

The external device interface 135 may be connected to various set-top boxes via at least one of the above-described various ports to perform transmit and receive data to and from the set-to boxes.

The network interface 130 serves as an interface between the image display apparatus 100 and a wired/wireless network such as the Internet. The network interface 130 may receive content or data provided by an Internet or content provider or a network operator over a network.

The network interface 130 may access a predetermined web page over a connected network or another network linked to the connected network. That is, the network interface 130 access a predetermined web page to transmit or receive data to or from a corresponding server. In addition, the network interface may receive content or data provided by a content provider or a network operator.

The network interface 130 may select and receive a desired application among applications opened to the public over a network.

The network interface 130 may include a wired communication unit (not shown) or a wireless communication unit (not shown).

The wireless communication unit may perform short-range wireless communication with another electronic apparatus. The image display apparatus 100 may be connected to another electronic apparatus over a network according to a communication standard such as Bluetooth, Radio Frequency Identification (RFID), InfraRed Data Association (IrDA), Ultra Wideband (UWB), ZigBee, Digital Living Network Alliance (DLNA), etc.

The memory 140 may store various programs necessary for the controller 170 to process and control signals, and may also store processed video, audio and data signals.

The memory 140 may temporarily store a video, audio and/or data signal received from the network interface 130 or the external device interface 135. The memory 140 may store information about a predetermined broadcast channel by the channel storage function of a channel map.

In addition, the memory 140 may store an application or an application list received from the network interface 130 or the external device interface 135.

The image display apparatus 100 may play a content file (a moving image file, a still image file, a music file, a text file, an application file, etc.) stored in the memory 140 back to be provided to a user.

While the memory 140 is shown in FIG. 1 as being configured separately from the controller 170, to which the present invention is not limited, the memory 140 may be incorporated into the controller 170.

The user input interface 150 transmits a signal input by the user to the controller 170 or transmits a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys (not shown), such as inputs of a power key, a channel key, and a volume key, and setting values, or provide the controller 170 with a user input signal received from a sensor unit (not shown) for sensing a user gesture, or transmit a signal received from the controller 170 to a sensor unit (not shown).

The controller 170 may demultiplex the stream signal received from the tuner unit 110, the demodulator 120, or the external device interface 135 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 2, the controller 170 may include a DEMUX, a video processor, etc., which will be described in detail later with reference to FIG. 3.

The controller 170 may control the overall operation of the image display apparatus 100. For example, the controller 170 controls the tuner unit 110 to tune to an RF signal corresponding to a channel selected by the user or a previously stored channel.

The controller 170 may control the image display apparatus 100 by a user command input through the user input interface 150 or an internal program. In particular, the controller may be connected to the network to download an application or application list desired by a user into the image display apparatus.

For example, the controller 170 controls the tuner unit 110 such that a signal of a channel selected according to a predetermined channel selection command received through the user input interface 150 is received, and processes the video, audio or data signal of the selected channel. The controller 170 may output the processed video or audio signal such as the channel information selected by the user through the display 180 or the audio output unit 185.

As another example, the controller 170 may output, through the display 180 or the audio output unit 185, a video signal or an audio signal from an external device, such as a camera or a camcorder, received through the external device interface 135, according to an external device image playback command received through the user input interface 150.

The controller 170 may control the display 180 to display images. The image displayed on the display 180 may be a Two-Dimensional (2D) or Three-Dimensional (3D) still or moving image.

The controller 170 may generate and display a predetermined object of an image displayed on the display 180 as a 3D object. For example, the object may be at least one of a screen of an accessed web site (newspaper, magazine, etc.), an electronic program guide (EPG), various menus, a widget, an icon, a still image, a moving image, text, etc.

The controller 170 recognizes the position of the user based on an image captured by a camera unit (not shown). For example, a distance (z-axis coordinate) between the user and the image display apparatus 100 may be detected. An x-axis coordinate and a y-axis coordinate in the display 180 corresponding to the position of the user may be detected.

If an application view menu item is selected, the controller 170 may control display of applications or a list of applications that are available in the image display apparatus or downloadable from an external network.

The controller 170 may control installation and execution of an application downloaded from the external network along with various user interfaces. Also, the controller 170 may control display of an image related to the executed application on the display 180, upon user selection.

The controller 170 may receive a user image captured by the camera 195. The controller may recognize the user based on the captured user image and control the recognized user to log in to the image display apparatus 100. The controller 170 may provide a service to each user who logs in to the image display apparatus.

Alternatively, the controller 170 may recognize a user gesture from a user image captured by the camera 195. In particular, the controller 170 may recognize the face and hand of the user from the captured image and recognize a specific gesture.

The display 180 converts a video signal, a data signal or an OSD signal processed by the controller 170 or a video signal and a data signal received by the external device interface 135 into RGB signals and generates a drive signal.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal from the controller 170 and output the received audio signal as sound.

The power supply 190 supplies power to the image display apparatus 100. Particularly, the power supply 190 may supply power to the controller 170 which may be implemented as a System On Chip (SOC), the display 180 for displaying an image, and the audio output unit 185 for outputting the audio signal.

For supplying power, the power supply 190 may include a converter (not shown) for converting Alternating Current (AC) into Direct Current (DC). If the display 180 is implemented as, for example, a liquid crystal panel having a plurality of backlight lamps, the power supply 190 may further include an inverter (not shown) capable of performing Pulse Width Modulation (PWM) for luminance change or dimming driving.

The camera 195 may capture an image of a user and transmit the captured image to the controller 170 of the image display apparatus 100. Although the number of cameras 195 is 1 in FIG. 1a, a plurality of cameras may be included. The camera 195 may be a 2D camera or a 3D camera.

The remote controller 200 transmits user input to the user input interface 150. For transmission of user input, the remote controller 200 may use various communication techniques such as RF communication, IR communication, Bluetooth, Ultra Wideband (UWB), and ZigBee.

In addition, the remote controller 200 may receive a video signal, an audio signal or a data signal from the user input interface 150. The remote controller 200 output the received signals visually, audibly or through vibrations based on the received video, audio or data signal.

The block diagram of the image display apparatus 100 illustrated in FIG. 2 is only exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike FIG. 2, the image display apparatus 100 may not include the tuner unit 110 and the demodulator 120 shown in FIG. 2 and may receive broadcast content via the network interface 130 or the external device interface 135 and play the broadcast content back.

Figure 3:
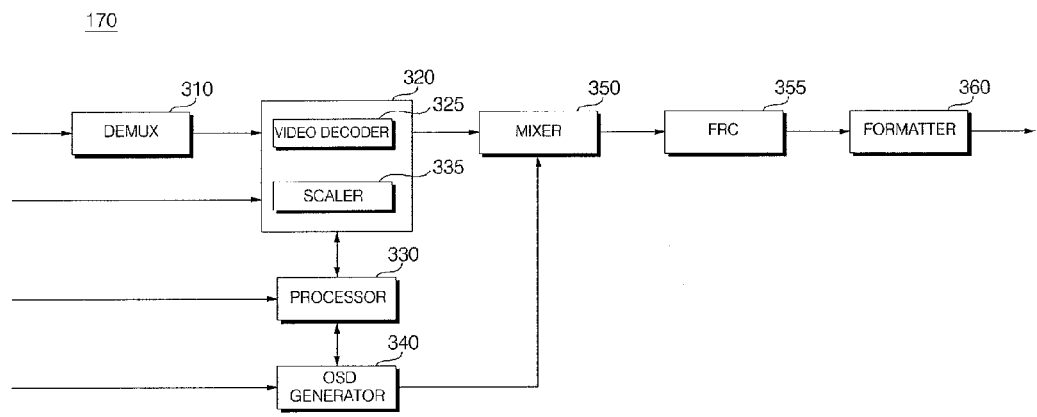
FIG. 3 is a block diagram showing the internal configuration of a controller of FIG. 2.

FIG. 3 is a block diagram showing the internal configuration of a controller of FIG. 2.

Referring to FIG. 3, the controller 170 according to the embodiment of the present invention may include a DEMUX 310, a video processor 320, a processor 330, an OSD generator 340, a mixer 350, a Frame Rate Converter (FRC) 355, and a formatter 360. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The video signal decoded by the video processor 320 is input to the mixer 350.

The processor 330 may control the overall operation of the image display apparatus 100 or the controller 170. For example, the processor 330 controls the tuner unit 110 to tune to an RF signal corresponding to a channel selected by the user or a previously stored channel.

The processor 330 may control the image display apparatus 100 by a user command received through the user input interface 150 or an internal program.

The processor 330 may control data transmission of the network interface 130 or the external device interface 135.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals or control signals. The OSD signal may include various data such as a User Interface (UI), a variety of menus, widgets, icons, etc.

The OSD generator 340 may generate a signal for displaying broadcast information based on a caption or EPG of a broadcast image.

The OSD generator 340 generates an OSD signal or a graphic signal and thus may be referred to as a graphics processing unit.

The mixer 350 may mix the decoded video signal processed by the video processor 320 with the OSD signal generated by the OSD generator 340. The mixed signal is provided to the formatter 360. By mixing the decoded broadcast image signal or the external input signal and the OSD signal, the OSD may be overlaid and displayed on the broadcast image or the OSD or the external input image.

The FRC 355 may change the frame rate of an input image. The FRC 355 may maintain the frame rate of the input image without frame rate conversion.

The formatter 360 changes the signal output from the FRC 355 to be suitable for the display 180. For example, the formatter 360 may convert a received signal into an RGB data signal and output the RGB data signal. The RGB data signal may be output in the form of a Low Voltage Differential Signal (LVDS) or mini-LVDS.

The formatter 360 may change the format of a 3D video signal or convert a 2D video signal into a 3D video signal.

The audio processor (not shown) of the controller 170 may process the demultiplexed audio signal. For audio signal processing, the audio processor may have various decoders.

The audio processor (not shown) of the controller 170 may also adjust the bass, treble or volume of the audio signal.

The data processor (not shown) of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

The block diagram of the controller 170 shown in FIG. 3 is exemplary. The components of the block diagrams may be integrated or omitted, or a new component may be added according to the specifications of the controller 170.

In particular, the FRC 355 and the formatter 360 may be included separately from the controller 170.

Figure 4:
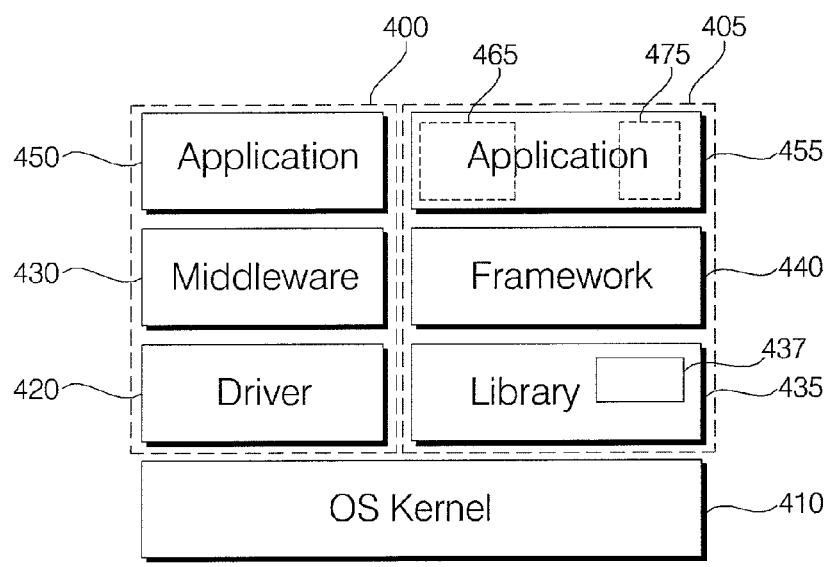
FIGS. 4 to 5 are diagrams showing various examples of a smart system platform structure in the image display apparatus of FIG. 2.
Figure 5:
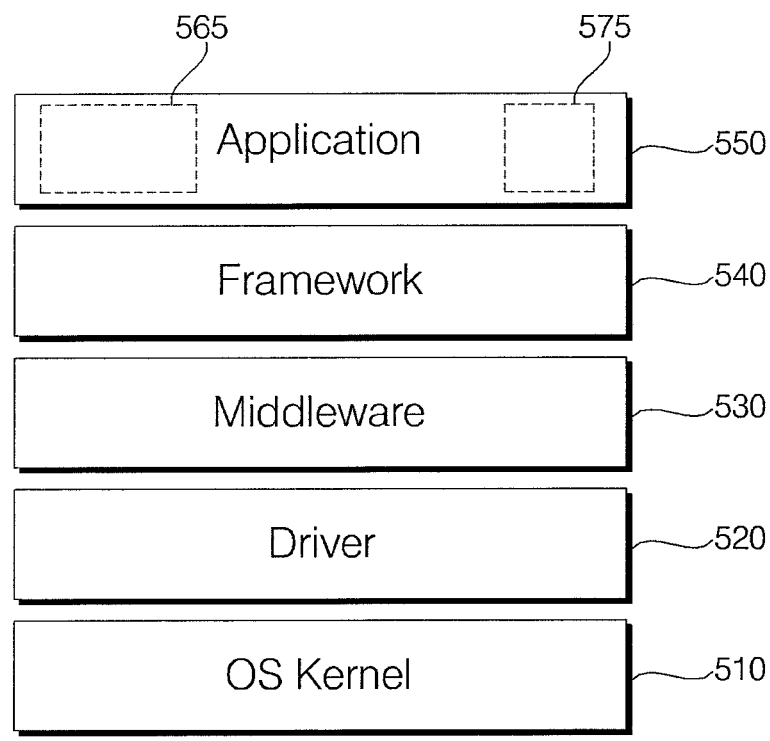

FIGS. 4 to 5 are diagrams showing various examples of a platform structure in the image display apparatus of FIG. 2.

The platform of the image display apparatus 100 according to the embodiment of the present invention may include OS based software in order to perform the above-described various operations.

First, referring to FIG. 4, the platform of the image display apparatus 100 according to an embodiment of the present invention is a separate type according to an exemplary embodiment of the present invention. The platform may be designed separately as a legacy system platform 400 and a smart system platform 405. An OS kernel 410 may be shared between the legacy system platform 400 and the smart system platform 405.

The legacy system platform 400 may include a driver 420, middleware 430, and an application layer 450 on the OS kernel 410. The smart system platform 405 may include a library 435, a framework 440, and an application layer 455 on the OS kernel 410.

The OS kernel 410 is a core of an operating system. When the image display apparatus 100 is driven, the OS kernel 410 may be responsible for at least one of hardware driver driving, security protection for hardware and processors in the image display apparatus 100, efficient management of system resources, memory management, hardware interfacing by hardware abstraction, multi-processing, and scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, and a memory driver.

The hardware drivers of the OS kernel 410 may be drivers for hardware devices within the OS kernel 410 and include a character device driver, a block device driver, and a network device driver. The block device driver may require a buffer for buffering data on a block basis, because data is transmitted on a block basis. The character device driver may not require a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel that can be implemented in other electronic devices.

The driver 420 is installed between the OS kernel 410 and the middleware 430. Along with the middleware 430, the driver 420 drives devices for operations of the application layer 450. For example, the driver 420 may include a driver(s) for a microcomputer, a display module, a graphics processing unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in interaction with the hardware drivers of the OS kernel 410.

In addition, the driver 420 may further include a driver for the remote controller 200, especially a below-described 3D pointing device. The driver for the 3D pointing device may reside in the OS kernel 410 or the middleware 430, instead of the driver 420.

The middleware 430 is located between the OS kernel 410 and the application layer 450. The middleware 430 may mediate between different hardware devices or different software programs, for data transmission and reception between the hardware devices or software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcast information-related middleware, and Digital Living Network Alliance (DLNA) middleware as peripheral device communication-related middleware.

The application layer 450 that resides on the middleware 430 in the legacy system platform 400 may include, for example, UI applications associated with various menus in the image display apparatus 100. The application layer 450 that resides on the middleware 430 may allow editing and updating over a network by user selection. With use of the application layer 450, the user may enter a desired menu among various UIs by manipulating the remote controller 200 during viewing of a broadcast program.

The application layer 450 in the legacy system platform 400 may further include at least one of a TV guide application, a Bluetooth application, a reservation application, a Digital Video Recorder (DVR) application, and a hotkey application.

In the smart system platform 405, the library 435 is located between the OS kernel 410 and the framework 440, forming the basis of the framework 440. For example, the library 435 may include a Secure Socket Layer (SSL) being a security-related library, WebKit being a Web engine-related library, c library (libc), and Media Framework being a media-related library such as specifying a video format and an audio format. The library 435 may be written in C or C++. Additionally, the library 435 may be accessible to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include support programs and programs for interconnection of different software components. For example, the framework 440 may include a resource manager, an activity manager related to activities of applications, a notification manager, and a content provider (CP) for abstracting common information between applications. This framework 440 may be written in Java.

The application layer 455 on top of the framework 440 includes a variety of programs that are executed and displayed in the image display apparatus 100. The application layer 455 may include, for example, a core application that has at least one of an e-mail, Short Message Service (SMS), calendar, map, and browser. Function may be provided. The application layer 455 may be written in Java.

In the application layer 455, applications may be categorized into user-undeletable applications 465 stored in the image display apparatus 100 and user-installable or user-deletable applications 475 that are downloaded from an external device or a network and stored in the image display apparatus 100.

With the applications of the application layer 455, a variety of functions may be performed by network access, including Internet telephony, VoD, Web album, Social Networking Service (SNS), Location-Based Service (LBS), map service, Web browsing, and application search. In addition, the user may enjoy games and manage schedules using applications.

Referring to FIG. 5, a platform for the image display apparatus 100 according to another embodiment of the present invention is an integrated type platform. The integrated type platform may include an OS kernel 510, a driver 520, middleware 530, a framework 540, and an application layer 550.

Compared to the separate-type platform illustrated in FIG. 4, the integrated type platform of FIG. 5 is characterized by the absence of the library 435 and the application layer 550 being an integrated layer. The driver 520 and the framework 540 correspond to the driver 420 and the framework 440 of FIG. 4, respectively.

The library 435 of FIG. 4 may be incorporated into the middleware 530. That is, the middleware 530 may include both the legacy system middleware and the image display system middleware. As described above, the legacy system middleware includes MHEG or ACAP as data broadcasting-related middleware, PSIP or SI middleware as broadcast information-related middleware, and DLNA middleware as peripheral device communication-related middleware, whereas the image display system middleware includes SSL as a security-related library, WebKit as a Web engine-related library WebKit, libc, and Media Framework as a media-related library. The middleware 530 may further include the above-described runtime.

The application layer 550 may include menu-related applications, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus 100 and user-installable or user-deletable applications 575 that are downloaded from an external device or a network and stored in the image display apparatus 100.

The platforms illustrated in FIGS. 4 and 5 may be general-purpose ones that can be implemented in many other electronic devices as well as in image display apparatuses.

The platforms illustrated in FIGS. 4 and 5 may be loaded on the memory 140, the controller 170, or any other processor (not shown).

Figure 6A:
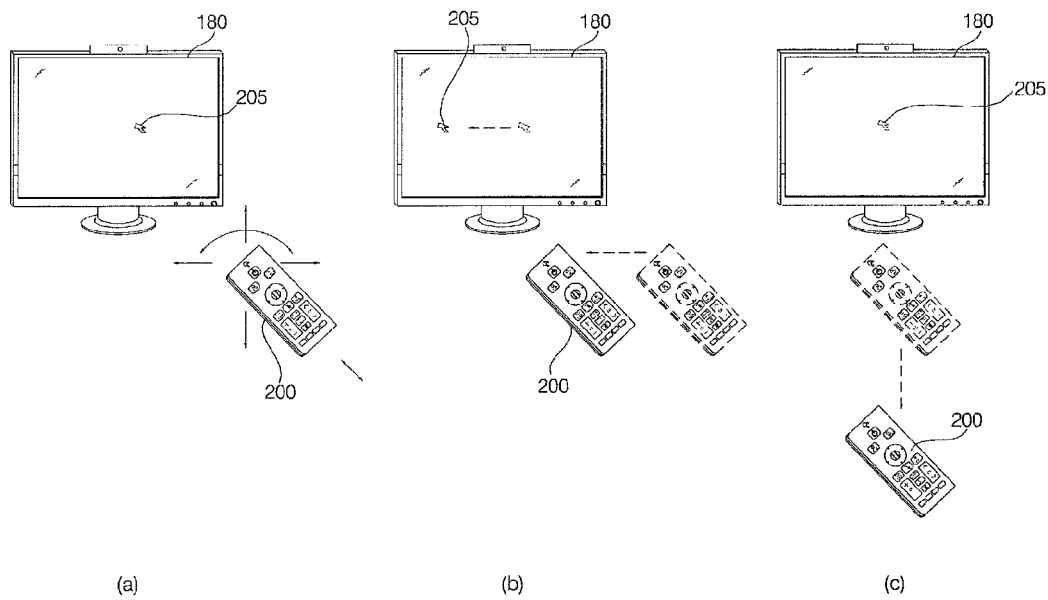
FIG. 6A is a diagram showing an operating method using the first surface of the remote controller of FIG. 1b.

FIG. 6A is a diagram showing an operating method using the first surface of the remote controller of FIG. 1B.

FIG. 6A shows the case in which the pointer 205 is displayed in correspondence with movement of the remote controller 200 in a state in which the first surface 201 of the remote controller 200 is upturned.

First, FIG. 6A(a) shows the case in which the pointer 205 is displayed in correspondence with the remote controller 200 at a predetermined position of the display 180.

The user may move the remote controller 200 up and down, side to side (FIG. 6A(b)), and back and forth (FIG. 6A(c)). The pointer 205 displayed on the display 180 of the image display apparatus moves in accordance with the movement of the remote controller 200. In this context, the remote controller 200 may be referred to as a pointing device or a 3D pointing device.

Referring to FIG. 6A(b), if the user moves the remote controller 200 to the left, the pointer 205 displayed on the display 180 of the image display apparatus moves to the left accordingly.

Information about the movement of the remote controller 200 sensed by the sensor of the remote controller 200 is transmitted to the image display apparatus. The image display apparatus 100 may calculate the coordinates of the pointer 205 from the information about the movement of the remote controller 200. Then, the image display apparatus 100 may display the pointer 205 at the calculated coordinates.

Referring to FIG. 6A(c), while pressing a predetermined button of the remote controller 200, the user moves the remote controller 200 away from the display 180. Then, a selection area corresponding to the pointer 205 may be zoomed in upon and enlarged on the display 180. On the contrary, if the user moves the remote controller 200 toward the display 180, the selection area corresponding to the pointer 205 is zoomed out and thus contracted on the display 180. Alternatively, when the remote controller 200 moves away from the display 180, the selection area may be zoomed out and when the remote controller 200 approaches the display 180, the selection area may be zoomed in on.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 6B:
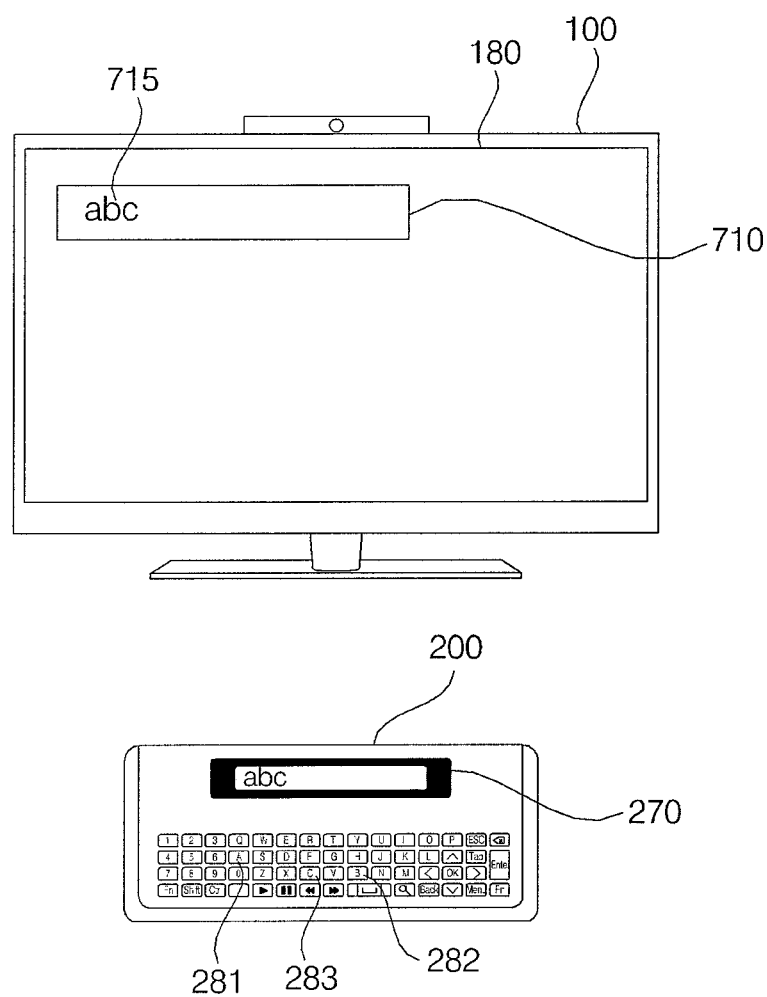
FIG. 6b is a diagram showing an operating method using the second surface of the remote controller of FIG. 1c.

FIG. 6B is a diagram showing an operating method using the second surface of the remote controller of FIG. 1C.

FIG. 6B shows the case in which the letter key of the remote controller 200 is manipulated in a state in which the second surface 251 of the remote controller 200 is upturned and the first surface 201 is downturned.

For example, if a first alphabetic key 281, a second alphabetic key 282 and a third alphabetic key 283 of the letter key are sequentially manipulated, the remote controller 200 transmits the key information corresponding thereto to the image display apparatus 100. Then, the image display apparatus may display the corresponding characters "abc" 715 in a display window 710.

The corresponding characters "abc" may also be displayed on the display 270 of the remote controller 200.

FIG. 7 is a block diagram of the remote controller illustrated in FIG. 1.

Referring to FIG. 7, the remote controller 200 may include a radio transceiver 820, a user input portion 830, a sensor portion 840, an output portion 850, a power supply 860, a memory 870, and a controller 880.

The radio transceiver 820 transmits and receives signals to and from any one of the image display apparatuses according to the embodiments of the present invention. Among the image display apparatuses according to the embodiments of the present invention, for example, one image display apparatus 100 will be described.

In accordance with the exemplary embodiment of the present invention, the radio transceiver 820 may be provided with an RF module 821 for transmitting and receiving signals to and from the image display apparatus 100 according to an RF communication standard. Additionally, the radio transceiver 820 may include an IR module 823 for transmitting and receiving signals to and from the image display apparatus 100 according to an IR communication standard.

In the present embodiment, the remote controller 200 may transmit information about movement of the remote controller 200 to the image display apparatus 100 via the RF module 821.

The remote controller 200 may receive the signal from the image display apparatus 100 via the RF module 821. The remote controller 200 may transmit commands associated with power on/off, channel switching, volume change, etc. to the image display apparatus 100 through the IR module 823.

In the present embodiment, the user input portion 830 may include an operation key input portion 832 for performing operation key input and a letter key input portion 834 for performing letter key input.

The operation key input portion 832 may include various operation keys placed on the front surface 201 of the remote controller 200 as described with reference to FIG. 1B. The operation key input portion 832 may include, for example, the power key 202, the home key 204, the search key 206, the four-direction key 210, the wheel key 222, the back key 222, the menu key 224, the volume key 230, the 3D key 235, the channel key 240, etc.

The letter key input portion 834 may include various letter keys placed on the back surface 251 of the remote controller 200 as described with reference to FIG. 1B. The letter key input portion 834 may include, for example, the numeric key 262, the alphabetic key 264, etc.

The user may enter a command for remotely controlling the image display apparatus 100 to the remote controller 200 by manipulating the user input portion 830. If the user input portion 230 includes hard keys, the user may enter commands related to the image display apparatus 100 to the remote controller 200 by pushing the hard keys. If the user input portion 230 is provided with a touchscreen, the user may enter commands related to the image display apparatus 100 to the remote controller 200 by touching soft keys on the touchscreen. Additionally, the user input portion 830 may have a variety of input means which may be manipulated by the user, such as a scroll key, a jog key, etc., to which the present invention is not limited.

The sensor portion 840 may sense and output motion information of the remote controller. The sensor portion 840 may include a gyro sensor 841 or an acceleration sensor 843.

The gyro sensor 841 may sense information about movement of the remote controller 200. For example, the gyro sensor 841 may sense information about movement of the remote controller 200 along x, y and z axes.

The acceleration sensor 843 may sense information about the velocity of the remote controller 200. For example, the acceleration sensor 843 may sense information about the speed of the remote controller 200 along x, y and z axes.

The sensor portion 840 may further include a distance measurement sensor for sensing a distance from the display 180.

The motion information output from the sensor portion 840 may include the information about movement of the remote controller 200 from the gyro sensor 841 and the information about the speed of the remote controller 200 from the acceleration sensor 843 and further include the distance information.

The output portion 850 may output a video or audio signal corresponding to manipulation of the user input portion 830 or a signal transmitted by the image display apparatus 100. The user may be aware from the output portion 850 as to whether the user input portion 830 has been manipulated or the image display apparatus 100 has been controlled.

For example, the output portion 850 may include a Light Emitting Diode (LED) module 851 for illuminating when the user input portion 830 has been manipulated or a signal is transmitted to or received from the image display apparatus 100 through the radio transceiver 820, a vibration module 853 for generating vibrations, an audio output module 855 for outputting audio, or a display module 857 for outputting video.

The power supply 860 supplies power to the remote controller 200. When the remote controller 200 is kept stationary for a predetermined time, the power supply 860 blocks power from the remote controller 200, thereby preventing waste of power. When a predetermined key of the remote controller 200 is manipulated, the power supply 860 may resume power supply.

The memory 870 may store a plurality of types of programs required for control or operation of the remote controller 200, or application data. When the remote controller 200 transmits and receives signals to and from the image display apparatus 100 wirelessly through the RF module 821, the remote controller 200 and the image display apparatus 100 perform signal transmission and reception in a predetermined frequency band. The controller 880 of the remote controller 200 may store information about the frequency band in which to wirelessly transmit and receive signals to and from the image display apparatus 100 paired with the remote controller 200 in the memory 870 and refer to the information.

The controller 880 provides overall control to the remote controller 200.

The controller 880 may transmit a signal corresponding to predetermined key manipulation on the user input portion 830 or a signal corresponding to an movement of the remote controller 200 sensed by the sensor portion 840 to the image display apparatus 100 through the radio transceiver 820.

The user input interface 150 of the image display apparatus 100 receives key manipulation information or motion information. The user input interface 150 may have a radio transceiver 820.

The radio transceiver 811 may include an RF module 812 for performing RF communication with the remote controller 200 and an IR module 813 for performing IR communication with the remote controller 200.

The user input interface 150 may further include coordinate calculator 815 for calculating the coordinates of the pointer using information corresponding to movement of the remote controller 200.

The coordinates of the pointer may be calculated by the controller 170 instead of the coordinate calculator 815. For calculation of the coordinates of the pointer, the user input interface 150 may send the information corresponding to movement of the remote controller 200 to the controller 170.

Figure 8:
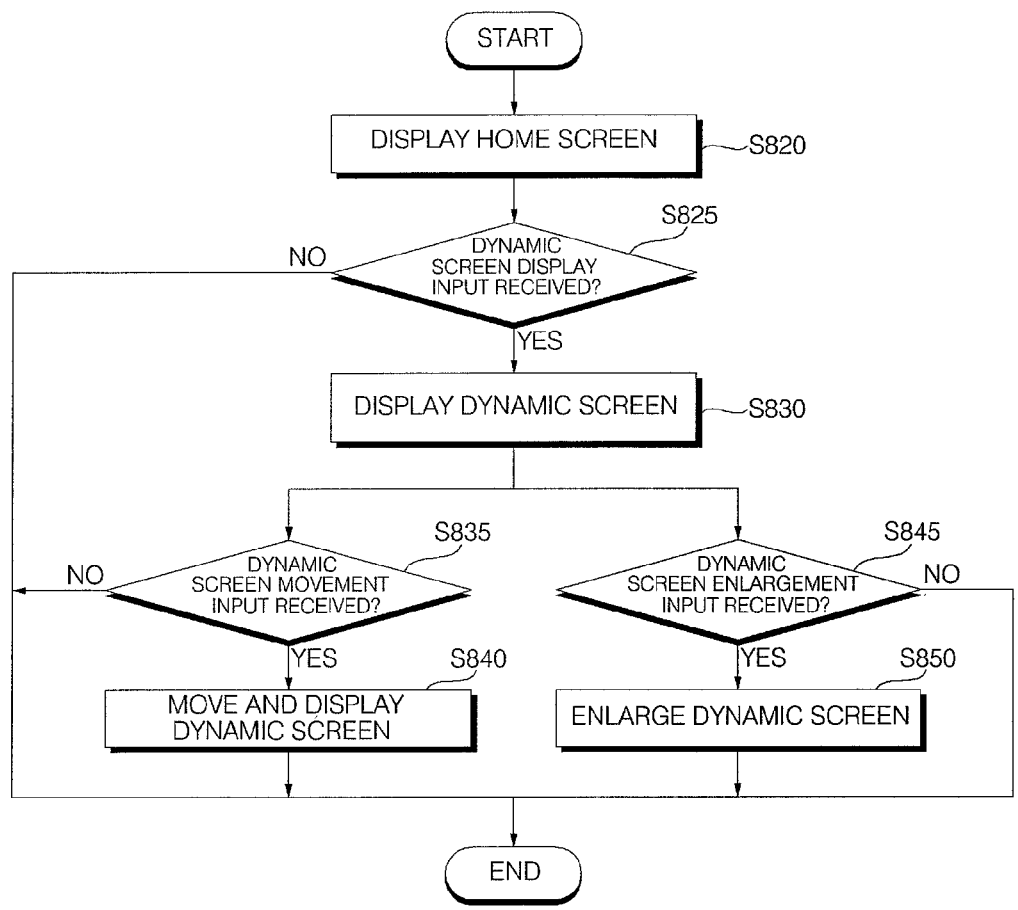
FIG. 8 is a flowchart illustrating a method for operating an image display apparatus according to an embodiment of the present invention.

FIG. 8 is a flowchart illustrating a method for operating an image display apparatus according to an embodiment of the present invention, and FIGS. 9A to 14B are views referred to for describing various examples of the method for operating the image display apparatus of FIG. 8.

Referring to FIG. 8, the image display apparatus 100 displays a home screen (S820).

If a home screen is set to be displayed when the image display apparatus 100 is powered on, the home screen may be automatically displayed when the image display apparatus 100 is powered on. Alternatively, if home screen display input is received based on the remote controller 200, a local key (not shown), user voice, a user gesture, etc., the controller 170 may display the home screen on the display 180.

FIG. 9A shows an example of a home screen 900 of an image display apparatus.

The home screen 900 may include a dashboard area 902 including card objects each including content and a launcher bar area 903 including frequently used application items.

Movable, replaceable, switchable card objects may be placed in the dashboard area 902. An object (not shown) indicating a logged-in user and time information may be displayed in the dashboard area 902.

FIG. 9A shows a live TV card object 920, a premium apps card object 940 and a 3D world card object 960 as an example of the card objects.

FIG. 9B shows another example of card objects. In FIG. 9A, if a screen switching object 935 is selected to switch a screen, a home screen 901 for displaying a tube card object 950, a smart share card object 970, a my interest card object 990 may be displayed in the dashboard area 902.

A live broadcast image 910 may be displayed in the live TV card object 920. In addition, live broadcast information 912, an external input object 914 capable of selecting external input, a settings object 916 for setting the image display apparatus and an advertisement image 915 may be further displayed.

The live broadcast image 910 may be a broadcast image extracted from a live broadcast signal received by the above-described broadcast reception unit 105. In particular, the live broadcast signal may be received through the tuner unit 110 of the broadcast reception unit 105 or the network interface 130.

Broadcast information 912 related to a live broadcast program may be program guide information of a broadcast signal or broadcast information separately received from a broadcast station server or another server over a network.

If the external input object 914 capable of selecting external input is selected, a screen for selecting an external input image received through an HDMI port, a VOD port, a component port, an RGB port or an antenna port among various input ports of the image display apparatus 100 may be displayed.

If the settings object 916 for setting the image display apparatus is selected, a settings screen for setting the image display apparatus may be displayed.

The advertisement image 915 may be based on an advertisement included in a broadcast signal, an advertisement provided by a network provider for providing a network to the image display apparatus 100 or an advertisement provided by a broadcast station for providing a broadcast image to the image display apparatus 100.

The premium apps card object 940 may include a card object name 942 and a content list 945. In particular, the content list 945 may include content items provided by a manufacturer of the image display apparatus 100. In the figure, application items are shown as content items and are installed in the image display apparatus 100 in advance. If any one application item of the content list 945 is selected, an application corresponding to the application item may be executed and a screen on which the application is executed may be displayed on the display 180.

Unlike the figure, content items other than the application items may be displayed.

The content items and, more particularly, the application items, of the premium apps card object 940 may be displayed to be distinguished from other application items when the overall application list is displayed.

The 3D world card object 960 may include a card object name 962 and a content list 965. In particular, the content list 965 may include 3D content items. The 3D content items may be shortcut items for 3D content execution. If any one 3D content item of the content list 945 is selected, 3D content corresponding to the 3D content item is played back and a screen on which the 3D content may be played back may be displayed on the display 180.

Although three card objects 920, 940 and 960 are shown in FIG. 9A, if an additional card object is further present, a portion of the additional card object may be displayed on the display 180 as shown in FIG. 9A. Therefore, the user can be intuitively aware that the additional card object to be searched for is present.

The tube card object 950 of FIG. 9B may include a card object name 952, an object 954 indicating content list switching and a content list 955a corresponding to any one subcategory.

In particular, the content list 955a may include content items stored in a server managed by a video provider.

In order to display predetermined content items among a plurality of content items stored in the server managed by the video provider in the tube card object 950, subcategories associated with genre, date, region, age and gender may be set. Content lists may be separately configured according to such subcategories.

The content list of the tube card object 950 shown in FIG. 9B may be a content list 955a including recently featured items. That is, a first content list corresponding to a first subcategory may be displayed.

If the object 954 indicating content list switching is selected, the content list of the tube card object 950 may be a content list including most viewed items, a content list including trending video items or a content list including 3D content items.

The smart share card object 970 of FIG. 9B may include a card object name 972, an object 974 indicating content list switching and a content list 975a corresponding to any one subcategory.

In particular, the content list 975a may be a content list including content items stored in an adjacent electronic apparatus.

In order to display predetermined content items among a plurality of content items stored in the adjacent electronic apparatus in the smart share card object 970, subcategories associated with genre, date, etc. may be set. Content lists may be separately configured according to such subcategories.

The content list of the smart share card object 970 shown in FIG. 9B is a content list 975a including new content items.

If the object 974 indicating content list switching is selected, the content list of the smart share card object 970 may be a content list including movie content items, a content list including photo content items or a content list including music content items.

The my interest card object 990 of FIG. 9B may include a card object name 992, an object 994 for setting interesting content and a content list 995a corresponding to any one interesting item.

In particular, the content list 995a may be a content list including content items provided by a specific server.

In order to display predetermined content items among a plurality of content items provided by the specific server in the my interest card object 990, subcategories associated with genre, date, etc. may be set. Content lists may be separately configured according to such subcategories.

The content list of the my interest card object 990 shown in FIG. 9B is a content list 995a including world news items.

If top stories and business items are further set in addition to the world news items by selection of the object 994 for setting interesting content, the content list displayed in the object 994 for setting interesting content may be a content list including world news items, a content list including top stories news items or a content list including business news items.

The launcher bar area 903 may include an application list 980 including frequently used application items.

The application list 980 of the launcher bar area 903 may be displayed without change when the home screen is switched, for example, when the home screen 900 of FIG. 9A is switched to the home screen of FIG. 9B.

Figure 9C:
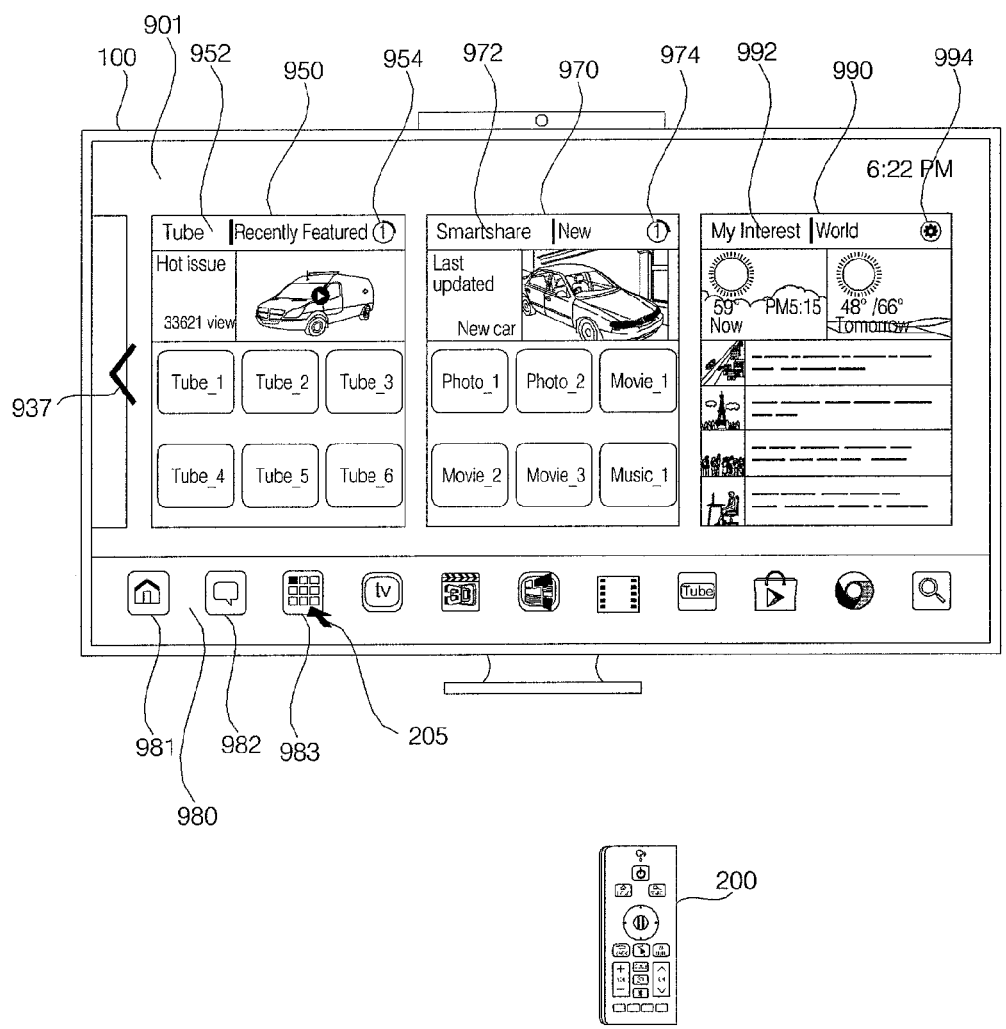

FIG. 9C shows the case in which, as application items displayed in the launcher bar area 903 of the home screen 901, a widget item 981, a notification item 982, an application full view item 983, a TV item, a 3D item, a primetime (TV & movie) item, a movie playback item, a video item, an application store item, a web item, a search item, etc. are sequentially included from the left to the right.

Some items may be edited or deleted or the other items may not be edited or deleted.

For example, the video item, the application store item, the web item, the search item, etc. may not be deleted and the TV item, the 3D item, etc. may be edited or deleted.

FIG. 9C shows the case in which the application full view item 983 in the application list displayed in the launcher bar area 903 of the home screen 900 is selected based on the pointer 205 displayed in correspondence with movement of the remote controller 200.

The application list screen 986 including a plurality of application items may be displayed on the image display apparatus 100 as a full screen as shown in FIG. 9D.

At this time, if an additional application item to be displayed is further present, a portion of the additional application item to be displayed may be displayed on the display 180. In FIG. 9A, the portion of the additional application item to be displayed is displayed in a lower region of the application list screen 986. Therefore, the user can be intuitively aware that the additional application item to be searched for is present.

Unlike the figure, the portion of the additional application item to be displayed may be displayed in a right region of the application list screen 986.

Selection, focusing, etc. of the application item may be changed by direction key input of the remote controller 200 in addition to the pointer based on movement of the remote controller 200.

In the figure, a cursor 988 is located on a predetermined application item according to direction key input of the remote controller 200. If direction key input of the remote controller 200 is received, the pointer based on movement of the remote controller 200 may not be displayed.

For screen movement, a scroll bar (not shown) may be described in one region of the display.

Next, FIG. 9E shows an application list screen 987 according to screen movement. If screen downward-movement input is received on the application list screen 986 of FIG. 9D, the application list screen 987 of FIG. 9E may be displayed. Screen movement input may be pointer input, direction key input or scroll bar input, etc. In the figure, the cursor 989 is located on a predetermined application item according to the direction key input of the remote controller 200.

After step 820 (S820) of FIG. 8, that is, after home screen display, the following steps may be performed.

The image display apparatus 100 determines whether dynamic screen display input is received (S825) and, if so, displays a dynamic screen (S830).

The image display apparatus 100 determines whether dynamic screen movement input is received in a state of displaying the dynamic screen (S835). If so, the dynamic screen may be moved and displayed (S840).

After step 830 (S830), the image display apparatus 100 determines whether dynamic screen enlargement input is received in a state of displaying the dynamic screen (S845). If so, the dynamic screen may be enlarged and displayed (S850).

In order to display the dynamic screen in a state of displaying the home screen, a PIP key 241 of the remote controller 200 may be manipulated.

The dynamic screen described in the present specification is a screen which may be actively moved on a display screen and may include, for example, a broadcast image screen or a widget screen. Hereinafter, the broadcast image screen will be focused upon as the dynamic screen.

For example, if the user who has viewed card objects 950, 970 and 990 wishes to view a live broadcast image on the home screen 901 on which the live broadcast image 910 is not displayed and then manipulates the PIP key 241 of the remote controller 200, the live broadcast image 1010 may be displayed as shown in FIG. 10A.

The live broadcast image 1010 may be a broadcast image of the same channel as the live broadcast image 910 displayed on a previous home screen 900 as shown in FIG. 9A. Then, the user can view a desired live broadcast image without switching the home screen.

The live broadcast image 1010 is preferably displayed in a region other than an important information display region on the displayed screen. For example, as shown in FIG. 10A, the live broadcast image 1010 is preferably displayed in a region other than a my interest card object 990 in which a content list automatically updated at a predetermined time interval is displayed.

Alternatively, the live broadcast image 1010 may be displayed to overlap a card object, the frequency of use of which is smallest, the number of times of use of which is smallest or the use time of which is smallest, among a plurality of card objects. That is, since the live broadcast image 1010 may be displayed to overlap a plurality of card objects having lowest importance, the user can view a content list, in which the user has interest, without interruption.

Alternatively, if the user arranges the pointer 205 in a region of the image display apparatus 100 using the remote controller 200, the live broadcast image 1010 may be arranged in the vicinity of that region.

Alternatively, if the user arranges the pointer 205 in a region of the image display apparatus 100 using the remote controller 200, since the user may have interest in that region, the live broadcast image 1010 may be arranged in a region other than that region.

FIG. 10A shows the case in which the live broadcast image 1010 is displayed to overlap the content list in a tube card object 950 if the PIP key 241 of the remote controller 200 is manipulated in a state in which the pointer 205 is displayed in the launcher bar area 903.

The live broadcast image 1010 displayed on the home screen may be displayed on the home screen in a state in which the live broadcast image is partially transparent. Accordingly, no region of the home screen is obscured.

Unlike the figure, the live broadcast image may be displayed between card objects or above card objects so as not to obscure the card objects of the home screen. The size of the displayed live broadcast image may be less than that of the live broadcast image of FIG. 10A. That is, the size of the live broadcast image may be changed according to the size of the empty space of the screen.

If 2D to 3D switching input is received in a state in which the live broadcast image 1010 of FIG. 10A is displayed on the home screen, the controller 170 of the image display apparatus 100 may switch the displayed image to a 3D image. Depths may be applied to objects such that the user perceives the objects as protruding. At this time, the depth of the live broadcast image may be set to be largest, such that the live broadcast image appears as protruding from the other objects.

Figure 10B:
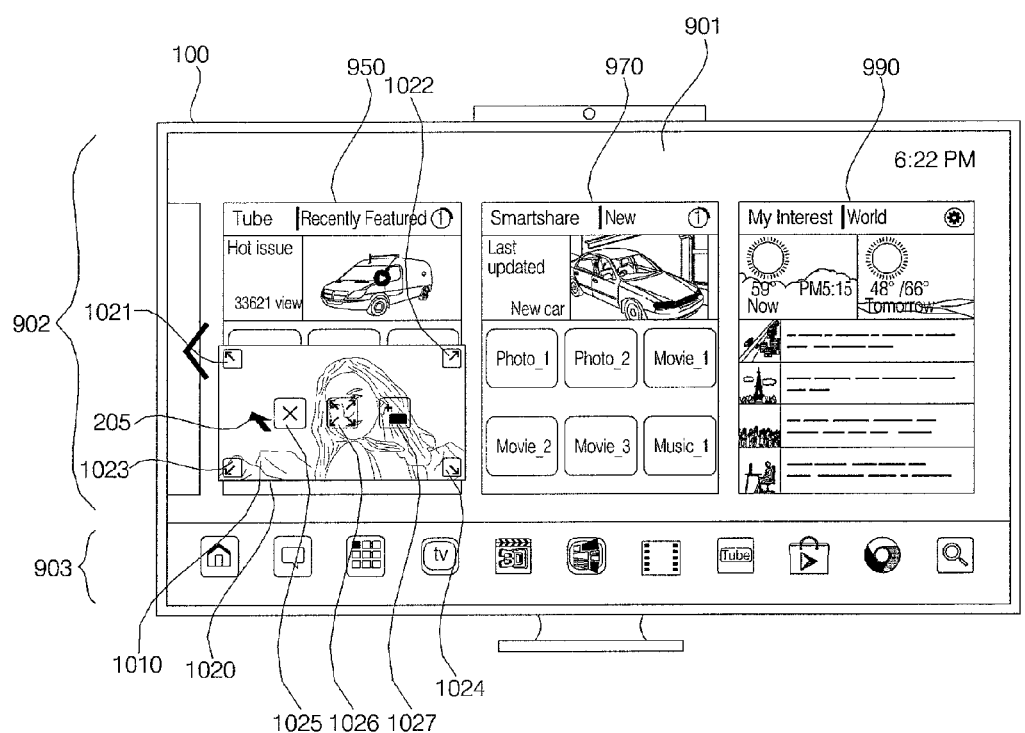

FIG. 10B shows the case in which the pointer 205 displayed in correspondence with movement of the remote controller 200 is moved into the live broadcast image 1010 in a state in which the live broadcast image 1010 is displayed in the tube card object 950.

Then, an object 1020 for moving or enlarging the live broadcast image 1010 may be displayed. In FIG. 10B, the object 1020 is displayed to overlap the live broadcast image 1010. The object 1020 may be transparently displayed and thus the user can move or enlarge the live broadcast image while viewing the live broadcast image 1010.

Unlike FIG. 10B, the object 1020 for moving or enlarging the live broadcast image may be displayed so as to appear separated from the live broadcast image 1010. For example, the object 1020 for moving or enlarging the live broadcast image may be displayed in the vicinity of the pointer 205 displayed in correspondence with movement of the remote controller 200. Even in this case, the object 1020 for moving or enlarging the live broadcast image is transparently displayed so as not to obscure the other card objects.

In FIG. 10B, the object 101 includes a left upward movement item 1021, a right upward movement item 1022, a left downward movement item 1023, a right downward movement item 1024, an exit item 1025, a full view item 1026 and a screen enlargement item 1027.

FIG. 10C shows the case in which the left upward movement item 1021 of the object 1020 for moving or enlarging the live broadcast is selected. As shown in FIG.

10C, the live broadcast image 1010 is displayed in the left upper region of the home screen 901.

Next, if the screen enlargement item 1027 of the object 1020 for moving or enlarging the live broadcast shown in FIG. 10B is selected, the enlarged live broadcast image 1015 is displayed on the home screen 901 as shown in FIG. 10D. At this time, the screen enlargement item 1027 of the object 1020 may be changed to a screen reduction item 1028 as shown in FIG. 10D.

If the display region of the live broadcast image 1010 is determined according to a user point of gaze and the user point of gaze has interest in and is fixed to the full region of the home screen, display of the live broadcast image 1010 may be stopped.

Alternatively, if the user presses the PIP key 241 of the image display apparatus 200 once more, display of the live broadcast image 1010 may be stopped.

FIG. 10E shows the case in which, since the display of the live broadcast image has been stopped, the live broadcast image is not displayed on the home screen 901 and an icon 1017 for replaying the live broadcast image is displayed. The icon 1017 is preferably displayed in an empty region of the home screen.

Although the object, etc. is selected using the pointer 205 indicating movement of the remote controller 200 in FIGS. 9A to 10E, the present invention is not limited thereto and various modifications are possible.

For example, the object, etc. may be selected using the direction key and the OK key of the remote controller 200. As another example, the object, etc. may be selected according to a user gesture based on the image of the user captured using the camera 195. As another example, user voice may be recognized and the object, etc. may be selected based on the recognized voice.

The image display apparatus 100 may display a hand-shaped pointer 506 corresponding to the hand 505 of a user 1104 based on the image of the user captured using the camera 195. The image display apparatus 100 may perform operation corresponding to the user gesture.

Figure 10F:
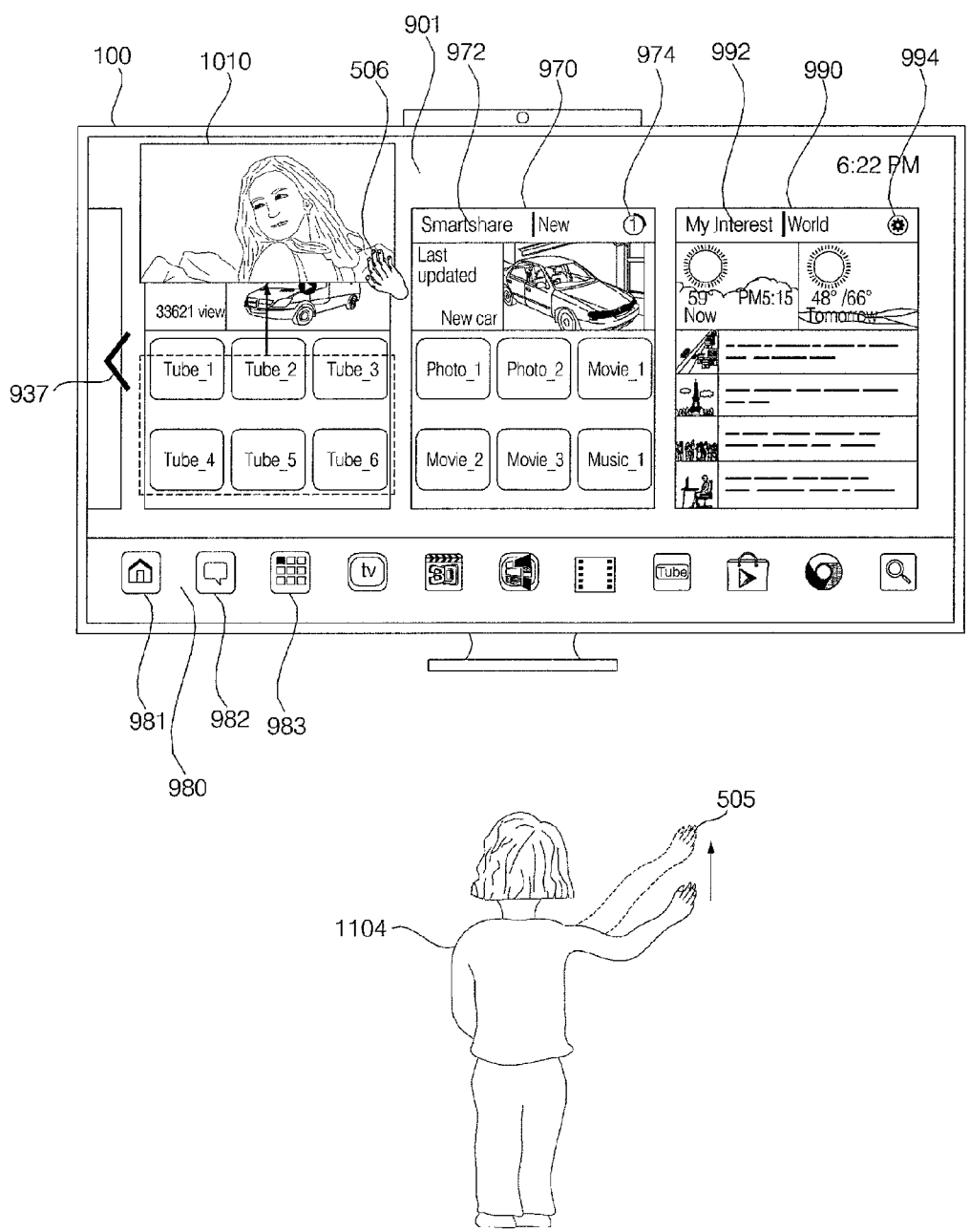

For example, if the hand movement of the user 1104 corresponds to an upward movement gesture as shown in FIG. 10F in a state in which the live broadcast image 1010 is displayed in a left lower region of the home screen by the dynamic screen display input, the image display apparatus 100 may determine that the live broadcast image 1010 is moved up and may move the live broadcast image 1010 displayed in the left lower region to the left upper region as shown in FIG. 10F. At this time, the hand-shaped pointer 506 may be displayed on the moved live broadcast image 1010.

Figure 10G:
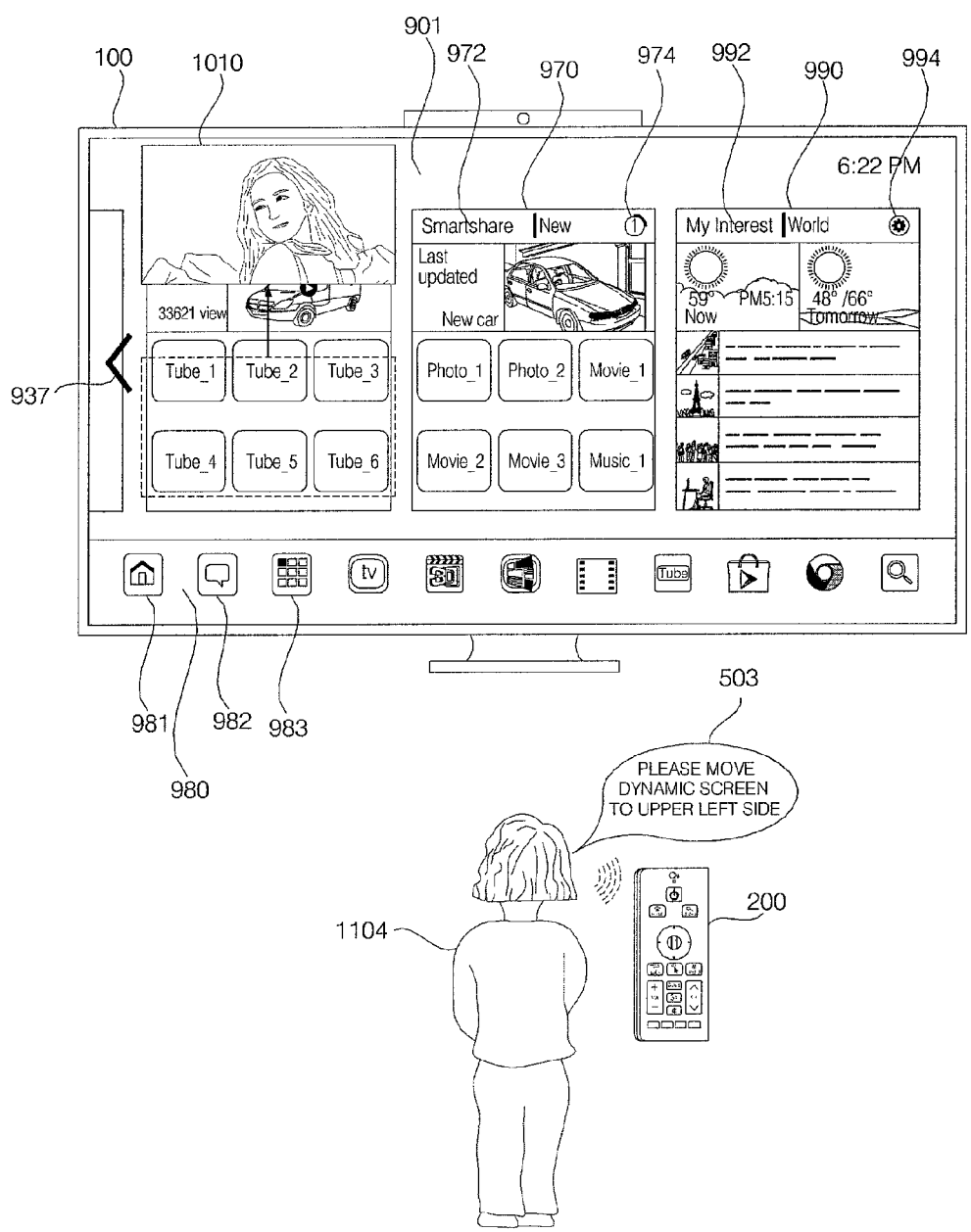

As another example, the remote controller 200 including a microphone (not shown) may receive and send user voice to the image display apparatus 100. If the user outputs voice 503 "Please move the dynamic screen to the left upper side" in a state of displaying the home screen as shown in FIG. 10G, the remote controller 200 may collect and send data of such voice 503 to the image display apparatus 100. The image display apparatus 100 may analyze user voice using a voice recognition function and recognize a command for moving the dynamic screen to the left upper side. Thus, as shown in FIG. 10G, the live broadcast image 1010 displayed in the left lower region may be moved to the left upper region.

The dynamic screen displayed on the image display apparatus may be transferred to and displayed on another electronic apparatus by a movement display command of the user.

Figure 10H:
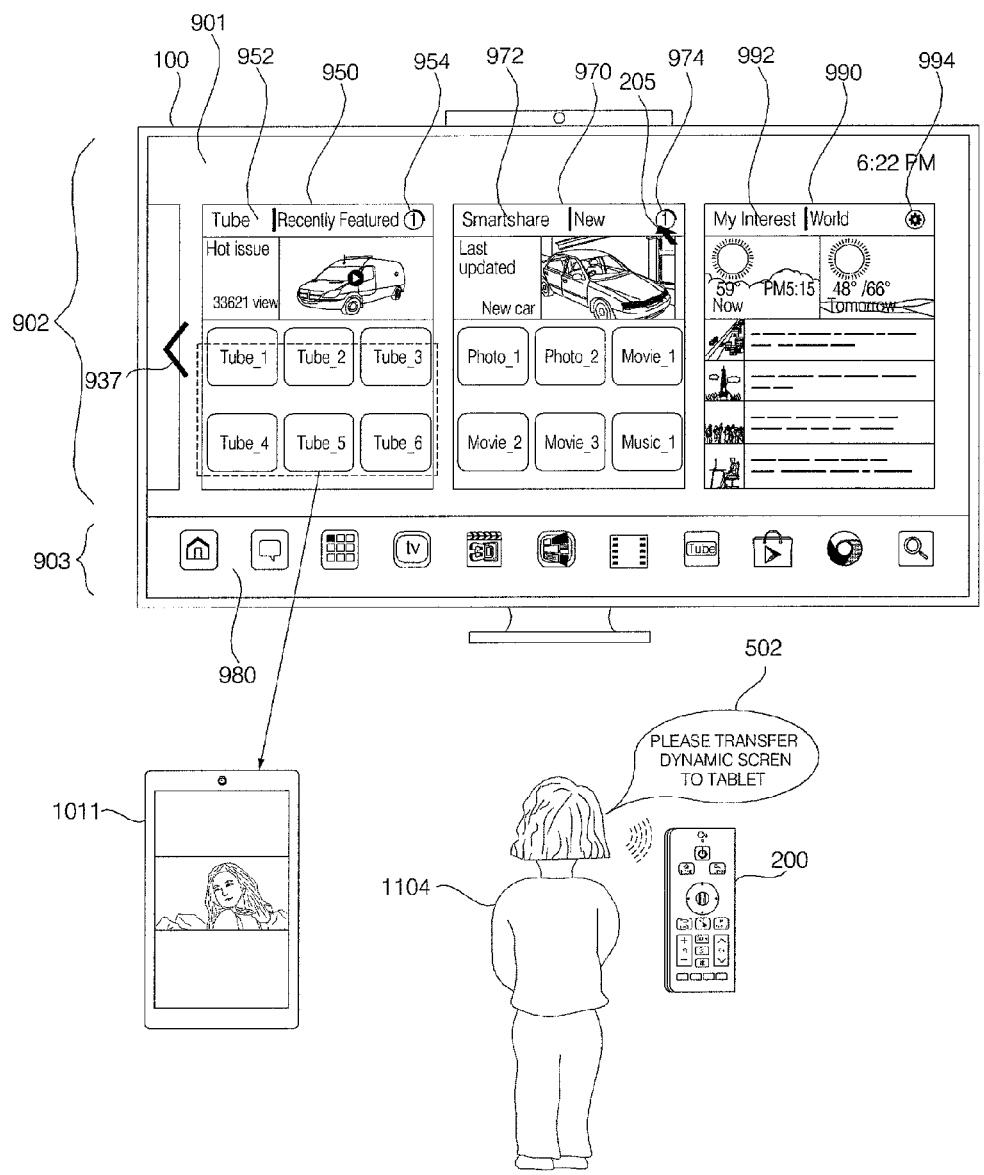

If the user outputs voice 502 "Please transfer the dynamic screen to tablet" in a state of displaying the home screen as shown in FIG. 10H, the remote controller 200 may collect and send data of such voice 502 to the image display apparatus 100. The image display apparatus 100 may analyze user voice using a voice recognition function and recognize a command to transfer the dynamic screen to the tablet.

For movement and display, first, the image display apparatus 100 performs pairing with the tablet and then sends a network address to the tablet via the network interface 130, if the displayed live broadcast image is received over a network. Then, the tablet may display the live broadcast image 1011 as shown in FIG. 10H.

If the live broadcast image displayed on the image display apparatus 100 is received through the tuner unit 110, the image display apparatus 100 converts the live broadcast image into a stream and sends the converted stream to the tablet via the network interface 130. Then, the tablet may display the live broadcast image 1011 as shown in FIG. 10H.

The command for selecting the image display apparatus may be input through the direction key and the OK key, the user gesture, user voice, etc. in addition to the pointer of the remote controller. Hereinafter, although the pointer indicating movement of the remote controller is focused upon, a direction key and an OK key, a user gesture, user voice, etc. may be used as described above.

FIGS. 11A to 11E are similar to FIGS. 10A to 10E in that the dynamic screen is displayed on the home screen, but are different therefrom in that a live broadcast card object 920 is displayed on the screen 900.

FIG. 11A shows the case in which a live broadcast image 1110 is displayed on the home screen 900 to be separated from the live broadcast card object 920 if the PIP key 241 of the remote controller 200 is manipulated in a state in which the home screen 900 is displayed.

At this time, the object 1020 for moving or enlarging the live broadcast image may be displayed in the region in which the live broadcast image has been displayed in the live broadcast card object 920. FIG. 11A shows the case in which the right upward movement item 1022 of the object 1020 is selected and the live broadcast image 1110 is moved to and displayed in the right upper region of the home screen 900. At this time, the live broadcast image 1110 may be a broadcast image of the same channel as the live broadcast image displayed in the live broadcast card object 920.

FIG. 11B shows the case in which the right downward movement item 1024 of the object 1020 for moving or enlarging the live broadcast image is selected. Then, as shown in FIG. 11B, the live broadcast image 1110 is arranged and displayed in the right lower region of the home screen 900. In FIG. 11B, the live broadcast image 1110 is displayed to partially overlap a 3D card object 960 and an application list 980.

FIG. 11C shows the case in which the left upward movement item 1021 of the object 1020 for moving or enlarging the live broadcast image is selected. Then, as shown in FIG. 11C, the live broadcast image 1110 is arranged and displayed in the left upper region of the home screen 900. At this time, the live broadcast image 1110 is displayed to partially overlap the object 1020 for moving or enlarging the live broadcast image. In this case, at least one of the live broadcast image 1110 or the object 1020 may be transparently displayed so as not to obscure each other.

FIG. 11D shows the case in which the left downward movement item 1023 of the object 1020 for moving or enlarging the live broadcast image is selected. Then, as shown in FIG. 11D, the live broadcast image 1110 is arranged and displayed in the left lower region of the home screen 900.

Figure 11E:
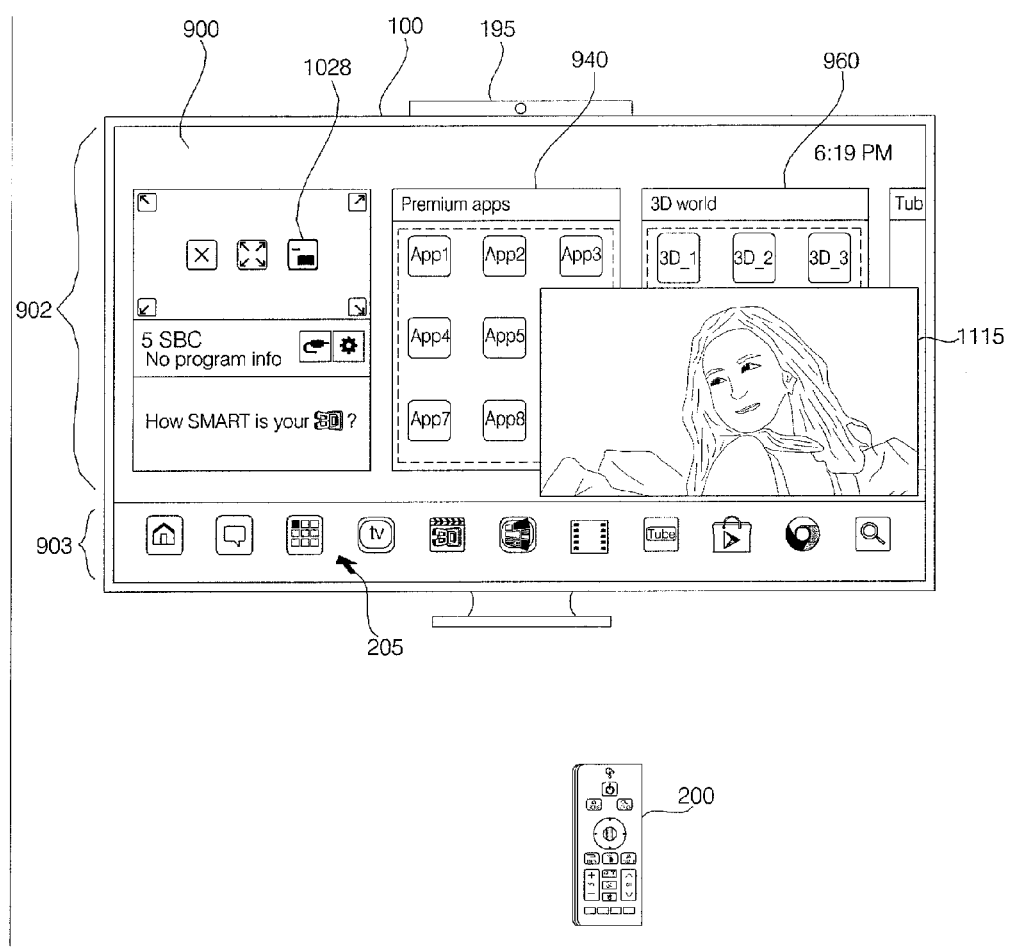

FIG. 11E shows the case in which the screen enlargement item 1027 of the object 1020 for moving or enlarging the live broadcast image is selected. Then, as shown in FIG. 11E, the enlarged live broadcast image 1115 is displayed on the home screen 900. At this time, the screen enlargement item 1027 of the object 1020 may be changed to a screen reduction item 1028 as shown in FIG. 11E.

If the PIP key 241 of the remote controller 200 is manipulated in a state in which the live broadcast image is displayed in the live broadcast card object 920, a live broadcast image different from the displayed live broadcast image may be additionally displayed. The additionally displayed live broadcast image may be a broadcast image of a channel different from that of the displayed broadcast image.

FIGS. 10A to 11E show movement and enlargement of the displayed live broadcast image 1010 or 1110. Upon image movement or enlargement, unlike FIGS. 10A to 11E, as described above, if an updated card object is present, the image is moved to or enlarged in a region other than the updated card object, in a region other than a card object, the frequency of use of which is largest, the number of times of use of which is largest or the use time of which is largest, or in a region other than a region in which the pointer is displayed.

For example, in FIG. 10B, even when the right upward movement item 1022 is selected, the live broadcast image is not displayed in an updated card object of interest 990 but is preferably displayed in a smart share card object 970. Therefore, the user can view an important information region even when the live broadcast image is displayed.

FIG. 12 shows the case in which a separate live broadcast image 1210 different from a live broadcast image of Channel 5 in the live broadcast card object 920 is displayed if the PIP key 241 of the remote controller 200 is manipulated in a state in which the live broadcast image is displayed in the live broadcast card object 920.

At this time, an object 1220 for moving or enlarging the live broadcast image 1210 may be displayed. Although the object 1220 is displayed to overlap the live broadcast image 1210 in FIG. 12, the object 1220 may be displayed so as to appear separated from the live broadcast image 1210.

If the live broadcast image 1210 and the object 1220 for moving or enlarging the live broadcast image overlap, one of the live broadcast image 1210 and the object 1220 may be transparently displayed.

In order to receive live broadcast images of a plurality of channels, a plurality of tuners is required. However, the live broadcast image of one channel may be received using one tuner and the live broadcast image of another channel may be received via the network interface 135.

The image of the user may be captured using the camera 195, the user point of gaze of the captured image of the user may be recognized and then the live broadcast image 1010 may be arranged in a region other than a region corresponding to the user point of gaze. Since the user focuses upon information displayed in the region corresponding to the user point of gaze, the live broadcast image 1010 may be displayed in the region other than the region corresponding to the user point of gaze.

The live broadcast image 1010 may float so as to be moved and displayed in correspondence with movement of the user point of gaze.

Although, when the PIP key 241 of the remote controller 200 is manipulated once, the live broadcast image 1210 different from the live broadcast image of Channel 5 in the live broadcast card object 920 is displayed in FIG. 12, another live broadcast image may be displayed if the PIP key 241 of the remote controller 200 is manipulated twice. In this case, the size of the first displayed live broadcast image 1210 may be less than that of the newly displayed live broadcast image. The size of the first displayed live broadcast image 1210 may be sequentially reduced. The icon 1017 for replaying the live broadcast image shown in FIG. 10E may also be displayed. Therefore, the user may further focus on the newly displayed live broadcast image.

Figure 13:
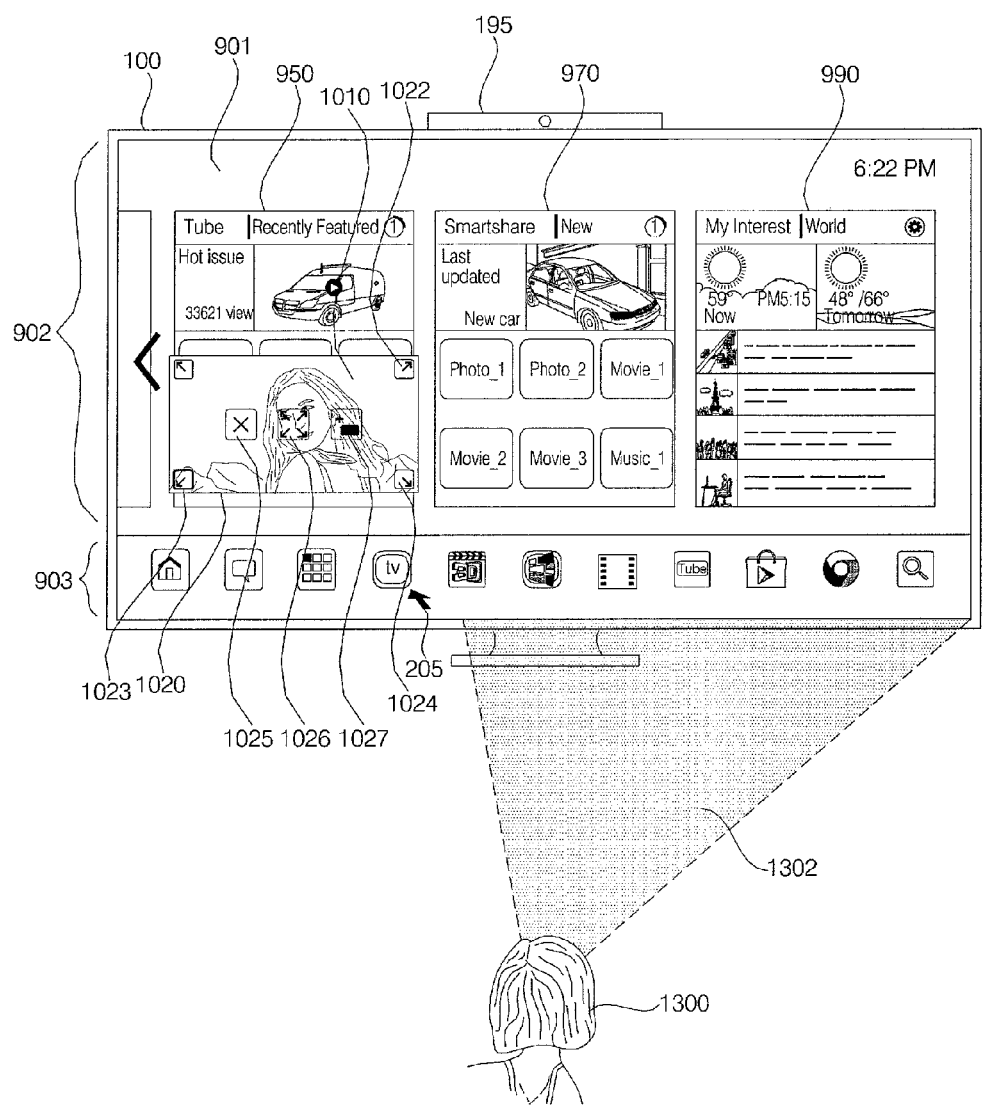

FIG. 13 shows the case in which the user point of gaze is recognized using the camera 195 in a state in which the home screen 901 is displayed. The controller 170 may calculate the face movement direction and the pupil movement direction of the user 1300 from the captured image of the user and estimate the user point of gaze.

If the user point of gaze is estimated, the live broadcast image 1010 may be displayed in a region other than the region 1302 corresponding to the user point of gaze. In FIG. 13, the user point of gaze corresponds to the right side of the image display apparatus and the live broadcast image 1010 is displayed on the left side of the image display apparatus. Therefore, the live broadcast image 1010 may be displayed without interrupting the user viewing experience.

At this time, the object 1220 for moving or enlarging the live broadcast image may be displayed to overlap the live broadcast image 1010 and one of the live broadcast image 1010 and the object 1020 for moving or enlarging the live broadcast image may be transparently displayed.

FIG. 14A shows the case in which the application full view item 983 of the application list is selected based on the pointer 205 displayed in correspondence with movement of the remote controller 200 in a state in which the live broadcast image 1410 is displayed on the home screen 901.

Figure 14B:
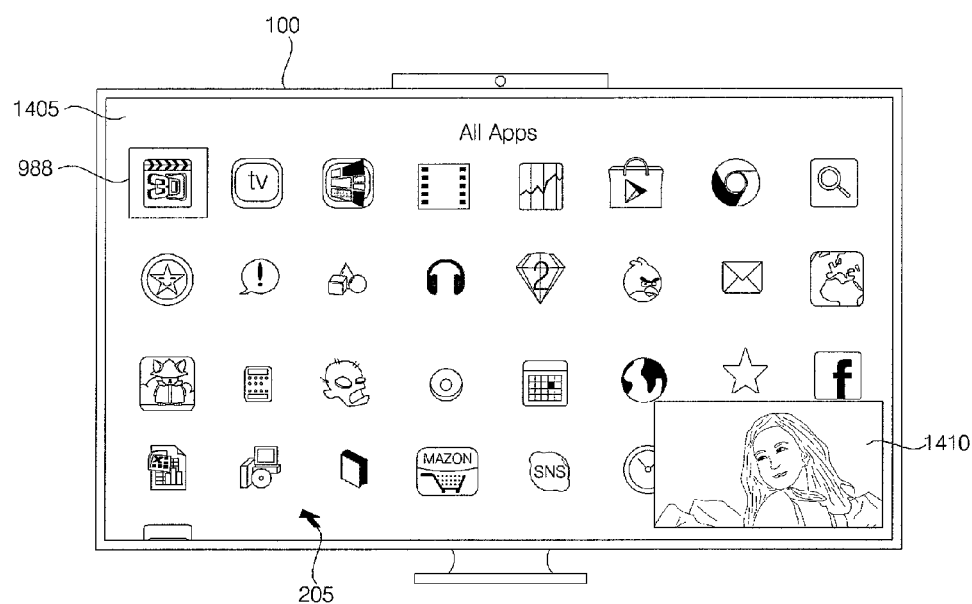

Thus, as shown in FIG. 14B, an application list screen 1405 including a plurality of application items may be displayed on the image display apparatus 100 as a full screen. The location and size of the live broadcast image 1410 displayed at this time may be equal to those of the live broadcast image displayed on the home screen 901.

As shown in FIG. 14C, the size of a live broadcast image 1415 displayed on the application list screen 1405 may be greater than that of the live broadcast image shown in FIG. 14A. In addition, the display location of the live broadcast image may be changed.

Since the amount of information displayed on the home screen 901 of FIG. 14A is large, the size of the live broadcast image is small. However, since the amount of information displayed on the application list screen 1405 of FIG. 14C is small, that is, since an empty space is large, the live broadcast image 1315 may be enlarged and displayed. Therefore, the live broadcast image 1315 is more easily viewed.

Figure 15:
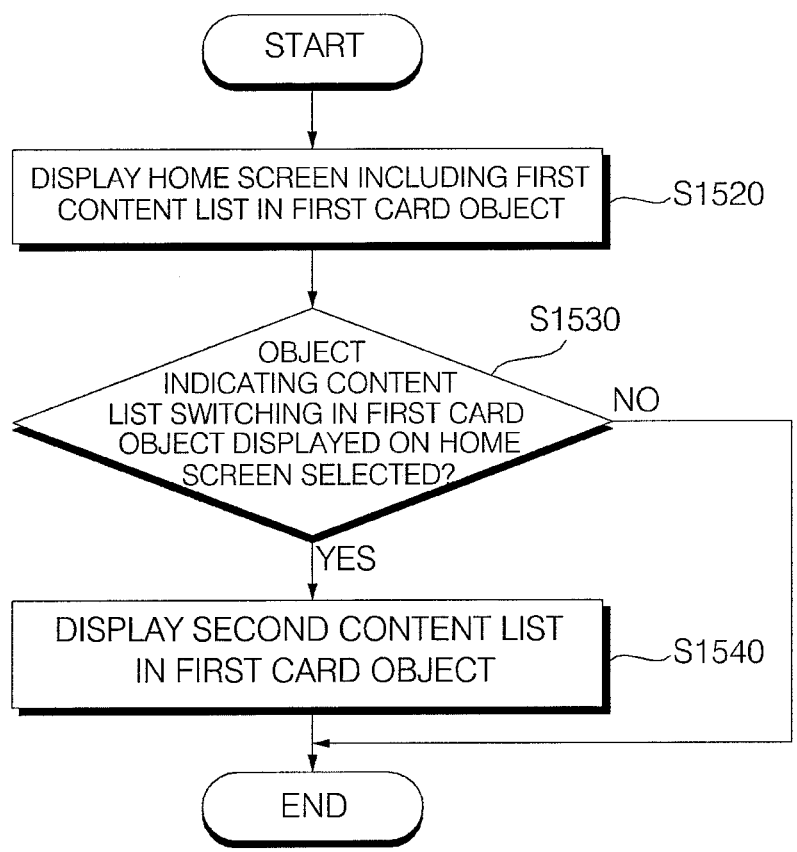
FIG. 15 is a flowchart illustrating a method for operating an image display apparatus according to an embodiment of the present invention.

FIG. 15 is a flowchart illustrating a method for operating an image display apparatus according to an embodiment of the present invention, and FIGS. 16A to 18E are views referred to for describing various examples of the method for operating the image display apparatus of FIG. 15.

Referring to FIG. 15, the image display apparatus 100 displays the home screen (S1520).

Step 1520 (S1520) of displaying the home screen is equal to step 820 (S820) of displaying the home screen and thus a description thereof will be omitted.

FIG. 16A shows an example of the home screen 900 of the image display apparatus.

FIG. 16B shows another example of card objects. In FIG. 16A, if a screen switch object 935 is selected to switch the screen, a home screen 901 for displaying a tube card object 950, a smart share card object 970 or a my interest card object 990 may be displayed in the dashboard area 902.

After step 1520 (S1520) of FIG. 15, that is, after home screen display, the following steps may be performed. That is, the image display apparatus 100 determines whether an object for switching a content list of a first card object displayed on the home screen is selected (S1530) and, if so, displays a second content list corresponding to a second subcategory in the first card object based on a first subcategory among a plurality of subcategories (S1540).

FIG. 16B shows the case in which a content list 975a including new content items is displayed in the smart share card object 970. At this time, an object 974 for switching a content list may be displayed as "1/4" as shown in FIG. 16B. This may mean that a first content list among four content lists is displayed.

Figure 16C:
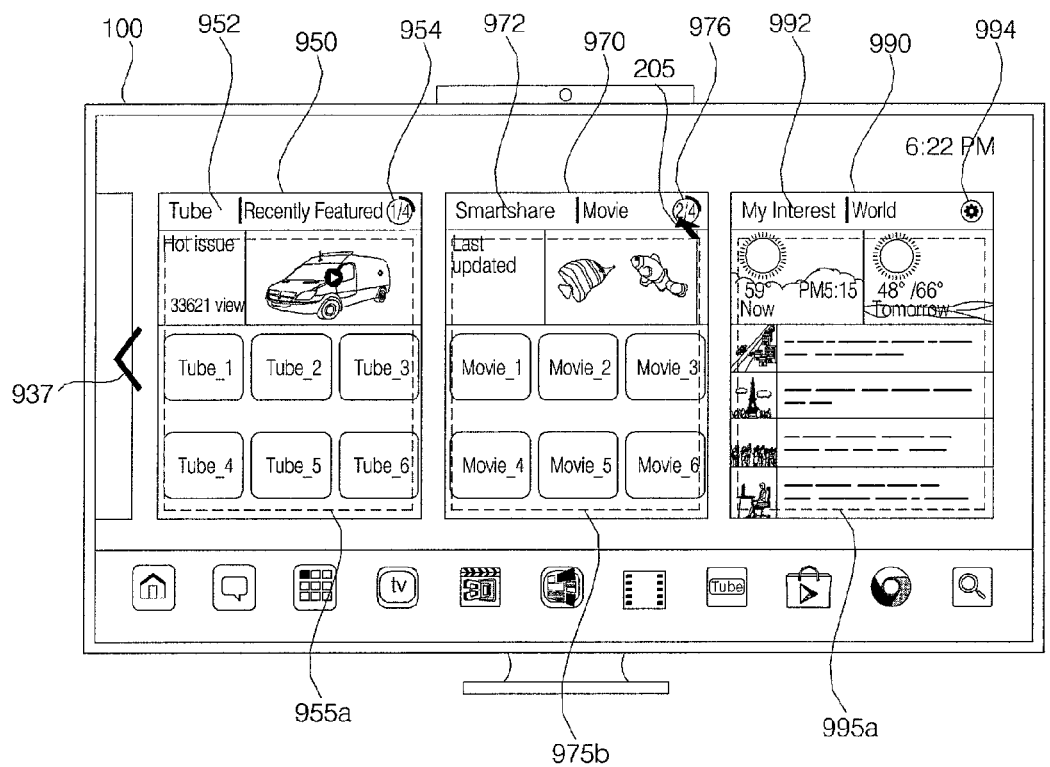

Next, if the object 974 for switching the content list is selected once using the pointer 205 displayed in correspondence with movement of the remote controller 200, the controller 170 may control display of a content list 975b including movie content items in the smart share card object 970 as shown in FIG. 16C. At this time, an object 976 for switching the content list may be displayed as "2/4" as shown in FIG. 16C. This may mean that a second content list among four content lists is displayed.

The content lists displayed in the other card objects located near the smart share card object 970 may not be changed. That is, as shown in FIG. 16C, a content list 955a including recently featured items may be displayed in the tube card object 950 without change and a content list 995a including world news items may be displayed in the my interest card object 990 without change.

Next, if the object 974 for switching the content list is selected twice more as compared to FIG. 16A, that is, if the object 974 for switching the content list is selected once more as compared to FIG. 16B, the controller 170 may control display of a content list 975c including photo content items in the smart share card object 970 as shown in FIG. 16D. At this time, an object 977 for switching the content list may be displayed as "3/4" as shown in FIG. 16D. This may mean that a third content list among four content lists is displayed.

The content lists displayed in the other card objects located near the smart share card object 970 may not be changed. That is, as shown in FIG. 16D, a content list 955a including recently featured items may be displayed in the tube card object 950 without change and a content list 995a including world news items may be displayed in the my interest card object 990 without change.

Next, if the object 974 for switching the content list is selected three times more as compared to FIG. 16A, that is, if the object 974 for switching the content list is selected once more as compared to FIG. 16C, the controller 170 may control display of a content list 975d including photo content items in the smart share card object 970 as shown in FIG. 16E. At this time, an object 978 for switching the content list may be displayed as "4/4" as shown in FIG. 16E. This may mean that a fourth content list among four content lists is displayed.

The content lists displayed in the other card objects located near the smart share card object 970 may not be changed. That is, as shown in FIG. 16E, a content list 955a including recently featured items may be displayed in the tube card object 950 without change and a content list 995a including world news items may be displayed in the my interest card object 990 without change.

Although the object, etc. is selected using the pointer 205 indicating movement of the remote controller 200 in FIGS. 16A to 16E, the present invention is not limited thereto and various modifications are possible.

For example, the object, etc. may be selected using the direction key and the OK key of the remote controller 200. As another example, the object, etc. may be selected according to a user gesture based on the image of the user captured using the camera 195. As another example, user voice may be recognized and the object, etc. may be selected based on the recognized voice.

Figure 16F:
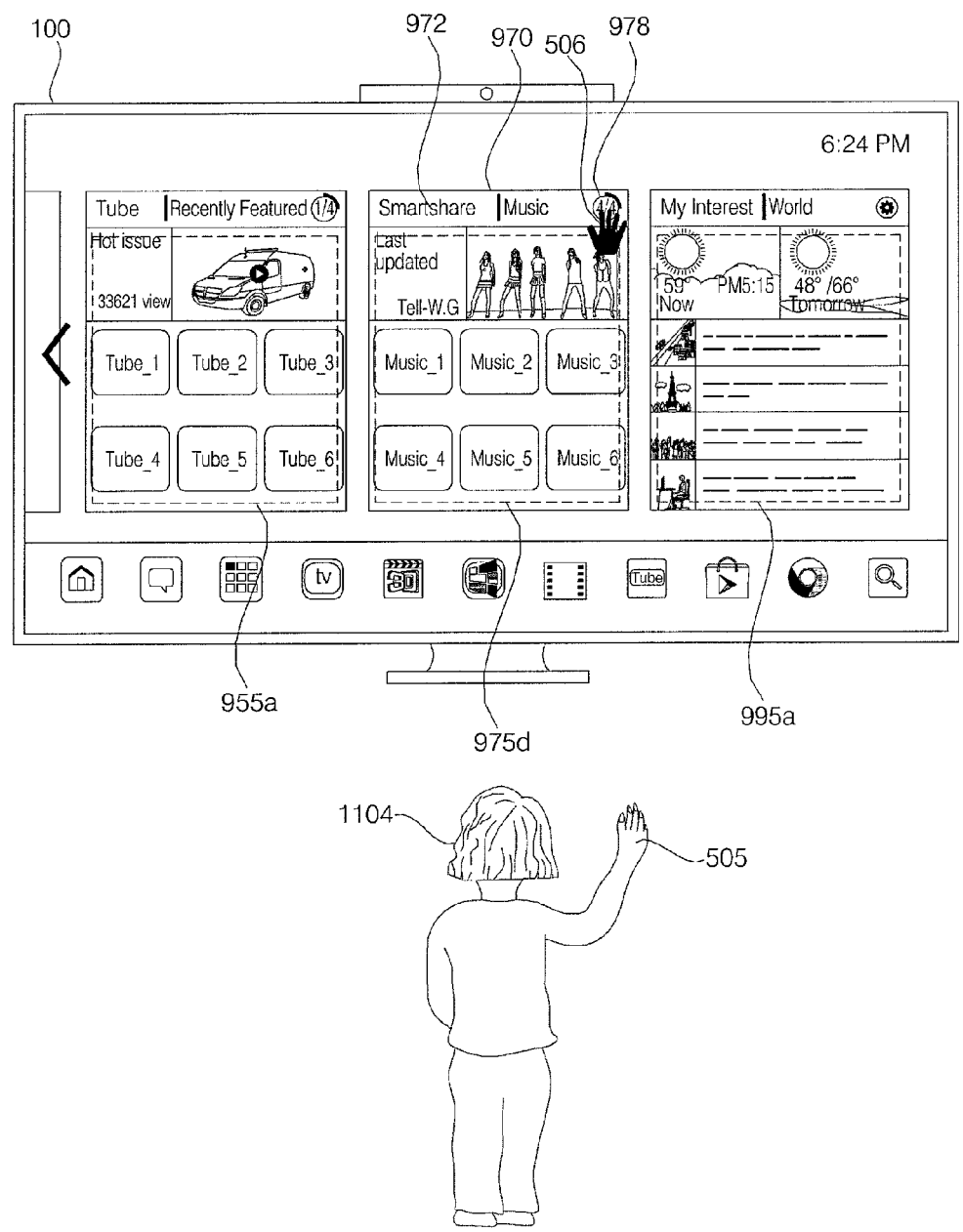
Figure 16G:
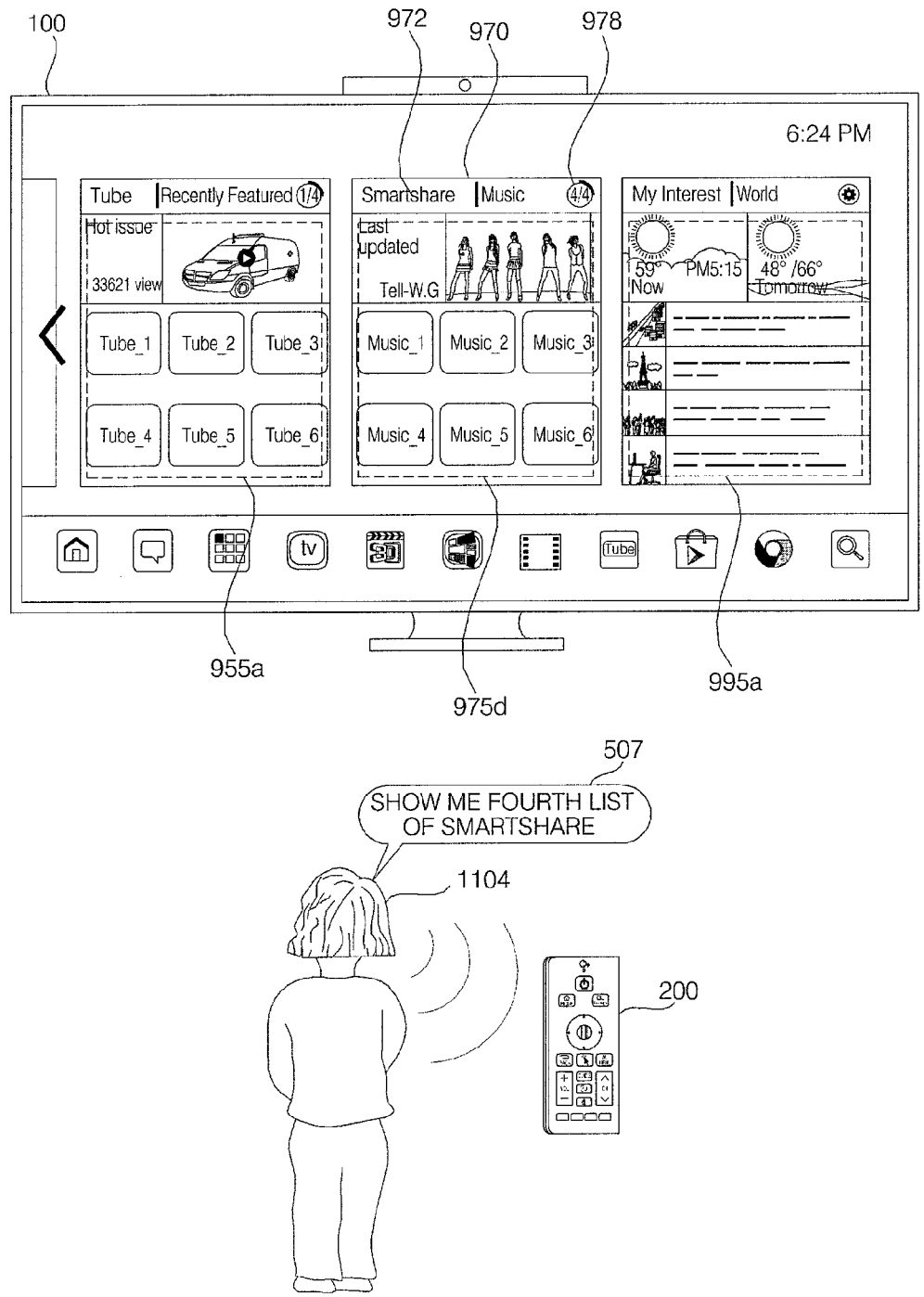

For example, the image display apparatus 100 may display a hand-shaped pointer 506 corresponding to the hand 505 of a user 1104 based on the image of the user captured using the camera 195. In a state of displaying the home screen shown in FIG. 16D, if hand movement of the user 1104 corresponds to a tap gesture for selecting the object 977 for switching the content list, it may be determined that the object is selected. Therefore, as shown in FIG. 16F, the content list 975d including music content items may be displayed in the smart share card object 970. At this time, the hand-shaped pointer 506 may be displayed on an object 978 for switching the content list "4/4".

As another example, the remote controller 200 including a microphone (not shown) may receive and send user voice to the image display apparatus 100. If the user outputs voice 507 "Show me the fourth list of smart share" in a state of displaying the home screen as shown in FIG. 16D, the remote controller 200 may collect and send data of such voice 507 to the image display apparatus 100. The image display apparatus 100 may analyze user voice using a voice recognition function and recognize a command for displaying the content list. Thus, as shown in FIG. 16F, the content list 975d including the music content item may be displayed in the smart share card object 970.

The command for selecting the image display apparatus may be input through the direction key and the OK key, the user gesture, user voice, etc. in addition to the pointer of the remote controller. Hereinafter, although the pointer indicating movement of the remote controller is focused upon, the direction key and the OK key, the user gesture, user voice, etc. may be used as described above.

Figure 16I:
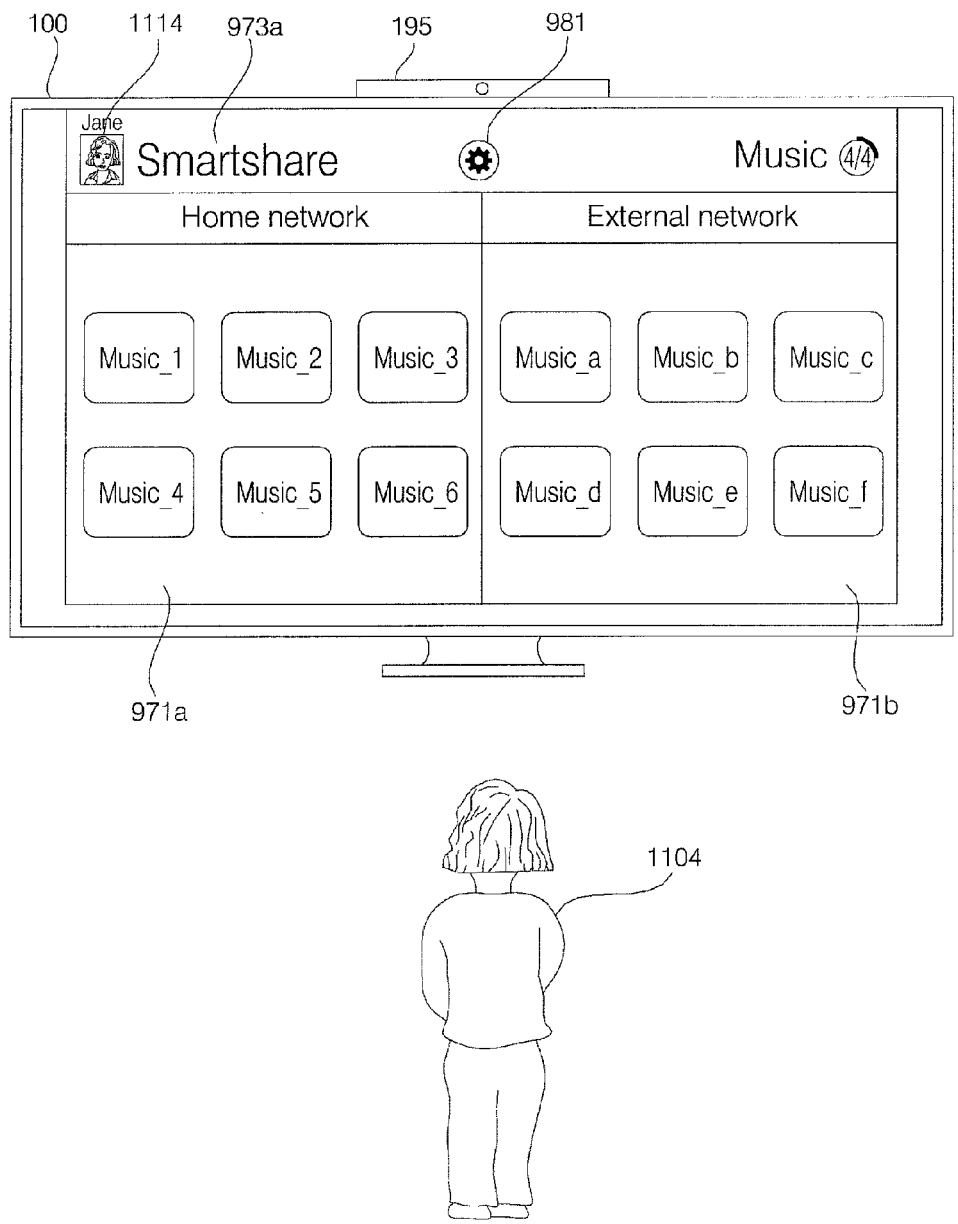

FIGS. 16H to 16J show detailed examples of the smart share card object 970 of the home screen 901 shown in FIG. 16B.

In FIG. 16H, the smart share card object 970 further includes a settings object 981. If a card object name 972 is selected using the pointer 205, a smart share screen 973a shown in FIG. 16I may be displayed on the image display apparatus.

The shared content according to the embodiment of the present invention may include not only content stored in an electronic apparatus connected to the image display apparatus via a home network but also other content. For example, content stored in an external server may be shared over a network. More specifically, if a first user logs in to the image display apparatus 100, not only content stored in an electronic apparatus connected to the image display apparatus over a home network but also content stored in an external server by the first user may be shared in smart share card object 970 or on the smart share screen 973a. At this time, a process of logging in to the external server may be required. Alternatively, when the user logs in to the image display apparatus 100, the user may automatically log in to the external server. Therefore, a content sharing function may be further activated.

A content list 971a of the home network and a content list 971b of the external network are separately displayed on the smart share screen 973a of FIG. 16I. FIG. 16I shows the case in which the user logs in to the image display apparatus using the camera 195 and an icon 1114 indicating the user 1104 is displayed on the smart share screen 973a.

The settings object 981 may be displayed on the smart share screen 973a. Various settings may be performed using the settings object 981. For example, shared content may be set to be restricted to the home network or to extend to the external network. As another example, shared content may be set to be displayed on a per user basis or all shared content may be set to be displayed regardless of users. Alternatively, shared content may be set to be displayed on a per age basis. Alternatively, while shared content is displayed, a lock function for certain content may be set to be activated. Alternatively, subcategories other than new, movie, photo and music may be further set. Alternatively, only newly added content may be set to be displayed as newly shared content settings. A period of synchronization with the home network may be set. Upon shared content update, a time when a content list is displayed may be set. For example, if a new content list is received over the home network, the new content list may be immediately displayed. Alternatively, a content list to be displayed may be updated at a predetermined time interval and a new content list may be displayed upon update.

FIG. 16J shows a smart share screen 973b different from that of FIG. 16I. The smart share screen 973b of FIG. 16J includes a list 971c of electronic apparatuses connected to the image display apparatus 100 and a list 971d of electronic apparatuses which are not connected to the image display apparatus 100 among the electronic apparatuses included in the home network. Unlike the figure, the lists 971c and 971d are separately displayed on the screen.

In the figure, a refrigerator item, a laptop item and a home server item are included in the list 971c of electronic apparatuses connected to the image display apparatus 100 and a tablet item, a computer item and a washing machine item are included in the list 971d of electronic apparatuses which are not connected to the image display apparatus 100.

If the computer item is selected from the list 971d of electronic apparatuses that are not connected to the image display apparatus 100, a separate menu may be displayed and thus a remote power-on operation of the computer may be performed.

A card object corresponding to the smart share screen 973b shown in FIG. 16I may be displayed on the home screen. Therefore, it is possible to easily confirm electronic apparatuses connected to the image display apparatus 100 and electronic apparatuses which are not connected to the image display apparatus 100.

FIGS. 17A to 17E are similar to FIGS. 16A to 16E and are different therefrom in that the content list of the smart share card object 970 is not changed but the content of the tube card object 950 is changed.

FIG. 17A shows a home screen 900 equal to that of FIG. 16A. If the screen switching object 935 is selected based on the pointer 205 displayed in correspondence with movement of the remote controller 200, as shown in FIG. 17B, a home screen 901 for displaying the tube card object 950, the smart share card object 970 and a my interest card object 990 may be displayed in the dashboard area 902.

FIG. 17B shows the case in which a content list 955a including recently featured items is displayed in the tube card object 950. At this time, an object 954 for switching a content list may be displayed as "¼" as shown in FIG. 17B. This may mean that a first content list among four content lists is displayed.

Next, if the object 954 for switching the content list is selected once using the pointer 205 displayed in correspondence with movement of the remote controller 200, the controller 170 may control display of a content list 955b including most viewed items in the tube card object 950 as shown in FIG. 17C. At this time, an object 956 for switching the content list may be displayed as "2/4" as shown in FIG. 17C. This may mean that a second content list among four content lists is displayed.

The content lists displayed in the other card objects located near the tube card object 950 may also be changed. That is, as shown in FIG. 17C, a content list 975b including movie content items may be displayed in the smart share card object 970 and a content list 995b including top stories news items may be displayed in the my interest card object 990.

Next, if the object 954 for switching the content list is selected twice more as compared to FIG. 17A, that is, if the object 956 for switching the content list is selected once more as compared to FIG. 17B, the controller 170 may control display of a content list 955c including trending video items in the tube card object 950 as shown in FIG. 17D. At this time, an object 957 for switching the content list may be displayed as "¾" as shown in FIG. 1dc. This may mean that a third content list among four content lists is displayed.

The content lists displayed in the other card objects located near the tube card object 950 may also be changed. That is, as shown in FIG. 17D, a content list 975c including photo content items may be displayed in the smart share card object 970 and a content list 995c including business news items may be displayed in the my interest card object 990.

Next, if the object 954 for switching the content list is selected three times more as compared to FIG. 17A, that is, if the object 957 for switching the content list is selected once more as compared to FIG. 17C, the controller 170 may control display of a content list 955d including 3D content items in the tube card object 950 as shown in FIG. 17E. At this time, an object 958 for switching the content list may be displayed as "4/4" as shown in FIG. 17E. This may mean that a fourth content list among four content lists is displayed.

The content lists displayed in the other card objects located near the tube card object 950 may also be changed. That is, as shown in FIG. 17E, a content list 975d including music content items may be displayed in the smart share card object 970 and a content list 995d including top stories news items may be displayed in the my interest card object 990.

Although the tube card object 950, the smart share card object 970 and the my interest card object 990 shown in FIGS. 17B to 17E display respective content lists according to settings, the content lists may be automatically changed according to a broadcast program viewed by a user or a history of broadcast images which have been viewed by a user.

For example, if the genre of a favorite broadcast image is drama according to the broadcast image viewed by the user or the history of broadcast images which have been viewed by the user, a plurality of content lists associated with drama may be generated in association with the tube card object 950. More specifically, a drama character content list, a drama shooting location content list, a drama episode content list, a drama-related social network list, etc. may be generated.

The tube card object 950 may change and display a content list such as a drama character content list, a drama shooting location content list, a drama episode content list, a drama-related social network list, etc. according to user input, for example, according to selection of an object for switching a content list. Alternatively, a plurality of content lists may be automatically changed at a predetermined time interval.

As another example, if the genre of a favorite broadcast image is drama according to the broadcast image viewed by the user or the history of broadcast images which have been viewed by the user, a drama-related content list of shared content may be generated in association with the smart share card object 970 and a shared drama content list may be provided in the smart share card object.

As another example, if the genre of a favorite broadcast program is drama according to the broadcast image viewed by the user or the history of broadcast images which have been viewed by the user, a plurality of content lists related to the drama may be generated in association with the my interest card object 990. More specifically, a drama character news list, a drama shooting location news list, a drama-related social network list, etc. may be generated.

The my interest card object 990 may change and display a content list such as a drama character news list, a drama shooting location news list, a drama-related social network list, etc. according to user input, for example, according to selection of an object for switching a content list. Alternatively, a plurality of content lists may be automatically changed at a predetermined time interval.

Each content list provided by each card object may be changed according to users.

For example, the user may be recognized based on the image captured using the camera 195 and content lists corresponding to the recognized user may be generated and provided.

For example, if a first user logs in to the image display apparatus 100, the tube card object 950 may generate and display a content list corresponding to the first user. More specifically, if the first user is a child, an education content list, an animation content list, etc. may be generated and displayed.

As another example, if a second user logs in to the image display apparatus 100, the tube card object 950 may generate and display a content list corresponding to the second user. More specifically, if the second user is a male adult, a sports content list, a movie content list, etc. may be generated and displayed.

Even in this case, the content list may be changed and displayed according to user selection, that is, selection of an object for switching a content list. Alternatively, a plurality of content lists may be automatically changed and displayed at a predetermined time interval.

FIGS. 18B to 18E are similar to FIGS. 16A to 16E in that the content list of the smart share card object 970 is changed and are different therefrom in that the home screen is different and a pull-down menu is displayed if the object 954 for switching the content list is selected once more.

FIG. 18A shows another example of a home screen 1100 of the image display apparatus.

The home screen 1100 may include a dashboard area 1102 including card objects each including content and a launcher bar area 1103 including frequently used application items.

Movable, replaceable, switchable card objects may be placed in the dashboard area 1102. An object 1107 indicating a logged-in user and time information may be displayed in the dashboard area 1102.

FIG. 18A shows a live TV card object 1120, a smart share card object 1140 and a my interest card object 1160 as an example of the card objects.

The smart share card object 1140 of FIG. 18A may include a card object name 1142, an object 1144 indicating the number of displayable content lists and a content list 1145a corresponding to any one subcategory.

In particular, the content list 1145a may include content items stored in an adjacent electronic apparatus.

In order to display predetermined content items among a plurality of content items stored in the adjacent electronic apparatus in the smart share card object 1140, subcategories associated with genre, date, etc. may be set. Content lists may be separately configured according to such subcategories.

The content list of the smart share card object 1140 shown in FIG. 18A is a content list 1145a including photo content items.

Based on selection of the object 1144 indicating the number of displayable content lists, any one of a content list including recent content items, a content list including video content items or a content list including music content items may be displayed in the smart share card object 1140.

Next, the my interest card object 1160 of FIG. 18A may include a card object name 1162, an object 1164 for setting content of interest and a content list 1165 corresponding to any one item of interest.

In particular, the content list 1165 may include content items provided by a specific server.

In order to display predetermined content items among a plurality of content items provided by the specific server in the my interest card object 1160, subcategories associated with genre, date, etc. may be set. Content lists may be separately configured according to such subcategories.

The content list of the my interest card object 1160 shown in FIG. 18A is a content list 1165 including top stories news items.

By selection of the object 1164 for setting content of interest, if a world news item and a business news item are further set in addition to the top stories news item, the content list displayed in the object 1164 for setting content of interest may be a content list including top stories news items, a content list including world news items and a content list including business news items.

The launcher bar area 1103 may include an application list 1180 including frequently used application items. The application items displayed in the launcher bar area 1103 of FIG. 18A may be equal to the application items displayed in the launcher bar area 903 of FIG. 16A and thus a description thereof will be omitted.

FIG. 18A shows the case in which a content list 1145a including new content items is displayed in the smart share card object 1140. At this time, the object 1144 indicating the number of displayable content lists may be displayed as "¼" as shown in the figure. At this time, the object 1144 indicating the number of displayable content lists indicates that four content lists are present according to four subcategories and a first content list among the four content lists is displayed.

Next, if the object 1144 indicating the number of displayable content lists is selected using the pointer 205 displayed in correspondence with movement of the remote controller 200, the controller 170 may control display of the object 1146 for switching the content list including a plurality of subcategory items in the form of a pull-down menu as shown in FIG. 18B.

In FIG. 18B, a recent item, a video item, a photo item and a music item are shown as the plurality of subcategory items.

If the photo item 1147 of the object 1146 for switching the content list is selected using the pointer 205 displayed in correspondence with movement of the remote controller 200, as shown in FIG. 18C, a content list 1145a including new content items displayed in the smart share card object 1140 may be switched to the content list 1145b including the photo items.

FIG. 18D shows the case in which the video item 1148 of the object 1146 for switching the content list is selected using the pointer 205 displayed in correspondence with movement of the remote controller 200. In this case, as shown in FIG. 18E, a content list 1145b including photo items displayed in the smart share card object 1140 may be switched to the content list 1145c including the video items. Therefore, the user can conveniently view the content list corresponding to a desired subcategory item.

The content lists displayed in the smart share card object 1140 may be received from the home server 650. The home server 650 may operate as a server of electronic apparatuses belonging to a home network. Therefore, the home server performs data communication with the electronic apparatuses in the home network. The home server may receive content data stored in the electronic apparatuses or index information related to the content data. The home server 650 may generate a content list based on the received content data or index information and transmit the content list to the image display apparatus 100 according to the request of the image display apparatus 100.

Alternatively, the content lists displayed in the smart share card object 1140 may be generated by the image display apparatus 100 based on the index information related to the content data received from the home server 650.

The home server 650 may receive index information related to the content data stored in the electronic apparatuses in the home network. The home server 650 may generate index information related to the content data when receiving the content data stored in the electronic apparatus in the home network. The home server 650 may transmit the index information related to the content data to the image display apparatus 100 according to the request of the image display apparatus 100. At this time, the index information may include data kind information, storage location information, etc. of the content.

If any one content item of the content list displayed in the smart share card object 1140 displayed on the image display apparatus 100 is selected, the image display apparatus 100 may transmit a data transmission request to an electronic apparatus for storing the selected content item and receive content data corresponding thereto from the electronic apparatus or the server 650. The image display apparatus 100 may display the received content data. Thus, it is possible to conveniently play the content data stored in the adjacent electronic apparatus back.

Figure 19:
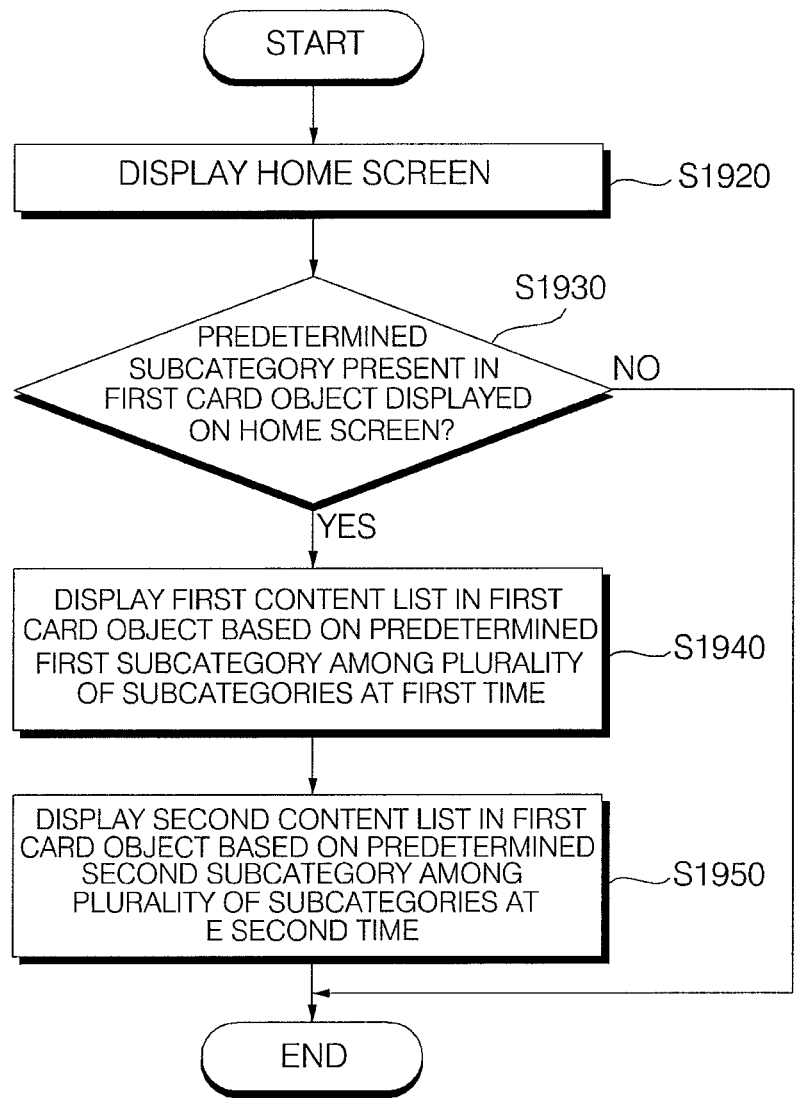
FIG. 19 is a flowchart illustrating a method for operating an image display apparatus according to another embodiment of the present invention.

FIG. 19 is a flowchart illustrating a method for operating an image display apparatus according to another embodiment of the present invention, and FIGS. 20A to 21C are views referred to for describing various examples of the method for operating the image display apparatus of FIG. 19.

Referring to FIG. 19, the image display apparatus 100 displays a home screen (S1920).

FIG. 20A shows an example of a home screen 900 of the image display apparatus. The home screen 900 of FIG. 20A may include a dashboard area 902 including card objects each including content and a launcher bar area 903 including frequently used application items. The home screen 900 of FIG. 20A corresponds to the home screen 900 of FIG. 16A.

Next, in FIG. 20A, if a screen switch object 935 is selected using the pointer 205 displayed in correspondence with movement of the remote controller 200 to switch the screen, as shown in FIG. 20B, a home screen 901 for displaying a tube card object 950, a smart share card object 970 and a my interest card object 990 is displayed in the dashboard area 902. The home screen 901 of FIG. 20B corresponds to the home screen 901 of FIG. 16B.

The my interest card object 990 may include a card object name 992, an object 994 for setting content of interest and a content list 995a corresponding to any one item of interest.

Weather information received through the network interface 130 may be displayed on the content list 995a.

In particular, the content list in the my interest card object 990 shown in FIG. 20B is a content list 995a including business news items.

Next, the image display apparatus 100 determines whether a predetermined subcategory is present in a first card object displayed on the home screen (S1930) and displays a first content list corresponding to the predetermined first subcategory among a plurality of subcategories in the first card object at a first time if the predetermined subcategory is present (S1940). After a predetermined time, that is, at a second time, a second content list corresponding to a predetermined second subcategory among the plurality of subcategories is displayed in the first card object (S1950).

According to the embodiment of the present invention, the content lists corresponding to a plurality of predetermined subcategories may be sequentially changed and displayed in the my interest card object 990.

That is, the content list 995a including business news items may be displayed in the my interest card object 990 at a first time Ta as shown in FIG. 20B, the content list 995b including top stories item s may be displayed in the my interest card object 990 after a predetermined time has elapsed, that is, at a second time Tb, as shown in FIG. 20C and the content list 995c including world news items may be displayed in the my interest card object 990 after a predetermine time has elapsed, that is, at a third time Tc, as shown in FIG. 20D. That is, the content list may be automatically switched and displayed. For example, the content list may be switched or updated at a time interval of 10 seconds or 20 seconds.

Therefore, the user can confirm news items corresponding to various subcategories in a restricted space.

The content lists 995a, 995b and 995c may be provided by a server for providing content and may be received via the network interface 135. The image display apparatus 100 may transmit a content transmission request to the server when selecting a specific content item and receive and display content data corresponding thereto.

The content list displayed in the my interest card object 990 may be set by user selection.

Figure 21A:
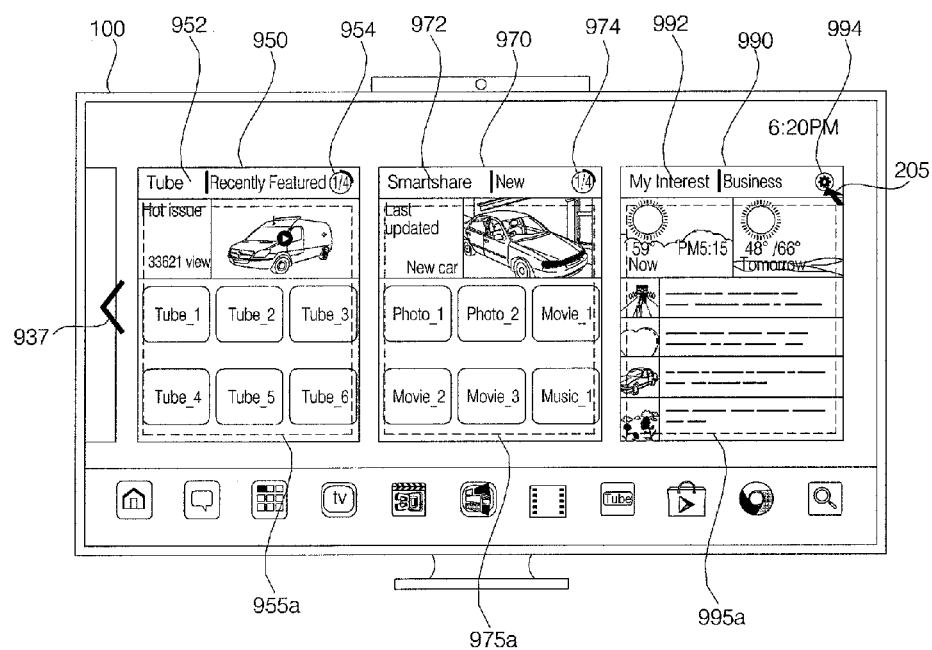

For example, if the object 994 for setting the content of interest on the home screen 901 of FIG. 21A is selected, as shown in FIG. 21B, a settings screen 1410 for setting a subcategory in the my interest card object 990 displayed on the home screen may be displayed.

On the settings screen 1410, a selection window for selecting a plurality of subcategory items may be displayed. FIG. 21B the case in which a top stories item 1412, a world news item 1414 and a business news item 1416 are selected from among the plurality of subcategory items. Therefore, as shown in FIGS. 20A to 20D, the content lists of the items may be sequentially provided. Therefore, it is possible to provide a content list corresponding to subcategory items desired by the user.

Although the object 994 for setting the content of interest is displayed, subcategory items thereof are selected and the content list corresponding to the selected subcategory items is provided only with respect to the my interest card object 990 in the above figure, this is applicable to other card objects.

That is, even with respect to the tube card object 950 or the smart share card object 970, an object (not shown) for setting content of interest may be displayed, subcategory items thereof may be selected and the content list corresponding to the selected subcategory items may be provided.

Figure 21C:
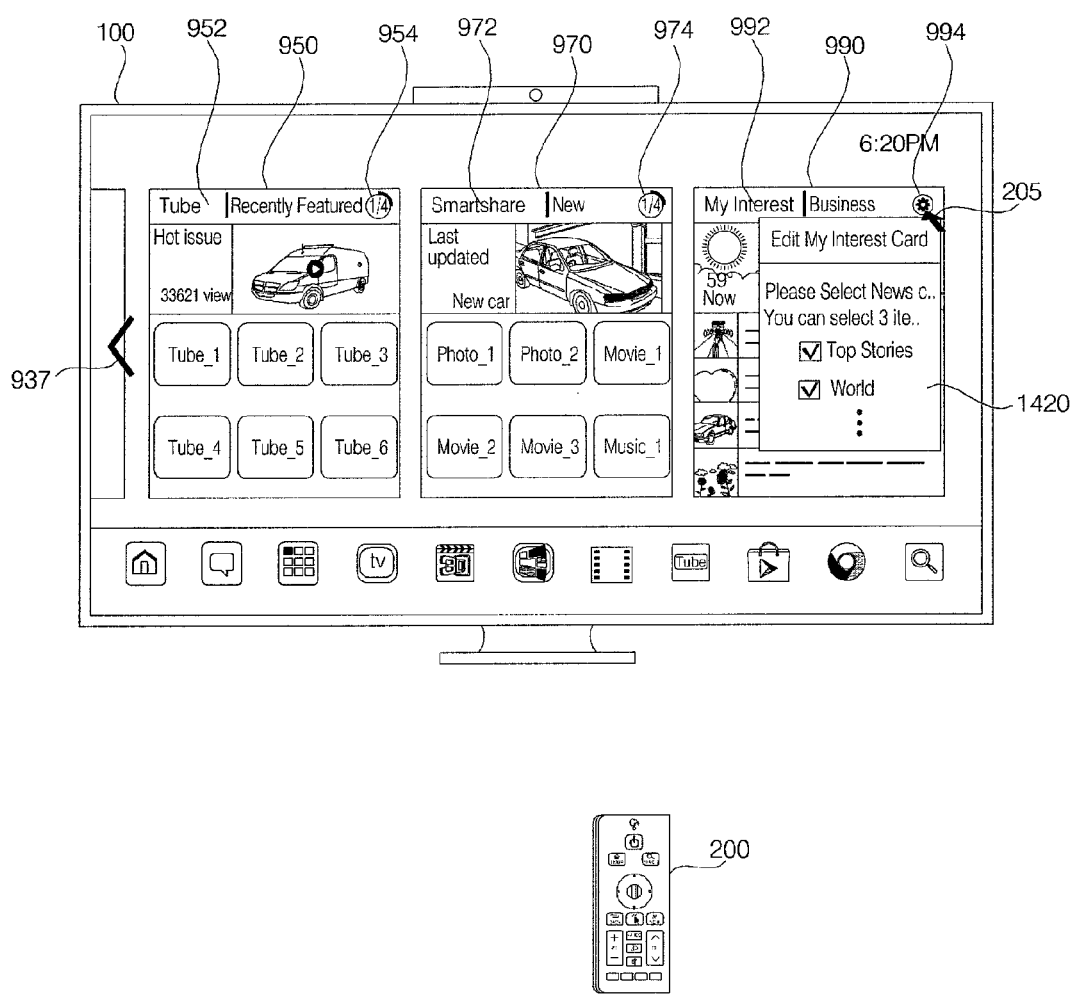

As another example, if the object 994 for setting the content of interest on the home screen 901 of FIG. 21A is selected, as shown in FIG. 21C, a settings menu 1420 for setting a subcategory in the my interest card object 990 displayed on the home screen may be displayed in the form of a pull-down menu.

Although the content list corresponding to the predetermined subcategory in the my interest card object 990 is automatically switched and displayed at a predetermined time interval in FIGS. 20A to 20D, various modifications are possible.

For example, if the user gazes at the content list 995a including the business news items of FIG. 20B, the image display apparatus 100 may recognize the user point of gaze through the camera 195 and continue to display the content list 995a including the business news items for a predetermined time or more. If the user point of gaze is changed to another region, the image display apparatus 100 may display the content list 995b including the top stories of FIG. 20C. Therefore, it is possible to increase user convenience.

As another example, even in the tube card object 950 or the smart share card object 970, a content list corresponding to a predetermined subcategory may be automatically switched and displayed at a predetermined time interval without selecting the object for switching the content list.

Although the content list of the subcategory is described based on a specific user in the present specification, various modifications are possible.

For example, if another user logs in to and uses the image display apparatus 100, the live TV card object 920, the premium apps card object 940, the 3D world card object 960, the tube card object 950 and the my interest card object 990 are displayed without change, but the content list displayed in each card object may be changed and displayed on a per user basis.

For example, if a first user who is a family member logs in to the image display apparatus 100, a plurality of content lists provided in the tube card object 950 may be cooking video content, drama video content, child education video content, etc., which are set by the first user in advance.

As another example, if a second user who is a family member logs in to the image display apparatus 100, a plurality of content lists provided in the tube card object 950 may be game video content, sports video content, conversation education video content, etc., which are set by the second user in advance. Therefore, it is possible to provide a content list suitable for each user and improve user convenience.

Login to the image display apparatus 100 may be performed based on at least one of the image of the user captured using the camera 195, password input or user voice recognition.

When a dynamic screen is displayed according to the method for operating the image display apparatus described with reference to FIGS. 8 to 14C, the method for operating the image display apparatus of FIG. 15 or 19 is applicable. That is, a first content list is displayed in a first card object on a home screen and, if an object for switching a content list is selected in a state in which a dynamic screen is displayed or if a predetermined time has been elapsed, the first content list may be switched to a second content list.

On the contrary, when a content list is changed according to the method for operating the image display apparatus described with reference to FIGS. 15 to 18E or FIGS. 19 to 21C, the method for operating the image display apparatus of FIG. 8 is applicable. That is, if an object for switching a content list is selected or if a predetermined time has been elapsed, a first content list may be switched to a second content switch and then a dynamic screen may be displayed in a state in which the second content list is displayed if dynamic screen display input is received.

In the image display apparatus 100 according to the embodiment of the present invention, when an object or a menu is selected or focused upon, the object or the menu may be highlighted. Although not shown in FIGS. 9A to 21C, the contour of the selected or focused object or menu may be made thick or at least one of the size, color or the luminance of the selected or focused object or menu may be changed. Therefore, the user can intuitively perceive selection or focusing of the object or menu.

According to one embodiment of the present invention, an image display apparatus displays a dynamic screen on a home screen according to dynamic screen display input and moves and displays the dynamic screen on the home screen if dynamic screen movement input is received. Therefore, a user can conveniently view a desired image.

If dynamic screen enlargement input is received, the dynamic screen can be enlarged and displayed on the home screen. Thus, the user can more easily view the dynamic screen.

An object including a screen movement item or a screen enlargement item of the displayed dynamic screen may be displayed. Therefore, the user can conveniently move or enlarge the dynamic screen.

The dynamic screen may be displayed on the home screen to overlap a card object, the frequency of use of which is smallest or the use time of which is smallest, or may be displayed in a region other than a pointer if the pointer corresponding to movement of a remote controller is displayed on the home screen. Therefore, it is possible to increase user convenience by displaying the dynamic screen in a region other than a card object in which the user has interest.

According to another embodiment of the present invention, if an object for switching a content list is selected, the image display apparatus may provide a content list corresponding to subcategory items desired by the user. Therefore, it is possible to increase user convenience.

According to another embodiment of the present invention, a content list displayed in a predetermined card object may be automatically switched and displayed at a predetermined time interval. Therefore, the user can easily confirm the content list corresponding to various subcategory items.

The image display apparatus may recognize a user point of gaze via a camera and display a specific content list if a user gazes at the specific content list for a predetermined time or more and display another content list if the user point of gaze is changed. Therefore, it is possible to increase user convenience.

The image display apparatus may change and display a content list displayed in each card object on a per user basis. Therefore, it is possible to provide a content list suitable for each user and to increase user convenience.

If any one item is selected from a content list displayed in a smart share card object, the image display apparatus can easily play content data stored in an adjacent electronic apparatus back.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display apparatus, the method comprising:
   displaying a home screen including at a plurality of card objects, each card object including a content list;
   displaying a dynamic screen including a broadcast image screen on the home screen when a dynamic screen display input is received;
   capturing an image of a user;
   recognizing a point of gaze of the user based on the captured image;
   moving and displaying the dynamic screen on the home screen based on the user's point of gaze when a dynamic screen movement input is received;
   determining a lowest priority card object based on one of the plurality of card objects having a lowest frequency of use, a least number of times of use or a smallest use time; and
   automatically switching a first content list to a second content list and displaying the second content list when a predetermined time has been elapsed in a state in which the first content list is displayed in a first card object,
   wherein the dynamic screen is displayed on the home screen to overlap the lowest priority card object and in an area other than the user's point of gaze so that the user can view a content list in which the user has interest without interruption.

2. The method according to claim 1, further comprising enlarging and displaying the dynamic screen on the home screen when a dynamic screen enlargement input is received.

3. The method according to claim 1, wherein, when a card object including an updated content list is displayed on the home screen, the dynamic screen is displayed in a region other than the card object including the updated content list.

4. The method according to claim 1, wherein, when a pointer corresponding to movement of a remote controller is displayed on the home screen, the dynamic screen is displayed in a region other than the pointer.

5. The method according to claim 1, wherein, when a pointer corresponding to movement of a remote controller is displayed on the dynamic screen, an object for movement or enlargement is displayed to overlap the dynamic screen.

6. The method according to claim 1, wherein, when the dynamic screen and an object for movement or enlargement are displayed to overlap each other, the dynamic screen or the object for movement or enlargement is transparently displayed.

7. The method according to claim 1, wherein, when the dynamic screen display input is received in a state in which a live broadcast image is displayed in a first region on the home screen, the dynamic screen is displayed in a second region independently of the live broadcast image or the displayed live broadcast image is moved to the second region and the dynamic screen is displayed in the first region.

8. The method according to claim 1, further comprising switching the home screen to an application screen and displaying the application screen,
   wherein a size or display location of the dynamic screen displayed on the application screen is different from the size or display location of the dynamic screen displayed on the home screen.

9. The method according to claim 1, further comprising displaying a subcategory settings screen when a settings object for setting a subcategory in a first display object displayed on the home screen is selected.

* * * * *